(12) United States Patent
Kondo et al.

(10) Patent No.: US 8,265,374 B2
(45) Date of Patent: Sep. 11, 2012

(54) IMAGE PROCESSING APPARATUS, IMAGE PROCESSING METHOD, AND PROGRAM AND RECORDING MEDIUM USED THEREWITH

(75) Inventors: Tetsujiro Kondo, Tokyo (JP); Tetsushi Kokubo, Kanagawa (JP); Hitoshi Mukai, Kanagawa (JP); Hirofumi Hibi, Tokyo (JP); Kazumasa Tanaka, Chiba (JP); Kenji Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 1552 days.

(21) Appl. No.: 11/405,476

(22) Filed: Apr. 18, 2006

(65) Prior Publication Data
US 2006/0244749 A1 Nov. 2, 2006

(30) Foreign Application Priority Data

Apr. 28, 2005 (JP) ................................ 2005-133174

(51) Int. Cl.
*G06T 15/20* (2011.01)
(52) U.S. Cl. ........ 382/154; 345/421; 345/427; 345/443; 382/190; 382/199; 382/201; 382/216
(58) Field of Classification Search .................. 345/427; 382/154
See application file for complete search history.

(56) References Cited

U.S. PATENT DOCUMENTS

| 5,901,252 A * | 5/1999 | Kawakami et al. ........... 382/276 |
|---|---|---|
| 6,393,162 B1 * | 5/2002 | Higurashi ..................... 382/284 |
| 6,434,277 B1 * | 8/2002 | Yamada et al. ............... 382/285 |
| 6,529,206 B1 * | 3/2003 | Ohki et al. .................... 345/619 |
| 6,556,195 B1 * | 4/2003 | Totsuka et al. ............... 345/419 |
| 7,199,793 B2 * | 4/2007 | Oh et al. ....................... 345/419 |
| 7,245,761 B2 * | 7/2007 | Swaminathan et al. ...... 382/154 |
| 2002/0024593 A1 * | 2/2002 | Bouguet et al. ................ 348/46 |
| 2003/0002730 A1 * | 1/2003 | Petrich .......................... 382/154 |
| 2004/0012544 A1 * | 1/2004 | Swaminathan et al. ........ 345/32 |
| 2004/0095357 A1 * | 5/2004 | Oh et al. ....................... 345/589 |
| 2004/0264761 A1 * | 12/2004 | Mas et al. ..................... 382/154 |
| 2005/0012035 A1 * | 1/2005 | Miller ........................... 250/226 |
| 2005/0094860 A1 * | 5/2005 | Shinbata ...................... 382/132 |

* cited by examiner

*Primary Examiner* — John Lee
(74) *Attorney, Agent, or Firm* — Oblon, Spivak, McClelland, Maier & Neustadt, L.L.P.

(57) ABSTRACT

An image processing apparatus acquires and transforms first plane image data representing a space having a depth. The apparatus includes a vanishing point estimating unit for estimating a vanishing point of the first plane image data, an angle-of-view estimating unit for estimating an angle of view of the first plane image data, and an image generating unit for generating, on the basis of the vanishing point estimated by the vanishing point estimating unit and the angle of view estimated by the angle-of-view estimating unit, second plane image data corresponding to a case in which the first plane image data is projected onto a portion corresponding to the angle of view on a curved surface of a cylinder having a predetermined radius by using, as a reference point, a position being the center of the cylinder and being equal in height to the vanishing point.

11 Claims, 49 Drawing Sheets

$f_{ov3}=28.1$ deg
a=0.5 a=2
$f_{ov2}=90$ deg $f_{ov1}=57$ deg
a=1.086

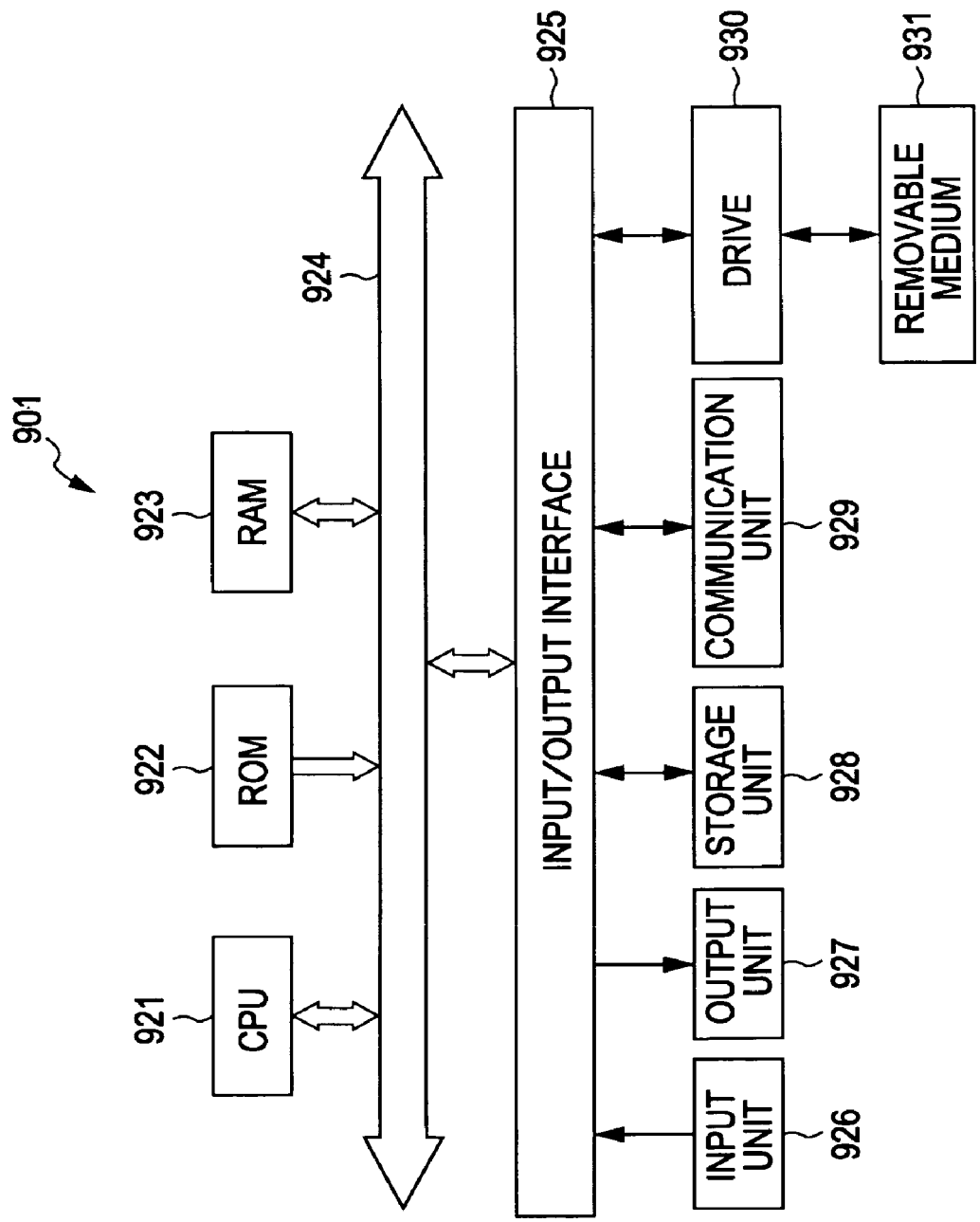

IMAGE PROCESSING APPARATUS, IMAGE PROCESSING METHOD, AND PROGRAM AND RECORDING MEDIUM USED THEREWITH

CROSS REFERENCES TO RELATED APPLICATIONS

The present invention contains subject matter related to Japanese Patent Application JP 2005-133174 filed in the Japanese Patent Office on Apr. 28, 2005, the entire contents of which are incorporated herein by reference.

BACKGROUND OF THE INVENTION

1. Field of the Invention

The present invention relates to image processing apparatuses and methods, and programs and recording media used therewith, and, in particular, to an image processing apparatus and method for providing a natural retinal image to an observer at an unspecified position, and a program and recording medium used therewith.

2. Description of the Related Art

In order to use a large screen to display realistic video whose size is a life size of an observer or greater, typically, the observer needs to stand at a predetermined position in front of the screen, or the displayed video is transformed depending on the position of the observer, whereby the observer, who observes the screen, can obtain a correct (natural) retinal image that is realistic. The correct retinal image means that the retinal image obtained such that the observer observes the video displayed on the screen is substantially equivalent to a retinal image obtained when the observer is present in an actual scene.

Technologies for displaying realistic video for observers include, for example, a so-called "immersive display apparatus". An example using an immersive display apparatus is a system in which, by disposing large screens in a space around a user and projecting video from behind the screens by using projectors, the user can have various virtual experiences in the space. Regarding this system, see, for example, Cruz-Neira, C., Sandin, D. J., and DeFanti, T. A., Surround-Screen Projection-Based Virtual Reality: The Design and Implementation of the CAVE, Proceedings of SIGGRAPH '93, pp. 135-142, 1993.

SUMMARY OF THE INVENTION

In a case of the related art in which a large screen is used to provide an observer with realistic video, as described above, the observer needs to stand at a predetermined position in front of the screen, or the displayed video needs to be transformed depending on the position of the observer. In other words, in a technology of the related art, only video that is observed from a certain position is designed to provide an observer with a correct retinal image. Therefore, in the technology of the related art, for example, when a plurality of observers simultaneously observe the video, it is difficult to simultaneously provide a correct retinal image to each observer.

The present invention has been made in view of such circumstances. It is desirable to provide a natural retinal image to an observer at an unspecified position in front of (within a range equal to the width of) displayed video or image.

According to an embodiment of the present invention, there is provided a first image processing apparatus for acquiring and transforming first plane image data representing a space having a depth. The image processing apparatus includes vanishing point estimating means for estimating a vanishing point of the first plane image data, angle-of-view estimating means for estimating an angle of view of the first plane image data, and image generating means for generating, on the basis of the vanishing point estimated by the vanishing point estimating means and the angle of view estimated by the angle-of-view estimating means, second plane image data corresponding to a case in which the first plane image data is projected onto a portion corresponding to the angle of view on a curved surface of a cylinder having a predetermined radius by using, as a reference point, a position being the center of the cylinder and being equal in height to the vanishing point.

Preferably, the angle-of-view estimating means estimates the angle of view on the basis of the vanishing point estimated by the vanishing point estimating means.

The vanishing point estimating means may include drawing means for drawing perspective lines of the first plane image data, and vanishing point extracting means for extracting the vanishing point of the first plane image data on the basis of the perspective lines.

The vanishing point estimating means includes feature value extracting means for extracting feature values of the first plane image data, feature value quantizing means for quantizing the feature values extracted by the feature value extracting means, feature-value-distribution calculating means for calculating, on the basis of the feature values quantized by the feature value quantizing means, a feature value distribution indicating a type of gradient with which the feature values are distributed in a vertical direction of the first plane image data, and vanishing point extracting means for extracting the vanishing point of the first plane image data on the basis of the feature value distribution calculated by the feature-value-distribution calculating means.

The angle-of-view estimating means may include plane view generating means for generating a plane view obtained by assuming that the space represented by the first plane image data is vertically viewed from above, and angle-of-view calculating means for calculating the angle of view by detecting the position of a viewpoint in the space represented by the first plane image data in the plane view generated by the plane view generating means.

The plane view generating means may generate the plane view by calculating an elevation angle of the viewpoint in the space represented by the first plane image data.

The image generating means may determine the radius of the cylinder on the basis of the angle of view estimated by the angle-of-view estimating means and an image size of the first plane image data.

The image processing apparatus may further include display means for displaying the second plane image data generated by the image generating means, and the display means may include a planar display.

According to another embodiment of the present invention, there is provided a first image processing method for an image processing apparatus for acquiring and transforming first plane image data representing a space having a depth. The image processing method includes the steps of estimating a vanishing point of the first plane image data, estimating an angle of view of the first plane image data, and, on the basis of the vanishing point estimated by the vanishing point estimating means and the angle of view estimated by the angle-of-view estimating means, generating second plane image data corresponding to a case in which the first plane image data is projected onto a portion corresponding to the angle of view on a curved surface of a cylinder having a predetermined radius by using, as a reference point, a position being the center of the cylinder and being equal in height to the vanishing point.

According to another embodiment of the present invention, there is provided a first program or program recorded on a recording medium for allowing a computer to execute processing for acquiring and transforming first plane image data representing a space having a depth, the program comprising the steps of estimating a vanishing point of the first plane image data, estimating an angle of view of the first plane image data, and, on the basis of the vanishing point estimated by the vanishing point estimating means and the angle of view estimated by the angle-of-view estimating means, generating second plane image data corresponding to a case in which the first plane image data is projected onto a portion corresponding to the angle of view on a curved surface of a cylinder having a predetermined radius by using, as a reference point, a position being the center of the cylinder and being equal in height to the vanishing point.

In the first image processing apparatus, image processing method, and program, a vanishing point of first plane image data is estimated, an angle of view of the first plane image data is estimated, and second plane image data is generated on the basis of the estimated vanishing point and angle of view. The generated second plane image data is such that the first plane image data is projected onto a portion corresponding to the angle of view on a curved surface of a cylinder having a predetermined radius by using, as a reference point, a position being the center of the cylinder and being equal in height to the vanishing point.

According to another embodiment of the present invention, there is provided a second image processing apparatus for acquiring and transforming first plane image data representing a space having a depth. The image processing apparatus includes input means for inputting a vanishing point and angle of view of the first plane image data, and image generating means for generating, on the basis of the vanishing point and angle of view input by the input means, second plane image data corresponding to a case in which the first plane image data is projected onto a portion corresponding to the angle of view on a curved surface of a cylinder having a predetermined radius by using, as a reference point, a position being the center of the cylinder and being equal in height to the vanishing point.

Preferably, the image processing apparatus further includes display means for displaying the second plane image data generated by the image generating means, and the display means includes a planar display.

According to another embodiment of the present invention, there is provided a second image processing method for an image processing apparatus for acquiring and transforming first plane image data representing a space having a depth. The second image processing method includes the steps of controlling inputting of a vanishing point and angle of view of the first plane image data, and, on the basis of the vanishing point and angle of view whose inputting is controlled in the input control step, generating second plane image data corresponding to a case in which the first plane image data is projected onto a portion corresponding to the angle of view on a curved surface of a cylinder having a predetermined radius by using, as a reference point, a position being the center of the cylinder and being equal in height to the vanishing point.

In the second image processing apparatus and image processing method, after a vanishing point of first plane image data and an angle of view of the first plane image data are input, on the basis of the input vanishing point and plane image data, second plane image data is generated which corresponds to a case in which the first plane image data is projected onto a portion corresponding to the angle of view on a curved surface of a cylinder having a predetermined radius by using, as a reference point, a position being the center of the cylinder and being equal in height to the vanishing point.

According to the embodiments of the present invention, a first plane image can be transformed into a second plane image. In particular, on the basis of the first plane image, which represents a space having a depth, the second plane image can be generated. By using the second plane image, a natural retinal image can be provided to an observer who observes at an unspecified position.

BRIEF DESCRIPTION OF THE DRAWINGS

FIG. 54 is a block diagram showing the configuration of a personal computer.

DESCRIPTION OF THE PREFERRED EMBODIMENTS

Figure 1:
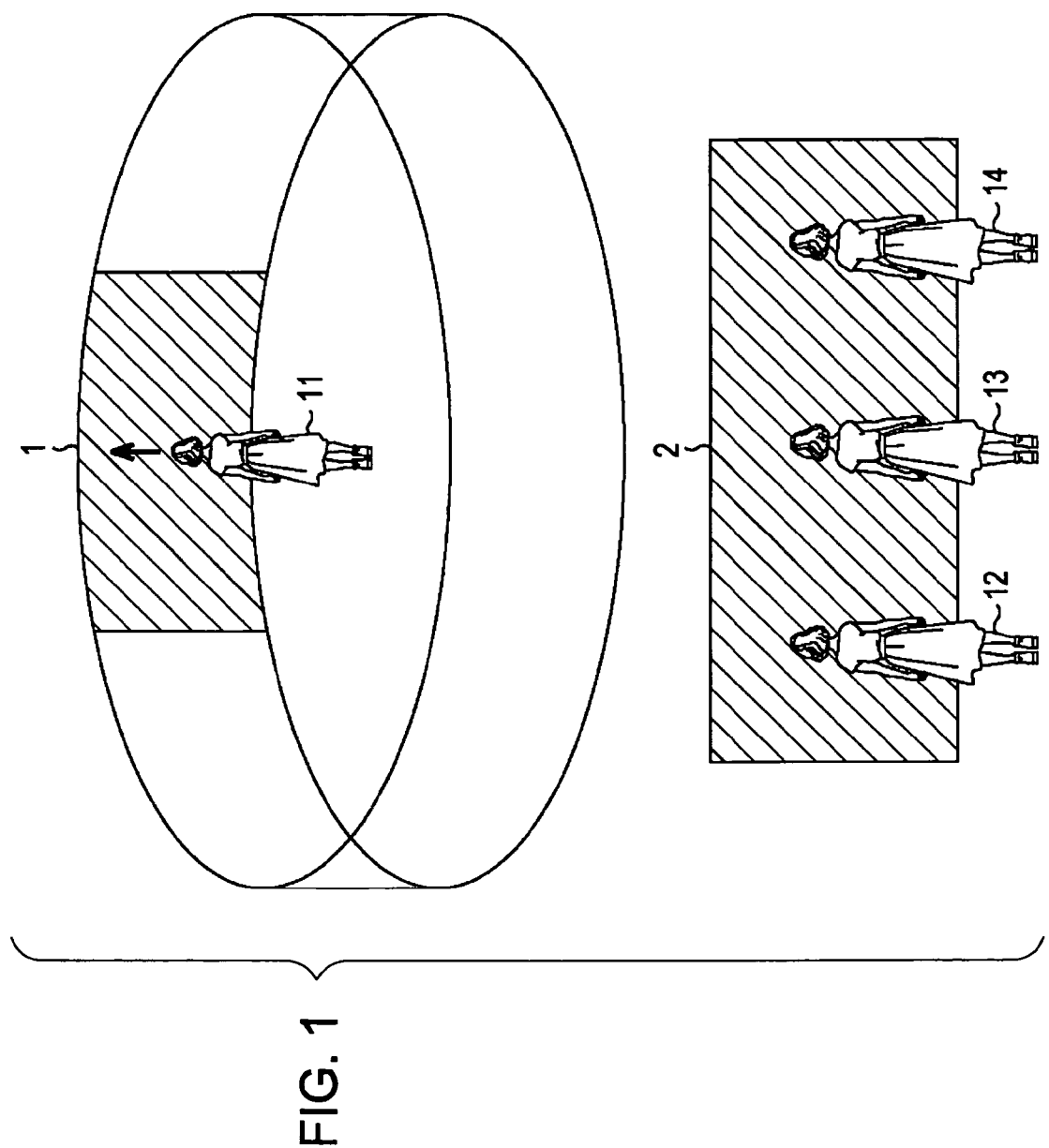
FIG. 1 is an illustration of a curved surface screen and a plane screen.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

The image processing apparatus (e.g., the image processing apparatus 41 in FIG. 2) according to an embodiment of the present invention acquires and transforms first plane image data (e.g., the image 81 in FIG. 4) representing a space having a depth. The image processing apparatus according to the embodiment of the present invention includes vanishing point estimating means (e.g., the vanishing point estimating unit 52 in FIG. 2) for estimating a vanishing point (e.g., the vanishing point in FIG. 13 or FIG. 5) of the first plane image data, angle-of-view estimating means (e.g., the angle-of-view estimating unit 53 in FIG. 2) for estimating an angle of view of the first plane image data, and image generating means (e.g., the image transforming unit 54 in FIG. 2) for generating, on the basis of the vanishing point estimated by the vanishing point estimating means and the angle of view estimated by the angle-of-view estimating means, second plane image data corresponding to a case in which the first plane image data is projected onto a portion corresponding to the angle of view on a curved surface of a cylinder having a predetermined radius (e.g., "a" in FIG. 31 or FIG. 32) by using, as a reference point, a position (e.g., position (0, 0, −a) in FIG. 31 or FIG. 32) being the center of the cylinder and being equal in height to the vanishing point.

Figure 3:
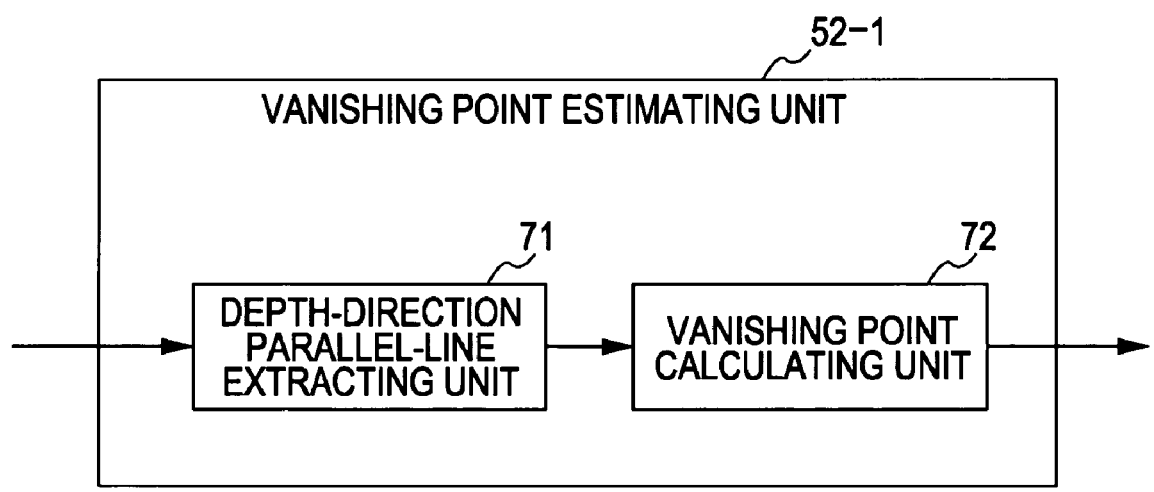
FIG. 3 is a block diagram illustrating a first example of the vanishing point estimating unit shown in FIG. 2.

The vanishing point estimating means (e.g., the vanishing point estimating unit 52-1 in FIG. 3) may include drawing means (e.g., the depth-direction parallel-line extracting unit 71 in FIG. 3) for drawing perspective lines of the first plane image data, and vanishing point extracting means (e.g., the vanishing point calculating unit 72 in FIG. 3) for extracting the vanishing point of the first plane image data on the basis of the perspective lines.

The vanishing point estimating means (e.g., the vanishing point estimating unit 52-2 in FIG. 6) may include feature value extracting means (e.g., the feature value extracting section 131 in FIG. 6) for extracting feature values of the first plane image data, feature value quantizing means (e.g., the quantizing section 132 in FIG. 6) for quantizing the feature values extracted by the feature value extracting means, feature-value-distribution calculating means (e.g., the texture gradient calculating section 133 in FIG. 6) for calculating, on the basis of the feature values quantized by the feature value quantizing means, a feature value distribution (e.g., a texture gradient) indicating a type of gradient with which the feature values are distributed in a vertical direction of the first plane image data, and vanishing point extracting means (e.g., the vanishing point calculating section 134 in FIG. 6) for extracting the vanishing point of the first plane image data on the basis of the feature value distribution calculated by the feature-value-distribution calculating means.

The angle-of-view estimating means may include plane view generating means (e.g., the tiled image generating section 173 in FIG. 14) for generating a plane view (e.g., the tiled image in FIG. 17) obtained by assuming that the space represented by the first plane image data is vertically viewed from above, and angle-of-view calculating means (e.g., the angle-of-view calculating section 174 in FIG. 14) for calculating the angle of view by detecting the position (the camera position in FIG. 17) of a viewpoint in the space represented by the first plane image data in the plane view generated by the plane view generating means.

The plane view generating means may generate the plane view by (e.g., processing by the horizontal parallel line drawing section 171 described with reference to FIG. 19) calculating an elevation angle of the viewpoint in the space represented by the first plane image data.

Figure 44:
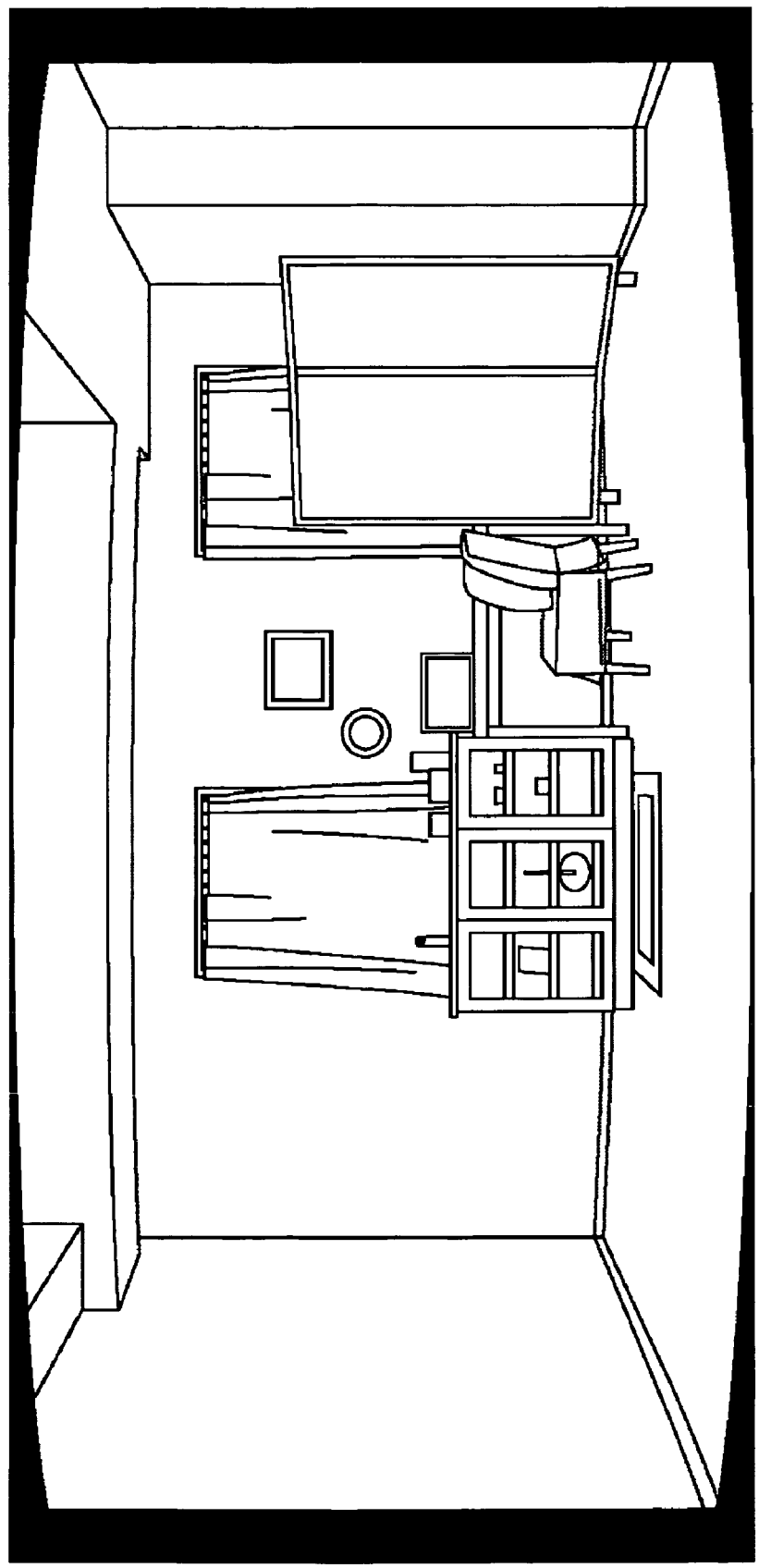
FIG. 44 is an illustration of an image changed on the basis of an angle of view correctly estimated by applying an embodiment of the present invention.
Figure 53:
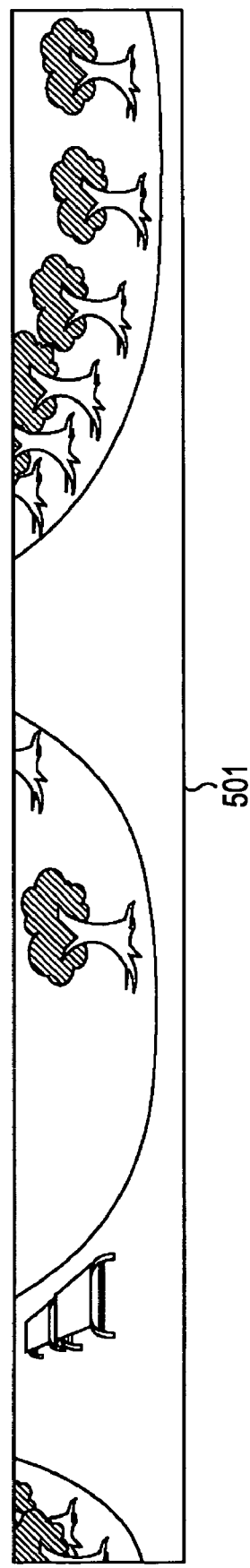
FIG. 53 is an illustration of an image generated by applying an embodiment of the present invention.

The image processing apparatus according to the embodiment of the present invention may further include display means for displaying the second plane image data generated by the image generating means, and the display means may include a planar display (e.g., the image-displaying planar display in FIG. 44 or FIG. 45, or a planar display for displaying the image 501 in FIG. 53).

The image processing method according to another embodiment of the present invention is used for an image processing apparatus (e.g., the image processing apparatus 41 in FIG. 2) that acquires and transforms first plane image data (e.g., the image 81 in FIG. 4) representing a space having a depth. This image processing method includes the steps of estimating (e.g., step S2 in FIG. 34) a vanishing point (e.g., the vanishing point in FIG. 13 or FIG. 5) of the first plane image data, estimating (e.g., step S3 in FIG. 34) an angle of view of the first plane image data, and generating (e.g., step S4 in FIG. 34), on the basis of the vanishing point estimated by the vanishing point estimating means and the angle of view estimated by the angle-of-view estimating means, second plane image data corresponding to a case in which the first plane image data is projected onto a portion corresponding to the angle of view on a curved surface of a cylinder having a predetermined radius (e.g., "a" in FIG. 31 or FIG. 32) by using, as a reference point, a position (e.g., position (0, 0, −a) in FIG. 31 or FIG. 32) being the center of the cylinder and being equal in height to the vanishing point.

In addition, in the program according to an embodiment of the present invention and the program, recorded on the recording medium, according to an embodiment of the present invention, (examples of) features to which steps correspond are similar to those in the image processing method according to the above embodiment.

The image processing apparatus (e.g., the image processing apparatus 41 in FIG. 2) according to another embodiment of the present invention acquires and transforms first plane image data (e.g., the image 81 in FIG. 4) representing a space having a depth. This image processing apparatus includes input means for inputting a vanishing point and angle of view of the first plane image data, and image generating means (e.g., the image transforming unit 54 in FIG. 2) for generating, on the basis of the vanishing point and angle of view input by the input means, second plane image data corresponding to a case in which the first plane image data is projected onto a portion corresponding to the angle of view on a curved surface of a cylinder having a predetermined radius (e.g., "a" in FIG. 31 or FIG. 32) by using, as a reference point, a position (e.g., point (0, 0, −a) in FIG. 31 or FIG. 32) being the center of the cylinder and being equal in height to the vanishing point.

The above image processing apparatus may further include display means for displaying the second plane image data generated by the image generating means, and the display means may include a planar display (e.g., the image-displaying planar display in FIG. 44 or FIG. 45, or a planar display for displaying the image 501 in FIG. 53).

The image processing apparatus according to another embodiment of the present invention is used for an image processing apparatus (e.g., the image processing apparatus 41 in FIG. 2) that acquires and transforms first plane image data (e.g., the image 81 in FIG. 4) representing a space having a depth. This image processing method includes the steps of controlling inputting of a vanishing point and angle of view of the first plane image data, and, on the basis of the vanishing point and angle of view whose inputting is controlled in the input control step, generating (e.g., step S4 in FIG. 34) second plane image data corresponding to a case in which the first plane image data is projected onto a portion corresponding to the angle of view on a curved surface of a cylinder having a predetermined radius (e.g., "a" in FIG. 31 or FIG. 32) by using, as a reference point, a position (e.g., position (0, 0, −a) in FIG. 31 or FIG. 32) being the center of the cylinder and being equal in height to the vanishing point.

Embodiments of the present invention are described below with reference to the accompanying drawings.

An image processing apparatus to which an embodiment of the present invention is applied generates a plane image or video within a predetermined angle of view which is captured by an ordinary camera. In other words, the image processing apparatus generates a plane image or video in which, when an observer observes the plane image or video from a plurality of viewpoints, the observer does not notice any unnaturalness.

For example, as shown in FIG. 1, onto a cylindrical surface including curved surface portion 1, an image or video can be projected so that, when an observer 11 who exists at the center of the cylinder while horizontally rotating 360 degrees, the observer does not notice any unnaturalness at any angle.

After transforming a plane image or moving picture (video) captured by an ordinary camera, the moving picture including a plurality of plane images, into an image or video obtained when the plane image or moving picture is projected onto the curved surface portion 1, the image processing apparatus to which the embodiment of the present invention is applied can display the obtained image or video on a plane 2 or can print out the obtained image or video on a similar plane. On the basis of the image or video displayed on the plane 2, when a plurality of observers 12 to 14 in front of the plane 2 observe the front from their positions (when lines of sight of the observers 12 to 14 are perpendicular to the plane 2 or each have an angle close to perpendicularity), they can obtain correct retinal images similar to those obtained when the observer 11 at the center of the cylinder including the curved surface portion 1 changes its direction (angle) to the plane 2.

Image processing is exemplified below. However, obviously, by implementing, on all frame images, processing to which an embodiment of the present invention is applied, an embodiment of the present invention is applicable to even a case in which video (moving picture) is displayed assuming that the video includes a plurality of frame images (still images).

Figure 2:
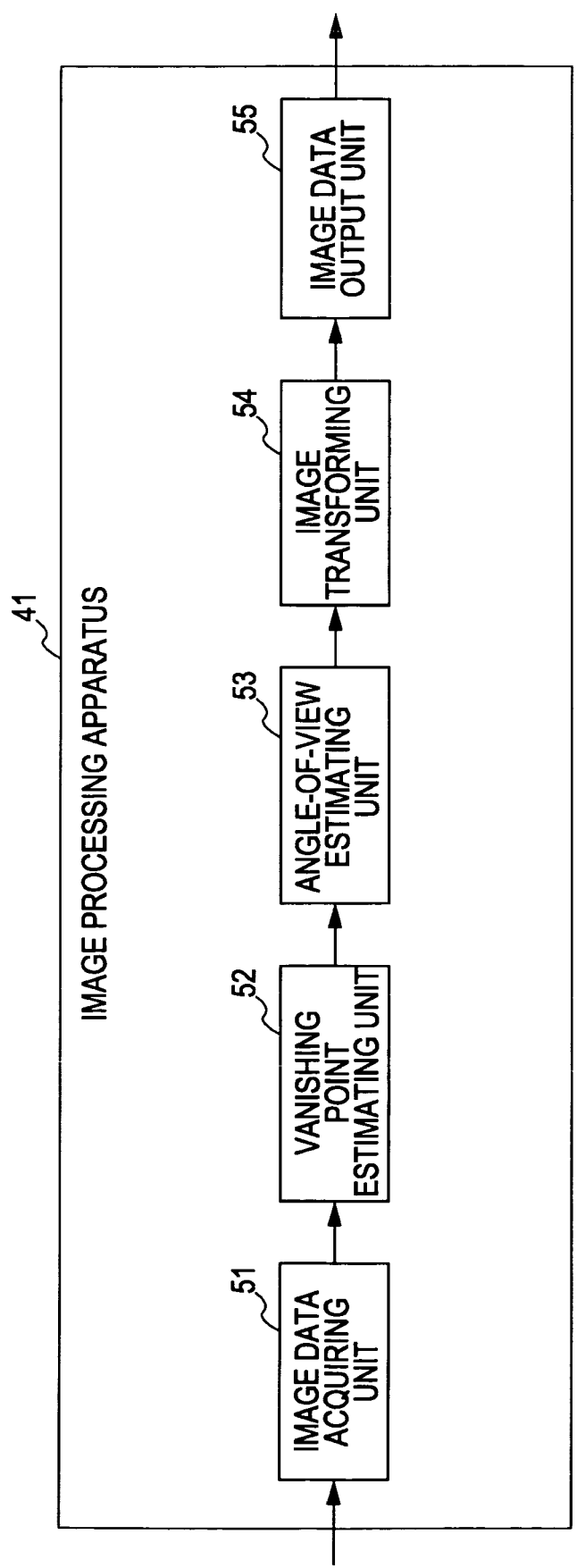
FIG. 2 is a block diagram illustrating an example of the configuration of an image processing apparatus to which an embodiment of the present invention.

FIG. 2 is a block diagram showing an example of the configuration of an image processing apparatus 41 to which an embodiment of the present invention is applied.

The image processing apparatus 41 includes an image data acquiring unit 51, a vanishing point estimating unit 52, an angle-of-view estimating unit 53, an image transforming unit 54, and an image data output unit 55.

The image data acquiring unit 51 acquires a plane image captured by an ordinary camera, that is, image data corresponding to an ordinary plane image captured by using a lens position of the camera as a viewpoint on the basis of the principle of a so-called "pinhole camera", and supplies the acquired image data to the vanishing point estimating unit 52.

The vanishing point estimating unit 52 detects a vanishing point of the supplied image data, and supplies information of the detected vanishing point and the supplied image data to the angle-of-view estimating unit 53. The vanishing point is a point at which, when parallel lines in a three-dimensional space are projected onto an image plane by perspective transformation, straight lines on the image plane which correspond to the parallel lines converge. In other words, the vanishing point is an "infinitely far point" on a plane image onto which a space actually having a depth is projected. The vanishing point is recognized as a point in which intersections of extended lines of parallel lines (e.g., in an image of a room, its ridge lines) in a depth direction and extensions of planes (e.g., in an image of a room, planes corresponding to a floor, walls, and a ceiling extending in the depth direction) extending in the depth direction converge in an infinite direction. A straight line horizontally drawn from the vanishing point in the image is the horizon. Thus, estimation of the vanishing point is, in other words, estimation of the horizon. Estimation of the vanishing point by the vanishing point estimating unit 52 may be performed by any method. Two types of vanishing point estimating methods are described below as specific examples with reference to FIGS. 3 to 13.

The angle-of-view estimating unit 53 estimates an angle of view of the supplied image data, that is, an angle representing an image-capturing range of the camera used for capturing the image data, and supplies the estimated angle of view and the supplied image data to the image transforming unit 54. Estimation of the angle of view by the angle-of-view estimating unit 53 may be performed by any method. A specific example of the method is described later with reference to FIGS. 14 to 28.

The image transforming unit 54 transforms the supplied image data on the basis of the estimated angle of view supplied from the angle-of-view estimating unit 53, and supplies the transformed image data to the image data output unit 55. Details of the process of the image transforming unit 54 are described below with reference to FIGS. 29 to 33.

The image data output unit 55 executes processing such as outputting and displaying the transformed image data on a planar large display, printing out the transformed image data, recording the transformed image data, and transmitting the transformed image data to another apparatus through a predetermined communication medium.

When the vanishing point of the supplied image data is known beforehand, by using information of the vanishing point known beforehand for the estimation of the angle of view, the estimation of the angle of view by the vanishing point estimating unit 52 can be omitted. In addition, when the angle of view of the supplied image data is known beforehand, by using information of the angle of view known beforehand for the transformation of the image data by the image transforming unit 54, the estimation of the angle of view by the angle-of-view estimating unit 53 can be omitted.

In this case, by providing the image processing apparatus 41 shown in FIG. 2 with a data input unit (not shown), the data input unit can receive input data of the vanishing point or angle of view and can supply the input data to the image transforming unit 54.

FIG. 3 is a block diagram showing the configuration of a vanishing point estimating unit 52-1 which uses a first vanishing-point estimating method to estimate a vanishing point and which is a first example of the vanishing point estimating unit 52 shown in FIG. 1.

Figure 4:
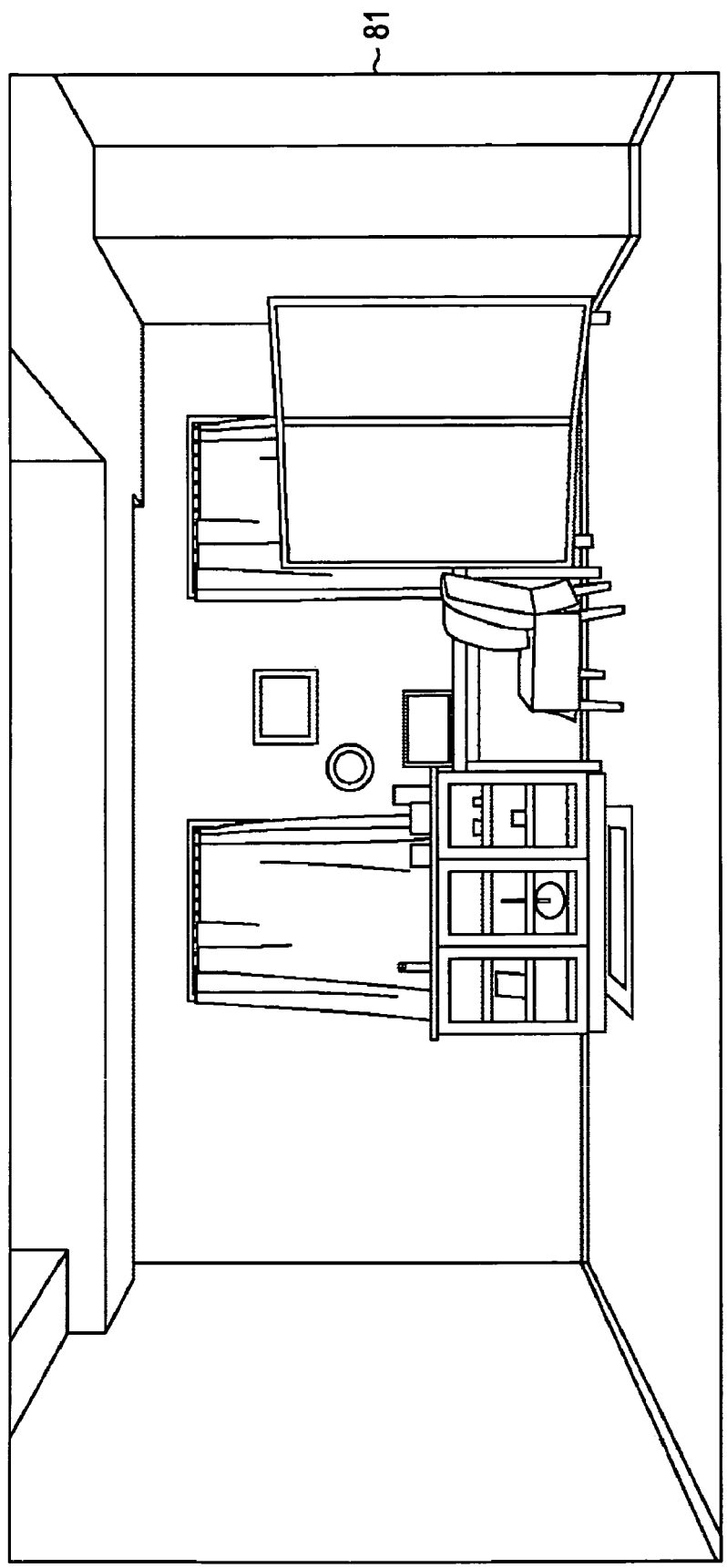
FIG. 4 is an illustration of an example of a supplied image.

By using, for example, an edge filter to extract straight line components from the supplied image data, a depth-direction parallel-line extracting unit 71 extracts so-called "perspective lines" which are parallel to the ground (horizontal plane) and which extend from the front to back side of the image (in a direction identical to the direction of the viewpoint of the camera). When image data corresponding to the image shown in FIG. 4 is supplied, straight lines that are to be extracted include, for example, ridge lines of the room, and the grain of flooring of the floor. For only finding a vanishing point, it is only necessary to draw a plurality of perspective lines. However, on the basis of the extracted straight lines (perspective lines), the depth-direction parallel-line extracting unit 71 draws a plurality of parallel lines that are disposed in an actual space at equal intervals on a predetermined plane such as the ground or a floor so that they are suitable for processing (described later). In other words, the depth-direction parallel-line extracting unit 71 draws parallel lines (perspective lines) at equal intervals on a predetermined plane in a space indicated by a plane image. The drawn parallel lines are hereinafter referred to as the "parallel lines in the depth direction".

The vanishing point calculating unit 72 finds an intersection of the parallel lines in the depth direction extracted by the depth-direction parallel-line extracting unit 71, and uses the intersection as a vanishing point of this image.

Figure 5:
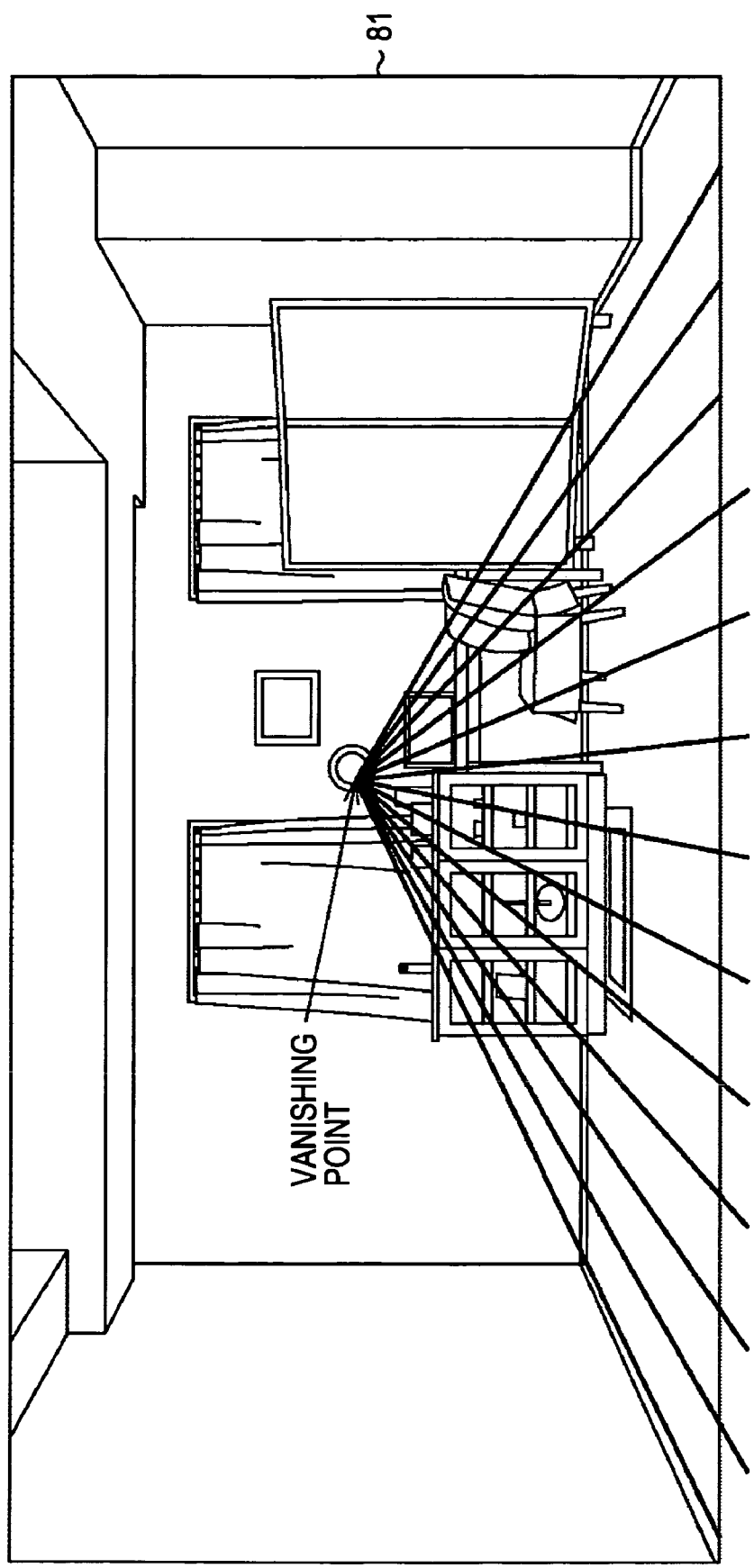
FIG. 5 is an illustration of parallel lines in a depth direction and a vanishing point.

In other words, when the image data acquiring unit 51 receives the input image 81 shown in FIG. 4, and supplies its image data to the vanishing point estimating unit 52-1, the depth-direction parallel-line extracting unit 71 draws a plurality of parallel lines in the depth direction, as shown in FIG. 5, and an intersection of the parallel lines in the depth direction is used as a vanishing point by the vanishing point calculating unit 72. For example, when a plurality of parallel lines in the depth direction are extracted due to a cause such as an error in extraction of parallel lines in the depth direction, the vanishing point calculating unit 72 may use a centroid of the intersections as a vanishing point, and may use, as a vanishing point, a point at which most parallel lines in the depth direction intersect.

Figure 6:
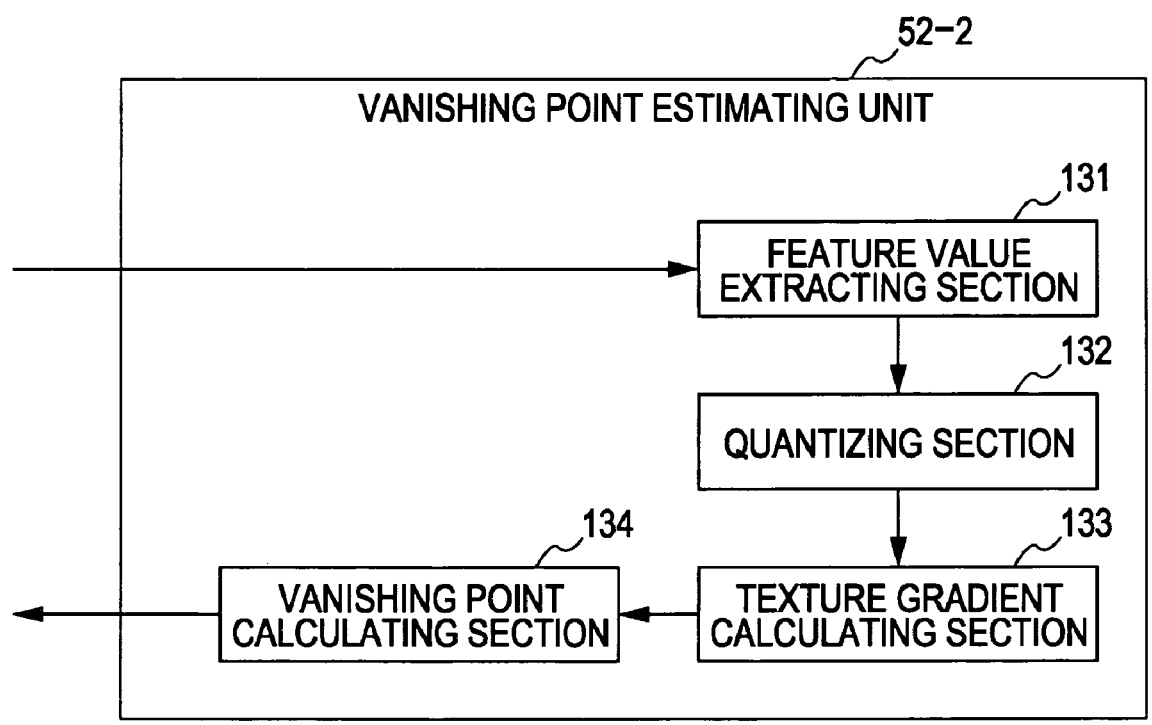
FIG. 6 is a block diagram illustrating a second example of the vanishing point estimating unit shown in FIG. 2.

FIG. 6 is a block diagram showing the configuration of a vanishing point estimating unit 52-2 which estimates a vanishing point by using a second vanishing-point estimating method and which is an example of the vanishing point estimating unit 52 shown in FIG. 1.

The vanishing point estimating unit 52-2, which is described with reference to FIG. 6, estimates a vanishing point from image data by using a so-called "texture gradient".

Figure 7:
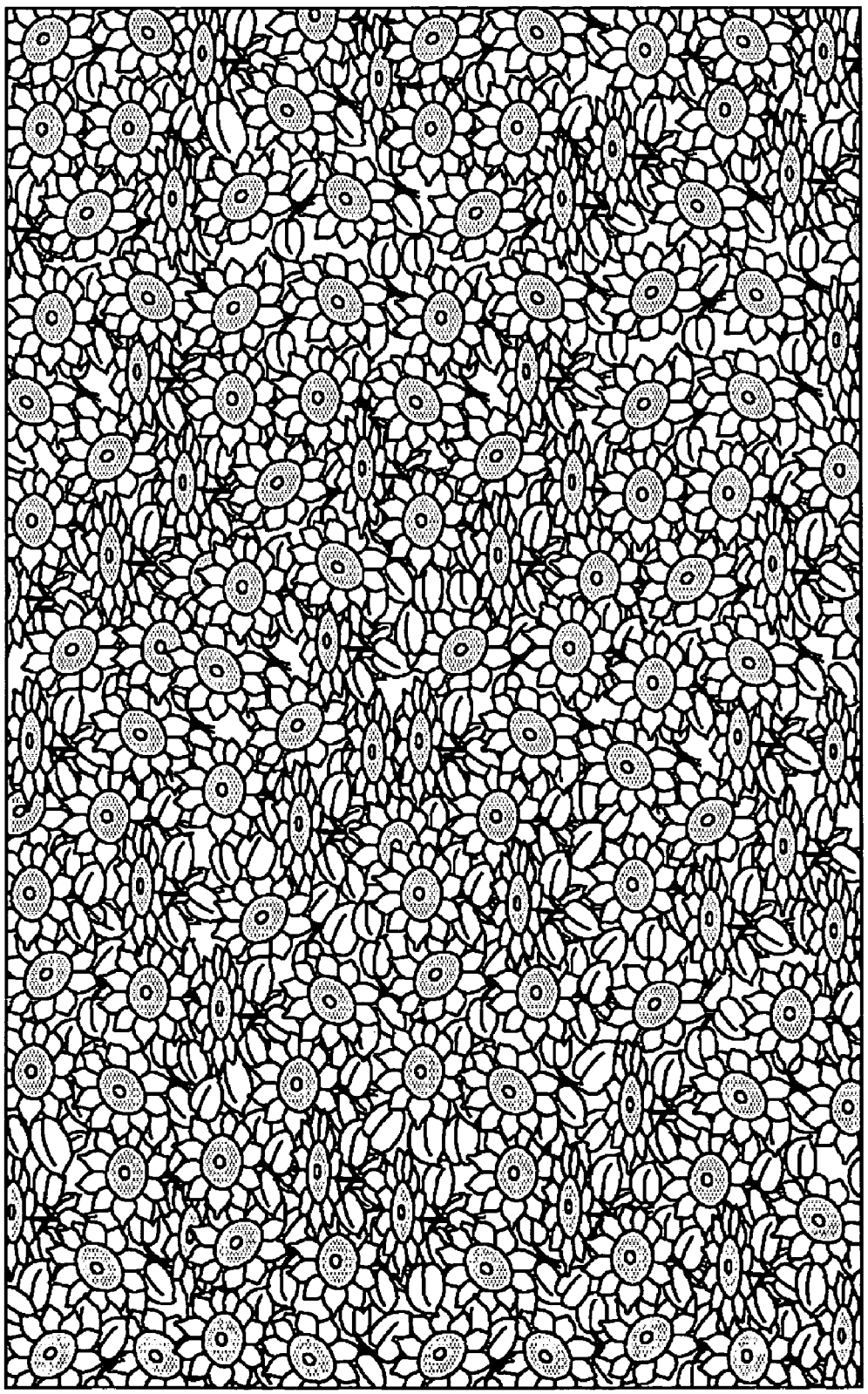
FIG. 7 is an illustration of a perpendicularly-viewed image.
Figure 8:
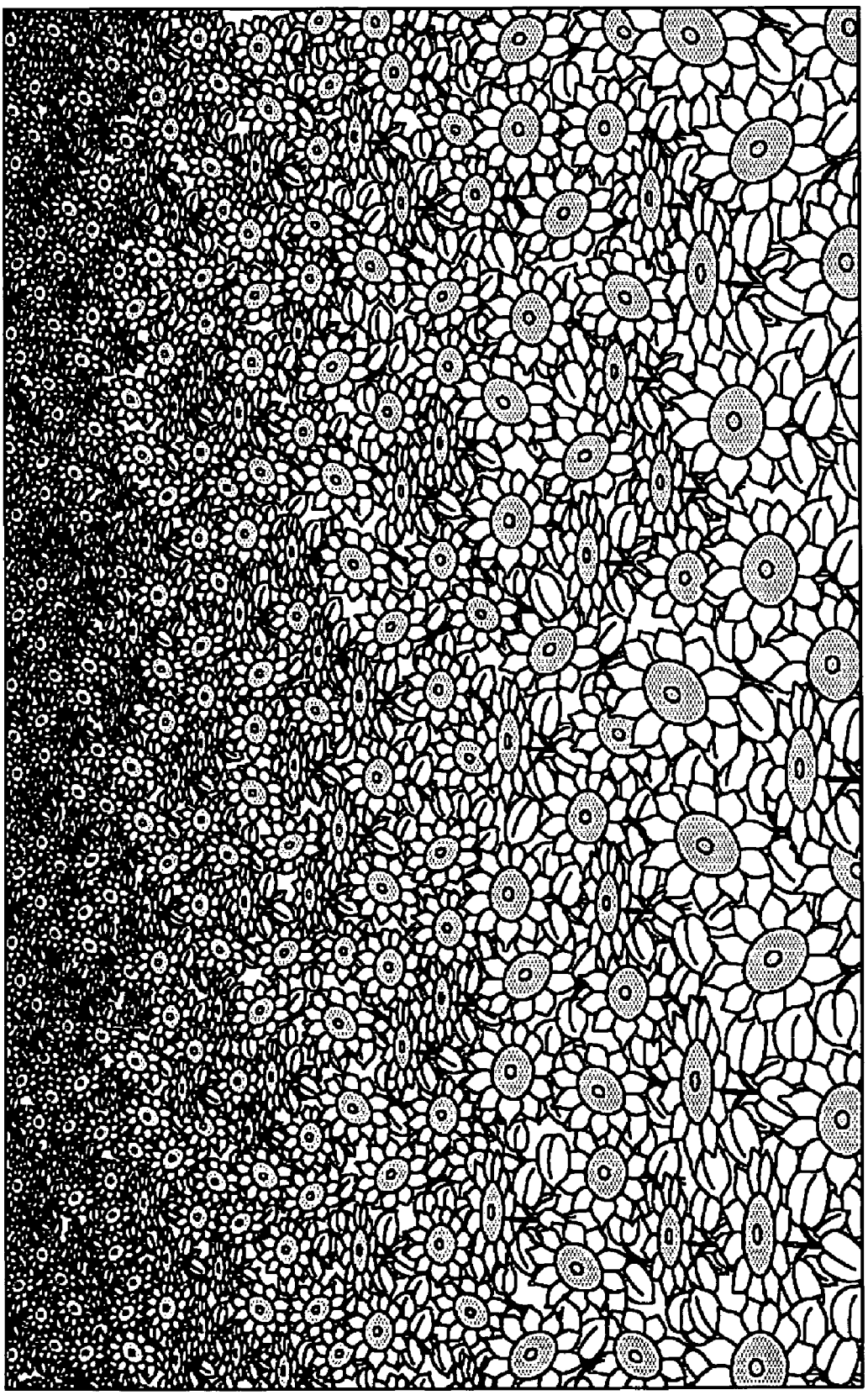
FIG. 8 is an illustration of an image captured at a predetermined elevation angle.

By using a camera to capture, at a predetermined elevation angle, an image of a place where, in a top view, a predetermined pattern (such as color and luminance) extends in a substantially uniform manner, for example, the flower garden shown in FIG. 7, the picture shown in FIG. 8 in which the predetermined pattern becomes coarse at a position closer to the front side and becomes fine at a position farther from the front side can be obtained. A unit of a pattern having a tendency in which, when an image of the pattern is captured at a predetermined elevation angle, the pattern looks coarse at a position closer to the front side of the image and looks fine at a position farther from the front side is called "texture". The degree of the tendency is called a "texture gradient". In other words, a texture gradient is determined by an elevation angle in image capturing.

The feature value extracting section 131 extracts a feature value (e.g., a color-difference value or edge intensity of the pixel) of each pixel of the input image. When using an edge intensity as a feature value, the feature value extracting section 131 extracts the edge intensity by using a built-in differential filter (not shown) to enhance an input image edge.

A quantizing section 132 quantizes the input image on the basis of the feature value of each pixel extracted by the feature value extracting section 131. For example, when the feature value is a color-difference value, the value of each pixel having a color-difference value equal to a predetermined reference value is set to one, and the value of each pixel having a different color-difference value is set to zero. When the image data of the image in FIG. 8 is quantized, quantized data as shown in, for example, FIG. 9, can be obtained.

A texture gradient calculating section 133 calculates the average value of distances between white points (texture) in units of lines from the quantized data (e.g., the quantized data described with reference to FIG. 9) obtained by the quantizing section 132. As shown in, for example, FIG. 10, when a plurality of pixels whose values are ones are arranged in a predetermined line, the average value of distances $a_1$, $a_2$, $a_3$, and $a_4$ therebetween is calculated.

Figure 11:
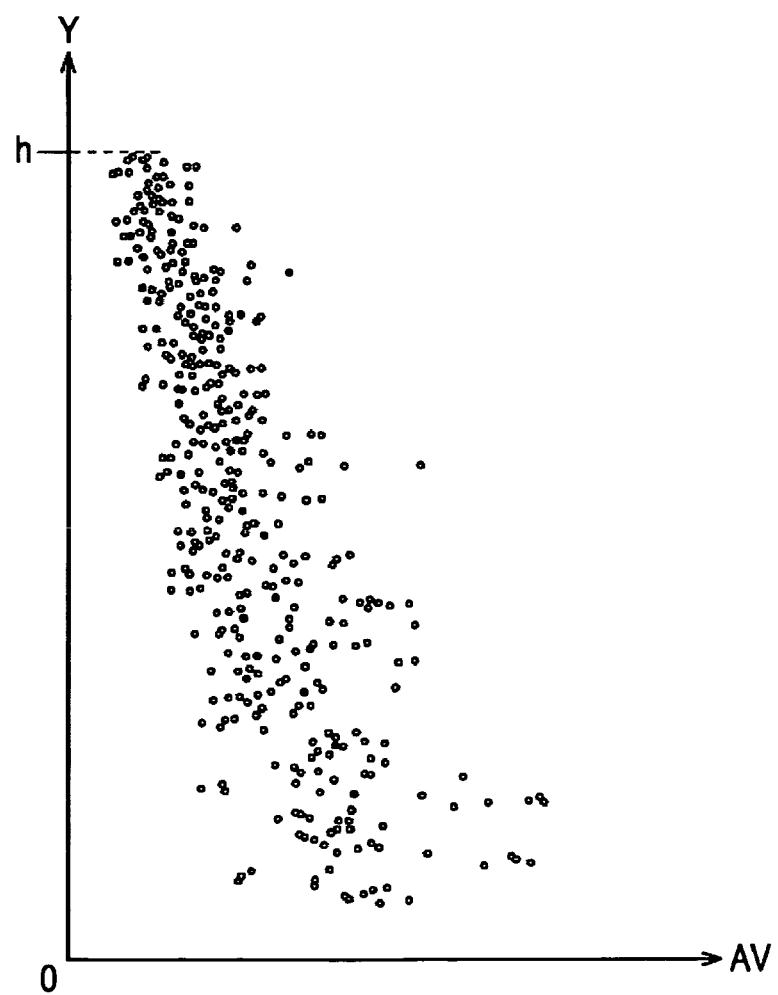
FIG. 11 is a graph illustrating the average value of distances of texture.
Figure 12:
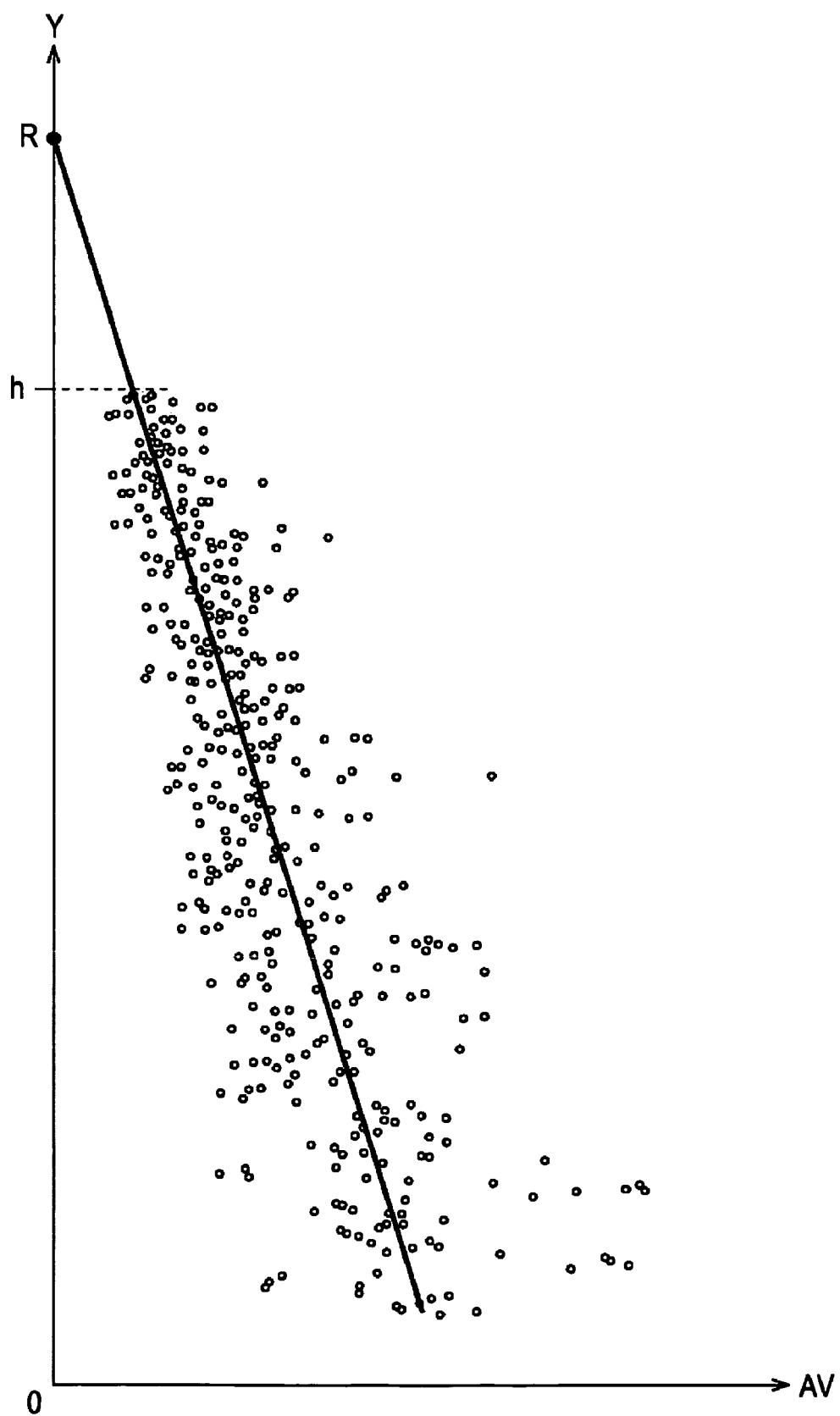
FIG. 12 is a graph illustrating a vanishing point calculated on the basis of the average value of distances of texture.

By plotting the average values calculated in units of lines, which are represented by AV, as shown in FIG. 11, on the basis of positions on a Y-axis in the image data, the texture gradient calculating section 133 sets a regression line, as shown in FIG. 12. In other words, this regression line corresponds to the texture gradient. The texture gradient calculating section 133 supplies the set regression line to a vanishing point calculating section 134.

The vanishing point calculating section 134 calculates, as a vanishing point, an intersection between the set regression line and the Y-axis.

Figure 13:
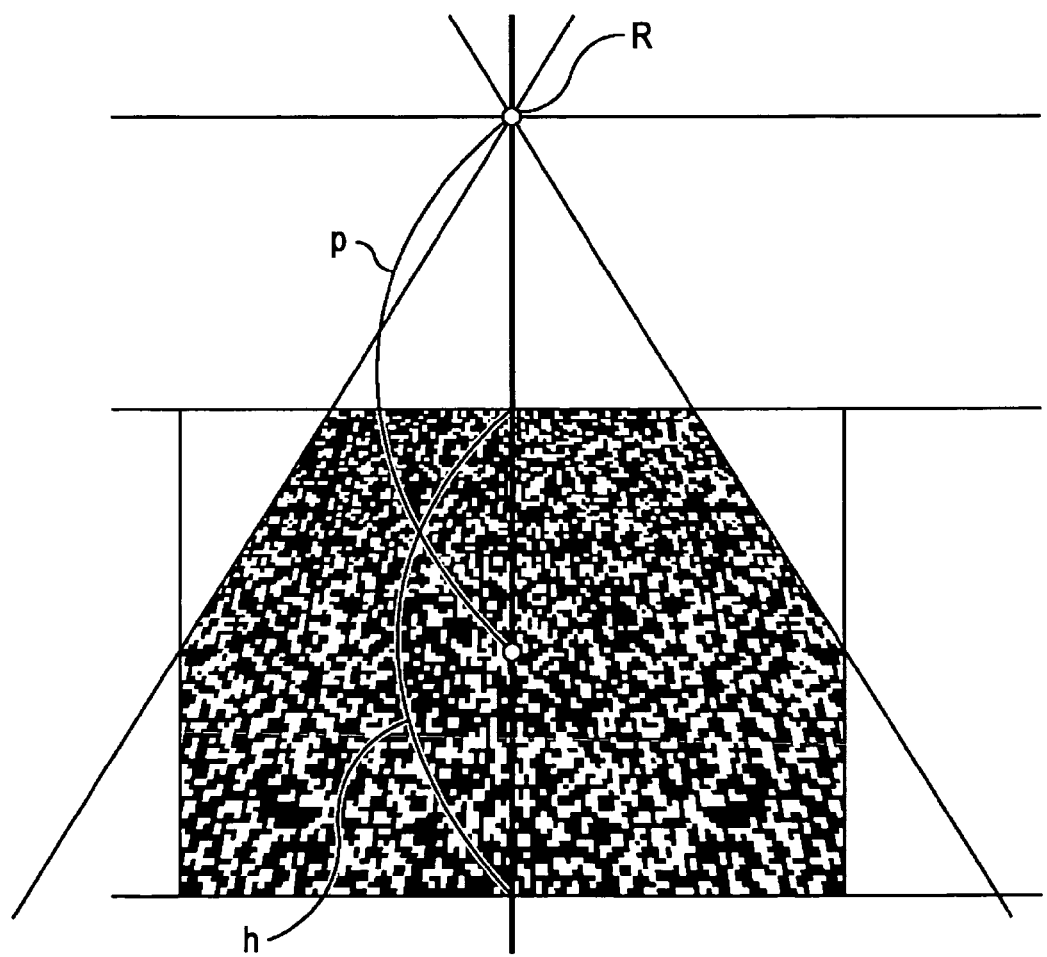
FIG. 13 is an illustration of a vanishing point calculated on the basis of the average value of distances of texture.

Because the vanishing point is a point at which a plane of a subject when it is viewed converges in the infinite far direction, the vanishing point may exist at a position beyond an image area of the input image, as indicated by the vanishing point R shown in FIG. 13. The X-coordinate of the vanishing point R is the X-coordinate of the central point of the input image.

Figure 14:
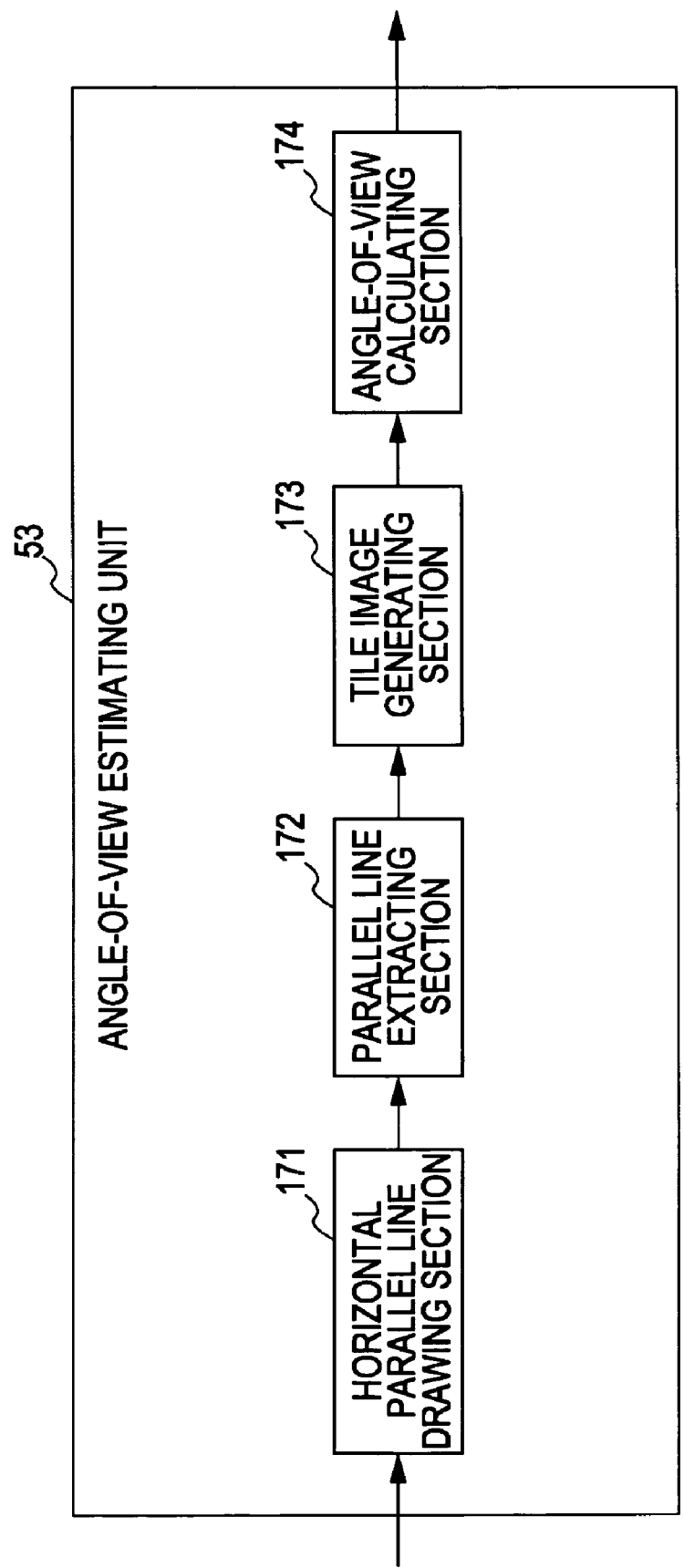
FIG. 14 is a block diagram illustrating an example of the configuration of the angle-of-view estimating unit shown in FIG. 2.

Next, FIG. 14 is a block diagram showing an example of the configuration of the angle-of-view estimating unit 53 shown in FIG. 3.

The angle-of-view estimating unit 53 includes a horizontal parallel line drawing section 171, a parallel line extracting section 172, a tiled image generating section 173, and an angle-of-view calculating section 174.

Figure 15:
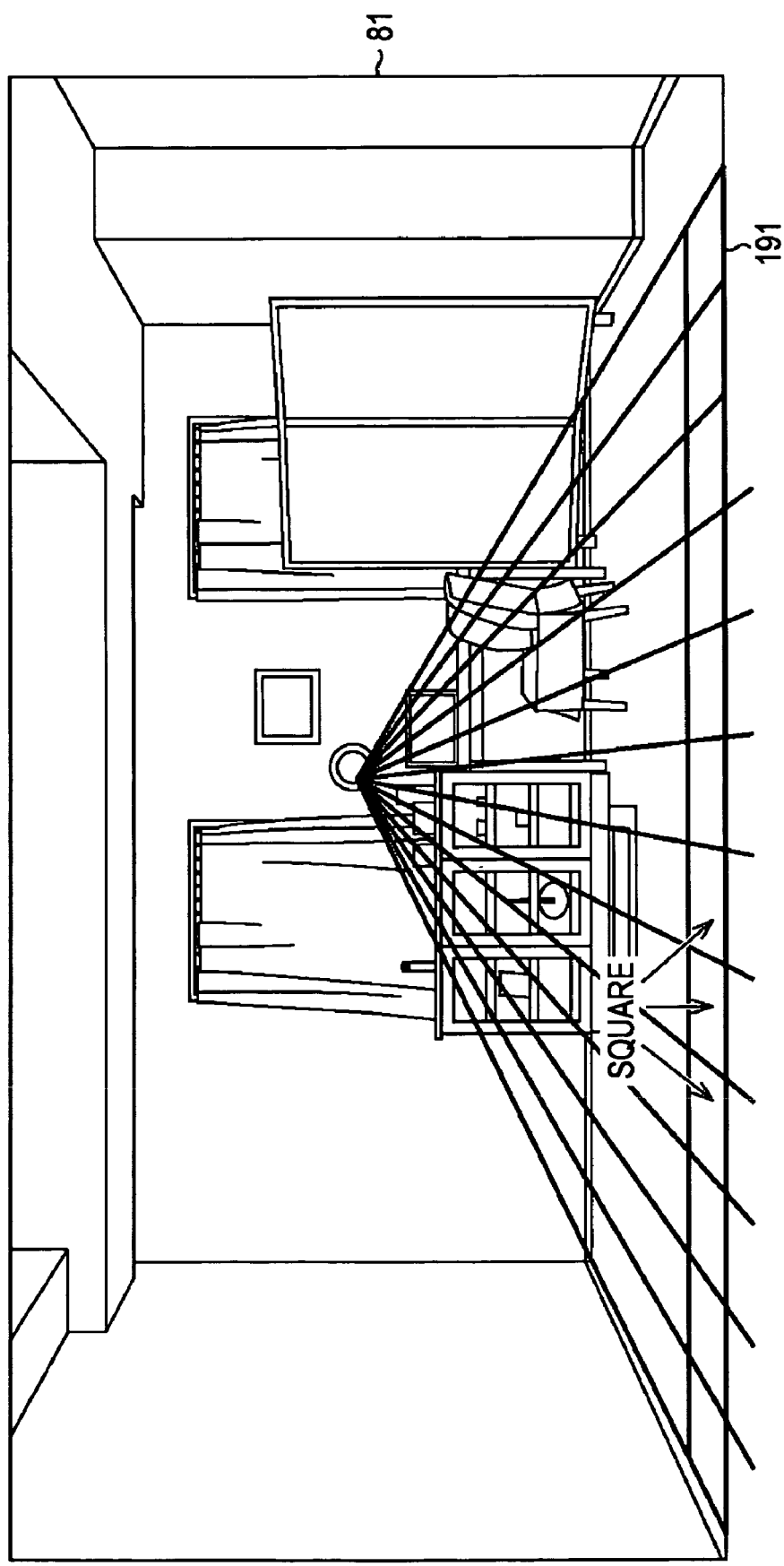
FIG. 15 is an illustration of horizontal parallel lines.

The horizontal parallel line drawing section 171 draws a base line which is perpendicular in an actual subject space to the supplied parallel lines in the depth direction and which indicates the width of the subject whose image is captured, and draws parallel lines in the horizontal direction on the basis of the base line. These parallel lines are called the "horizontal parallel lines". The horizontal parallel lines are drawn so as to be at intervals equal to those of the parallel lines in the depth direction. Specifically, the horizontal parallel lines are drawn so that, as shown in FIG. 15, after a base line 191 is drawn, the horizontal parallel lines are parallel to the base line 191 and distances among the horizontal parallel lines are equal to those of the parallel lines in the depth direction, that is, so that squares are drawn in the subject space by the parallel lines in the depth direction and the horizontal parallel lines. At this time, by drawing only the base line 191 and the first inner parallel line therefrom, and additionally drawing diagonals of the formed squares, other horizontal parallel lines can be easily drawn.

When the vanishing point estimating unit 52-2 described with reference to FIG. 6 is used as the vanishing point estimating unit 52, the parallel lines in the depth direction are not drawn. Thus, similarly to the depth-direction parallel-line extracting unit 71, described with reference to FIG. 3, of the vanishing point estimating unit 52-1, the horizontal parallel line drawing section 171 draws the parallel lines in the depth direction, and subsequently draws the horizontal parallel lines.

Figure 16:
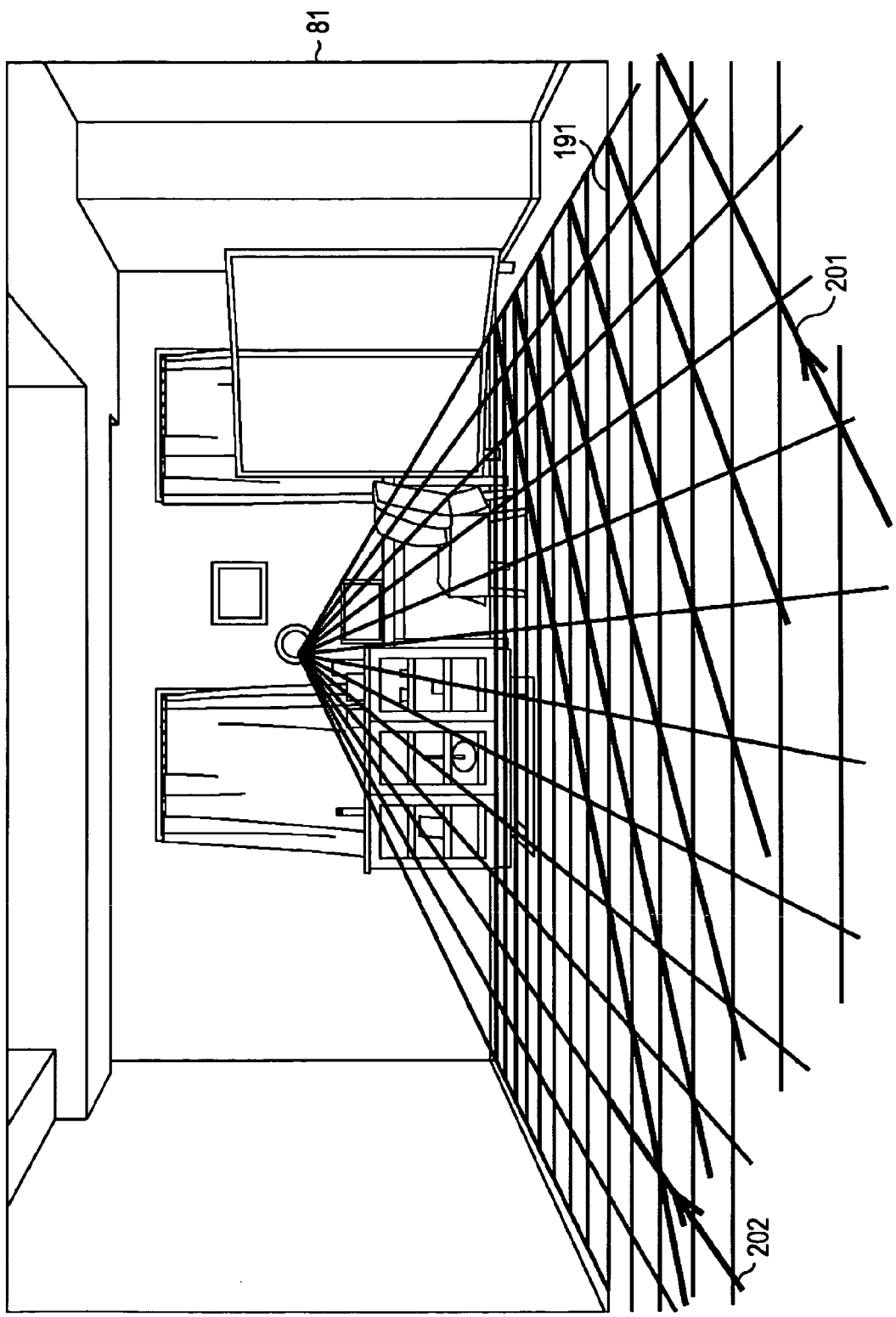
FIG. 16 is an illustration of extraction of parallel lines in a depth direction which are parallel to diagonals.

From the parallel lines in the depth direction and the diagonals of the squares, the parallel line extracting section 172 extracts those that are parallel to each other in the image. When the diagonals of the squares are drawn from the bottom left to top right in the image, any one of the diagonals on the right side of the image and any one of the parallel lines in the depth direction are parallel to each other in the image. As shown in FIG. 16, a diagonal 201 and a depth-direction parallel line 202 are parallel to each other. Thus, the diagonal 201 and the depth-direction parallel line 202 are extracted by the parallel line extracting section 172. In addition, when the diagonals of the squares are drawn from the bottom right to top left of the image, any one of the diagonals on the left side of the image and any one of the parallel lines in the depth direction on the right side of the image are parallel to each other in the image.

Figure 17:
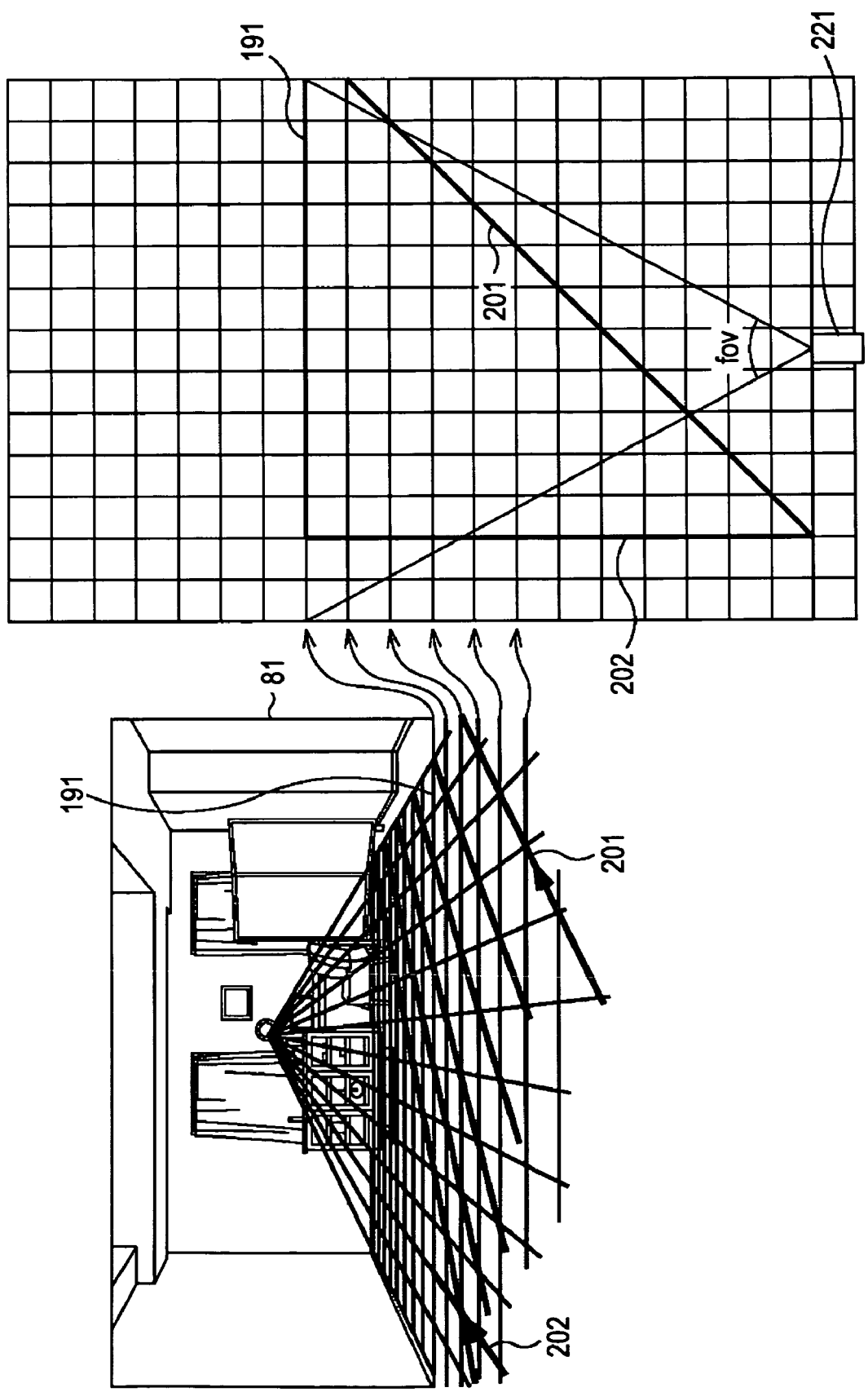
FIG. 17 consists of illustrations of generation of a tiled image and an estimated angle of view.

The tiled image generating section 173 generates a tiled image on the basis of the parallel lines in the depth direction and the horizontal parallel lines. Specifically, the tiled image generating section 173 generates a plan view obtained when an area including the subject and the camera is viewed from the top, and draws, in the plan view, as shown in FIG. 17, the parallel lines in the depth direction and the horizontal parallel lines in tiled (grided) form. The plan view in which the parallel lines in the depth direction and the horizontal parallel lines are drawn in tiled form is hereinafter referred to as the "tailed image".

The angle-of-view calculating section 174 calculates the angle of view of the camera on the basis of the tiled image generated by the tiled image generating section 173, the base line 191 drawn by the horizontal parallel line drawing section 171, and a pair of the depth-direction parallel line and the diagonal of the square which are extracted by the parallel line extracting section 172. In other words, as shown in FIG. 17, the angle-of-view calculating section 174 draws, in the tiled image, the diagonal 201 and depth-direction parallel line 202 extracted by the parallel line extracting section 172. The distance between the intersection of the diagonal 201 and the depth-direction parallel line 202 in the tiled image and the base line 191 corresponds to a depth distance between the camera used for capturing this image and the focus of the camera. In other words, it can be assumed that, in the tiled image, the intersection of the diagonal 201 and the depth-direction parallel line 202 is the position of a camera 221. The assumed position of the camera 221 corresponds to a viewpoint (viewpoint of the observer when the image 81 is a correct retinal image) in an image 81. In the tiled image, an angle between straight lines drawn from the camera 221 to ends of the base line 191 is a calculated angle of view.

In the case of FIG. 17, the angel of view, represented by fov, is calculated as approximately 57 degrees.

Although the horizontal parallel line drawing section 171 draws the horizontal parallel lines having intervals equal to those of the parallel lines in the depth direction, when an error occurs in each interval of the parallel lines in the depth direction and the horizontal parallel lines, an error occurs in the angel of view calculated by the angle-of-view calculating section 174.

Figure 18:
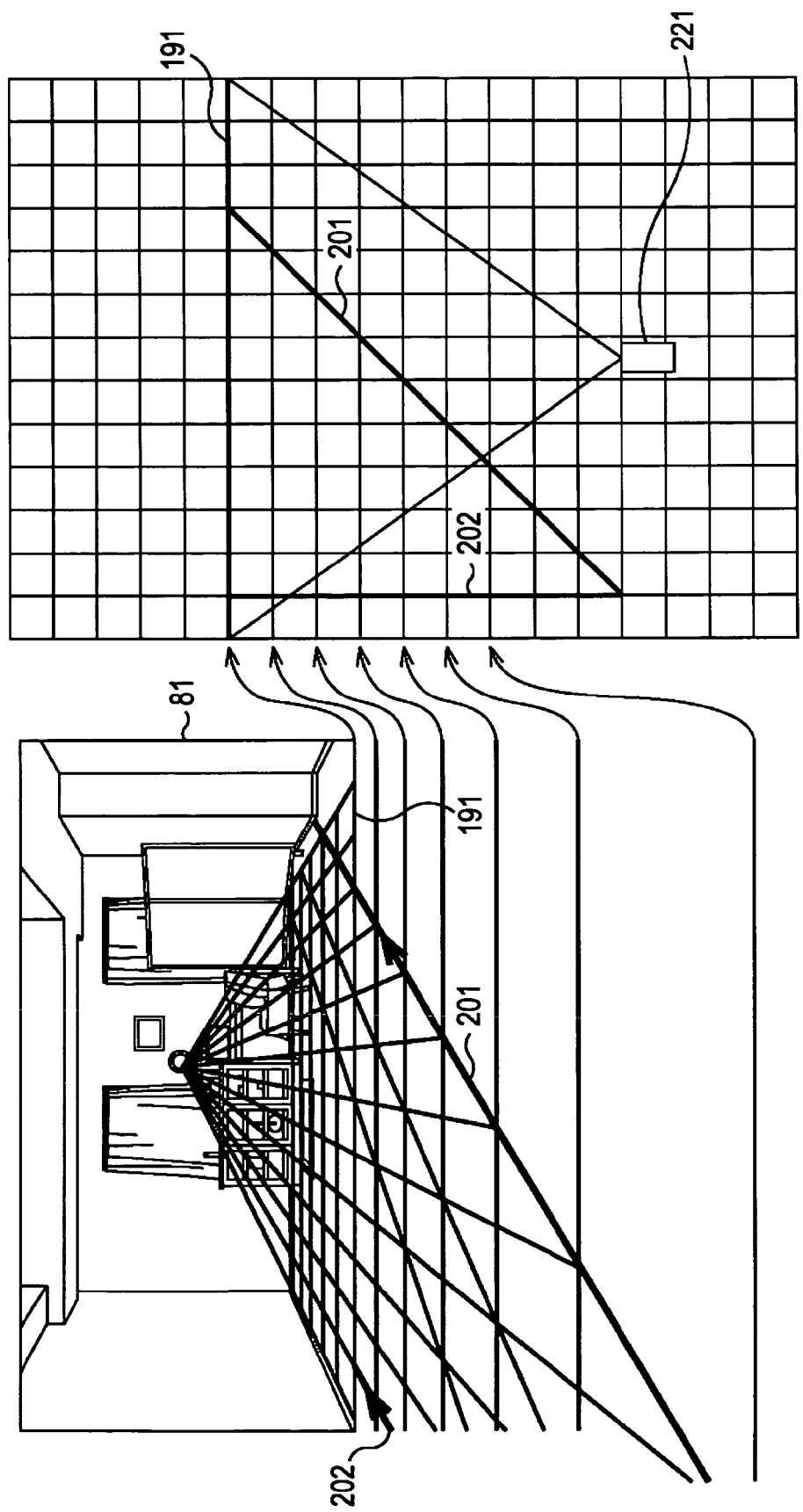
FIG. 18 consists of illustrations of a case in which an error occurs in drawing parallel lines in a depth direction.

As shown in, for example, FIG. 18, when the horizontal parallel lines are drawn at intervals different from those in the case described with reference to FIG. 17, an angle of view calculated by using the tiled image differs from that obtained in the case of FIG. 17.

In this case, after calculating the above-described elevation angle on the basis of the vanishing point estimated by the vanishing point estimating unit 52, and generating a perpendicularly-viewed image (for example, the image shown in FIG. 7 when the input image is the image shown in FIG. 8) corresponding to an image obtained when the input image is one captured from the top, the horizontal parallel lines may be drawn on the basis of the perpendicularly-viewed image.

Figure 19:
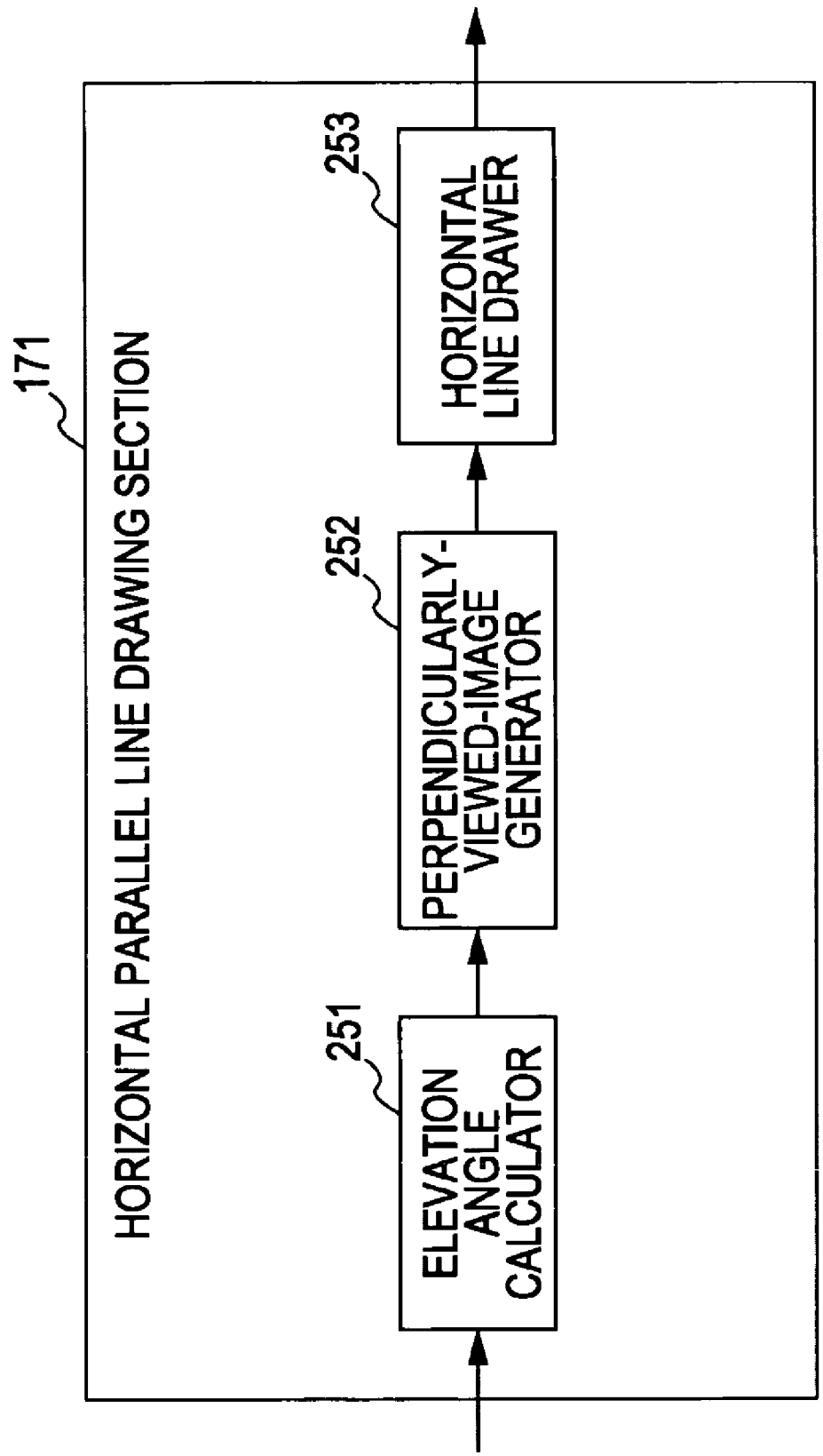
FIG. 19 is a block diagram illustrating an example of the configuration of the horizontal parallel line drawing section shown in FIG. 14.
Figure 20:
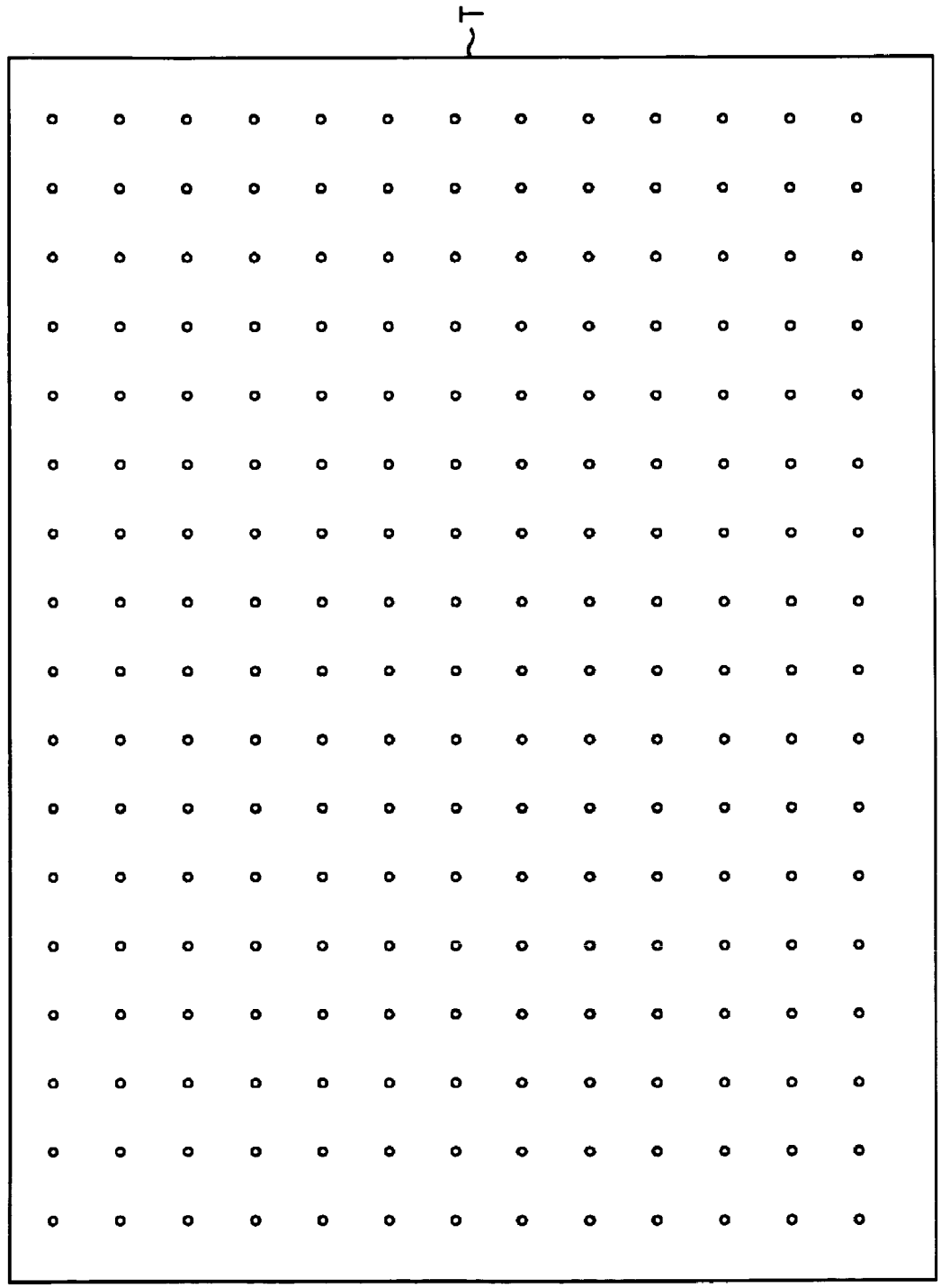
FIG. 20 is an illustration of an example of a subject.

FIG. 19 is a block diagram showing an example of the configuration of the horizontal parallel line drawing section 171 when the elevation angle can be calculated.

The horizontal parallel line drawing section 171 can include an elevation angle calculator 251, a perpendicularly-viewed-image generator 252, and a horizontal line drawer 253.

The elevation angle calculator 251 uses the coordinates of the vanishing point supplied from the vanishing point estimating unit 52 to calculate an elevation angle of the camera used when the input image is captured, and supplies the calculated elevation angle to the perpendicularly-viewed-image generator 252.

By using the calculated elevation angle supplied from the elevation angle calculator 251, the perpendicularly-viewed-image generator 252 transforms the input image into the perpendicularly-viewed image.

Next, processing that is executed by the elevation angle calculator 251 and the perpendicularly-viewed-image generator 252 is described below with reference to FIGS. 20 to 28.

Figure 21:
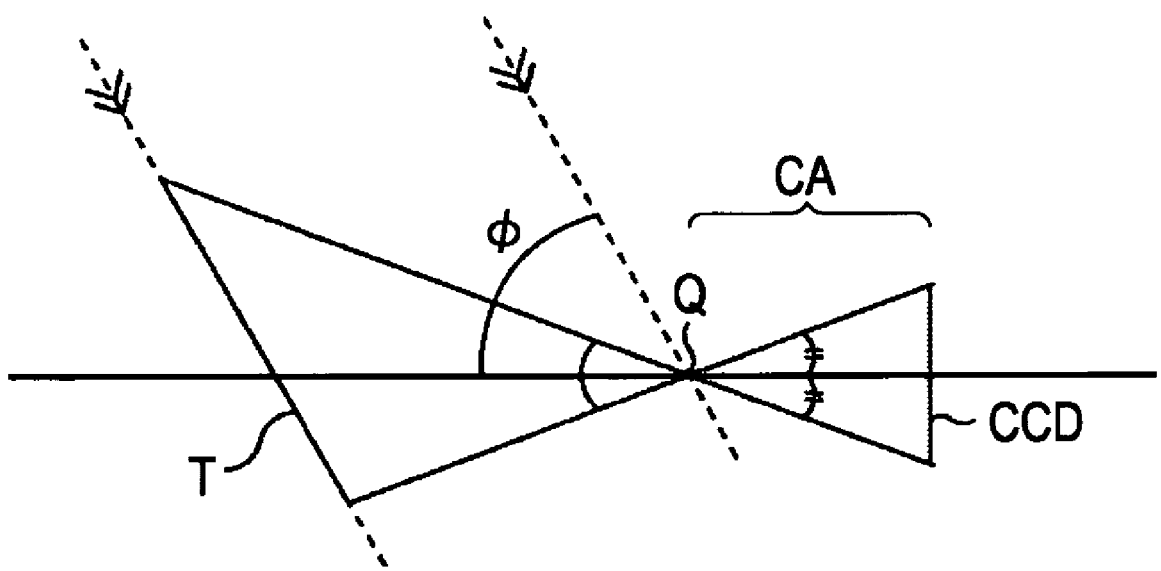
FIG. 21 is an illustration of the principle of image transformation.

By performing image capturing on, for example, an iron sheet T with holes therein at equal intervals, as shown in FIG. 21, at predetermined elevation angle ϕ by using a camera CA, an image Da can be obtained which has such a gradient that the hole pattern (texture) looks coarse at a position closer to the front side and looks fine at a position farther from the front side. The scale M in FIG. 22 indicates positions in the vertical direction (texture gradient direction) of the hole pattern.

Figure 23:
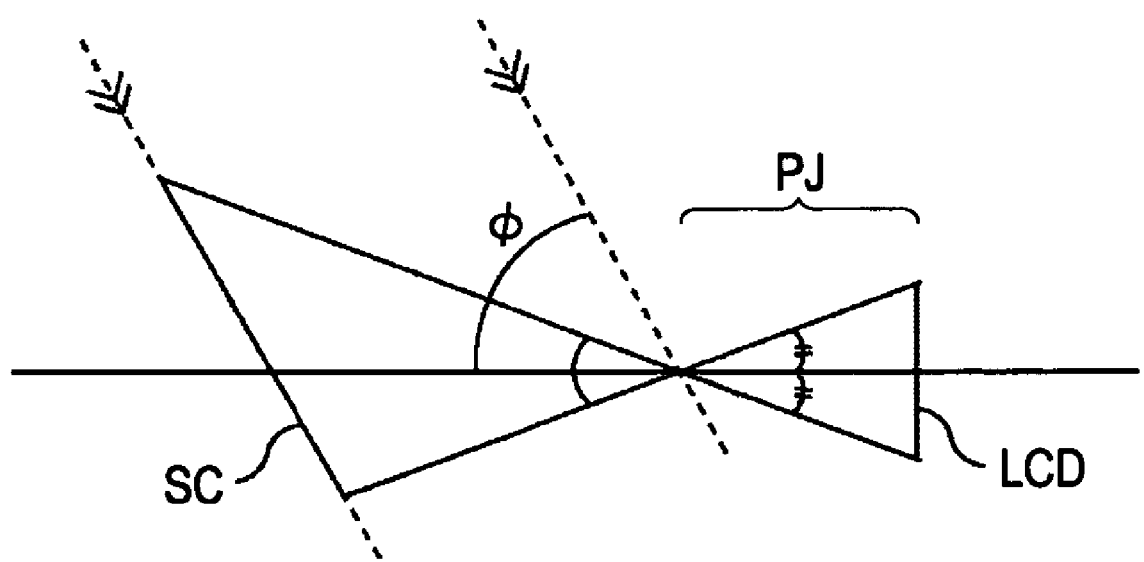
FIG. 23 is an illustration of the principle of image transformation on a captured image and a perpendicularly-viewed image.
Figure 24:
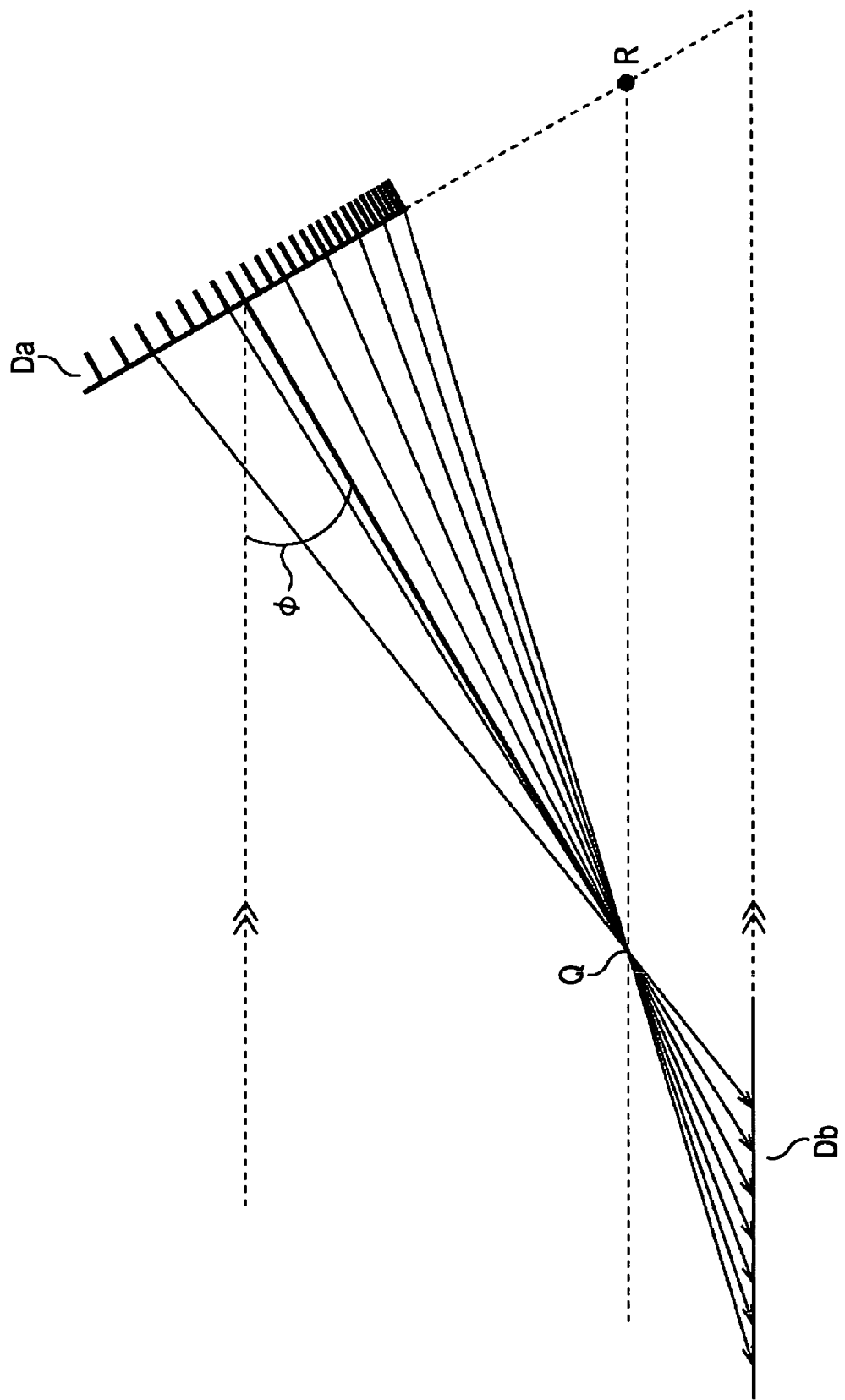
FIG. 24 is an illustration of the principle of image transformation on a captured image and a perpendicularly-viewed image.

Next, as shown in FIG. 23, by using a projector PJ to project the image Da having the above texture gradient on a screen SC inclined at an angle equal to elevation angle ϕ of the camera CA, an image Db of the iron sheet T in which, as shown in FIG. 24, the hole pattern has regular intervals similarly to the actual iron sheet T (FIG. 20) is displayed.

The bases of the arrows shown in FIG. 24 indicate predetermined vertical positions of the holes in the pattern of the image Da, and the tips of the arrows indicate vertical positions of holes in the pattern of the image Db which correspond to the holes in the pattern of the original image Da.

In other words, the perpendicularly-viewed-image generator 252 generates the perpendicularly-viewed image by using geometric relationships between pixel positions and the elevation angle (ϕ) of the perpendicularly-viewed image (image Db) and input image (image Da) shown in FIG. 24 to detect pixels of the input image which correspond to the pixels of the perpendicularly-viewed image, and setting the pixel values of the detected pixels of the input image in the pixels of the perpendicularly-viewed image.

Figure 22:
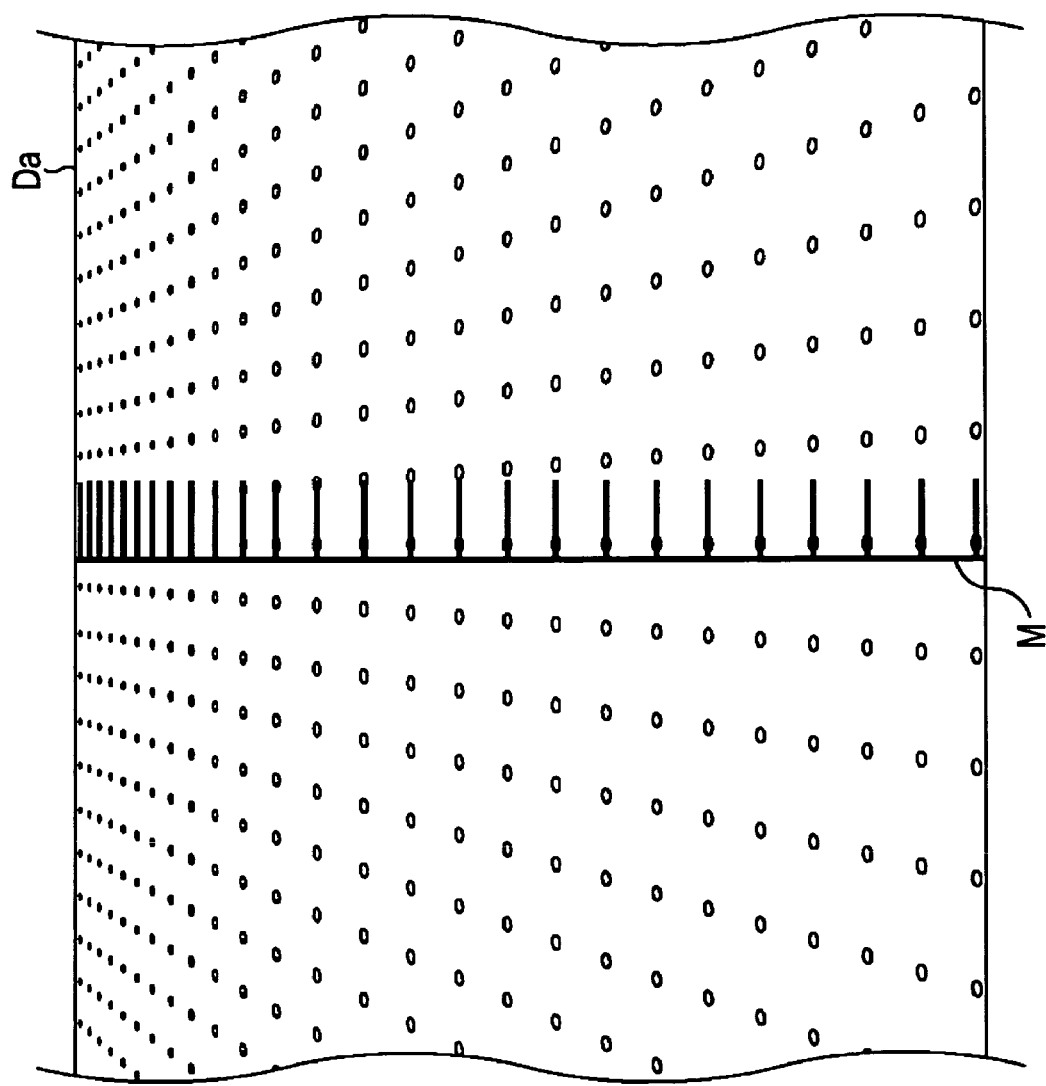
FIG. 22 is an illustration of an image captured for the subject shown in FIG. 20.

In the example shown in FIG. 22, the vanishing point R (accurately, a vanishing point image) exists in an upper portion of the image Da in which the vertical intervals in the hole pattern decrease. As shown in FIG. 24, the line connecting the vanishing point R and the focus Q is parallel to a subject plane (the screen surface in the example of FIG. 24). Thus, the elevation angle (angle between a camera optical axis and the subject plane) can be obtained by calculating the vanishing point R. In other words, for this reason, the elevation angle calculator 251 can calculate elevation angle ϕ by using the vanishing point R.

Figure 25:
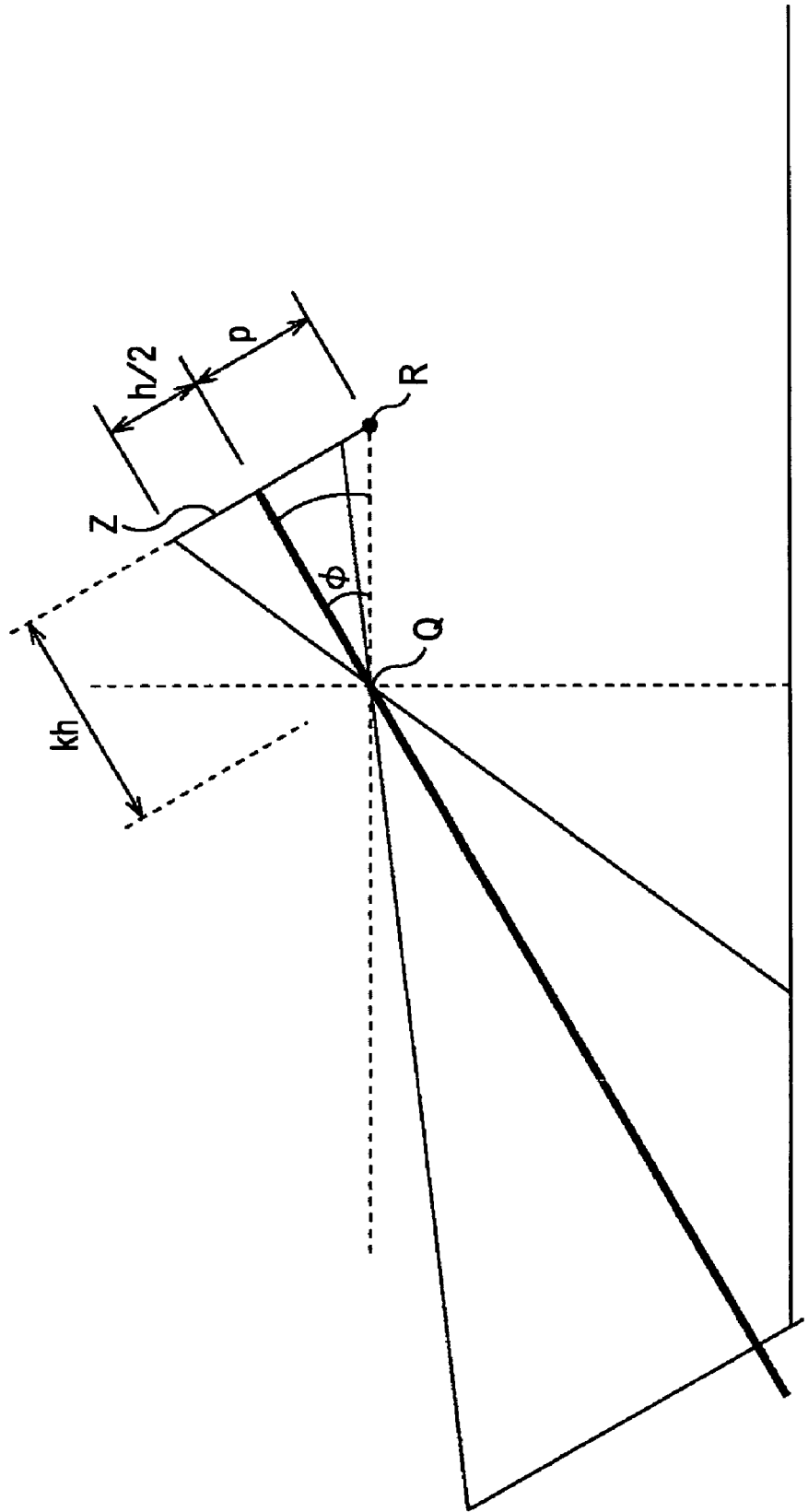
FIG. 25 is an illustration of the principle of image transformation on a captured image and a perpendicularly-viewed image.

As shown in FIG. 25, elevation angle ϕ is equal to an angle formed between the line connecting the vanishing point R and the focus Q and the line connecting the central point of an image forming plane Z. Elevation angle ϕ is calculated by $$\phi = \tan^{-1}(p/kh) = \tan^{-1}(r/k) \quad (1)$$

where p represents a distance between the central position and the vanishing point R in the input image shown in FIG. 13, h represents the Y-axial dimension (height) of the input image shown in FIG. 13, r represents p/h, and K represents a predetermined coefficient.

Figure 26:
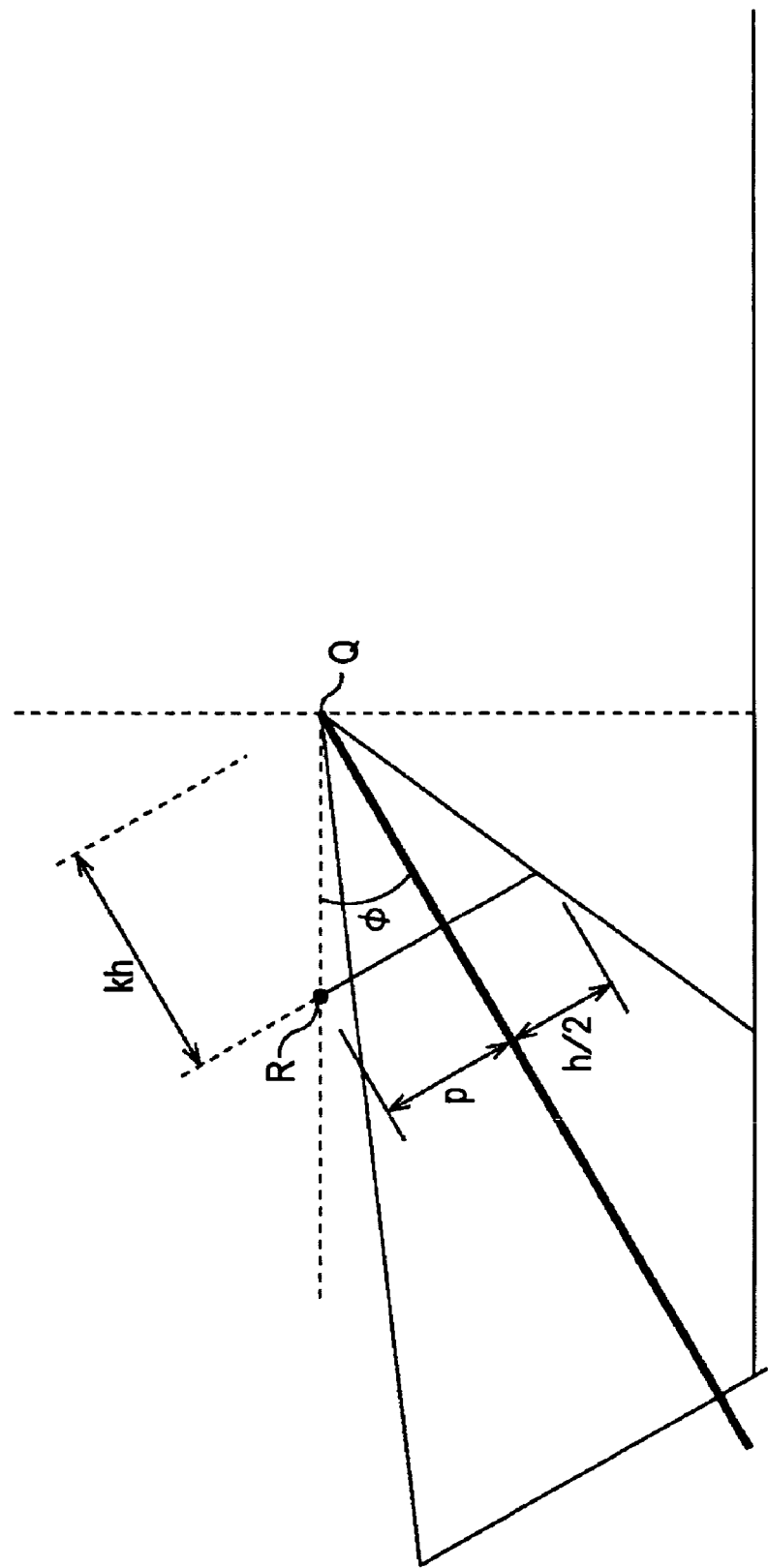
FIG. 26 is an illustration of the principle of image transformation on a captured image and a perpendicularly-viewed image.

In addition, the geometric relationships shown in FIG. 25 can be also shown in FIG. 26.

After the elevation angle ϕ is calculated as described above, the perpendicularly-viewed-image generator 252 uses the calculated elevation angle to transform the input image into the perpendicularly-viewed image.

Figure 27:
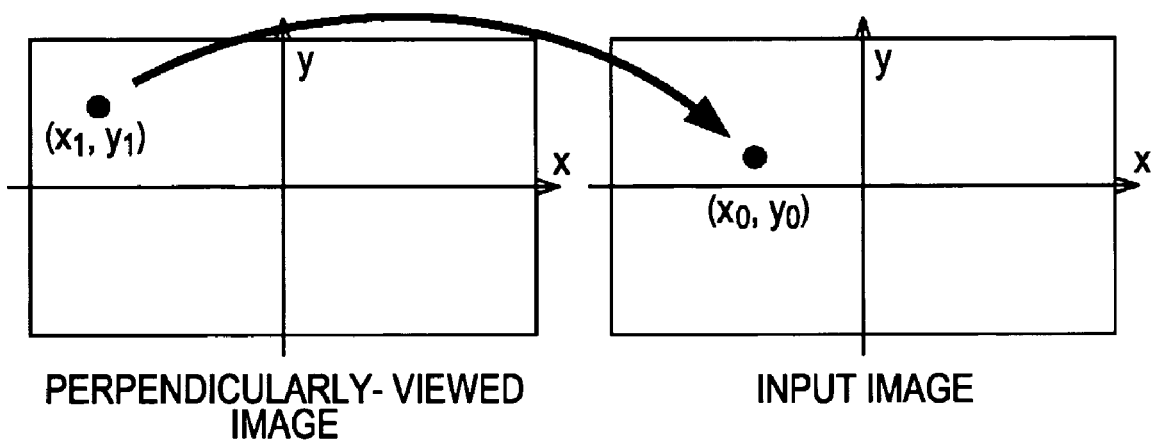
FIG. 27 has graphs of the principle of image transformation on a captured image and a perpendicularly-viewed image.

Specifically, as shown in FIG. 27, for each pixel, for example, pixel $(x_1, y_1)$ of the perpendicularly-viewed image, the perpendicularly-viewed-image generator 252 detects a corresponding pixel $(x_0, y_0)$.

Figure 28:
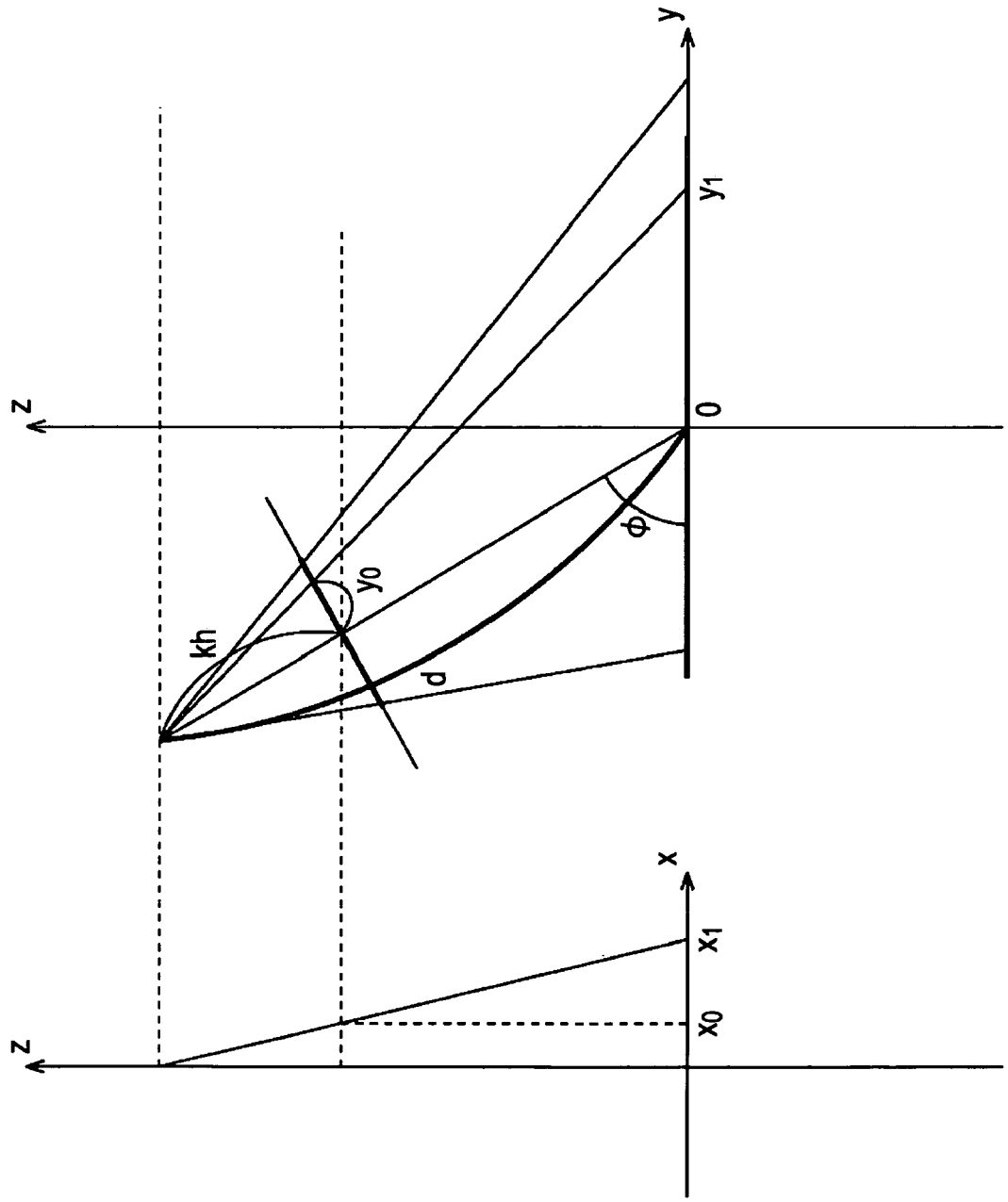
FIG. 28 is a graph illustrating the principle of image transformation on a captured image and a perpendicularly-viewed image.

The pixel $(x_1, y_1)$ of the perpendicularly-viewed image, the pixel $(x_0, y_0)$ of the input image, and elevation angle ϕ have the geometric relationships shown in FIG. 28. Thus, the pixel $(x_0, y_0)$ of the input image corresponding to the pixel $(x_1, y_1)$ of the perpendicularly-viewed image can be found by the following expressions:

$$y_0 = \frac{y_1 \sin\phi}{d + y_1 \cos\phi} kh \quad (2)$$

$$x_0 = \frac{x_1}{d + y_1 \cos\phi} kh$$

By using these expressions, when the input image is supplied, an actual pattern on the subject plane can be estimated.

By drawing depth-direction horizontal parallel lines and horizontal parallel lines on the perpendicularly-viewed image generated by the perpendicularly-viewed-image generator 252, and subsequently executing inverse transformation to the transformation executed by the perpendicularly-viewed-image generator 252, the horizontal line drawer 253 generates image data of an image in which, as described with reference to FIGS. 16 and 17, correct parallel lines in the depth direction and horizontal parallel lines are drawn, and supplies the image data to the parallel line extracting section 172.

Figure 29:
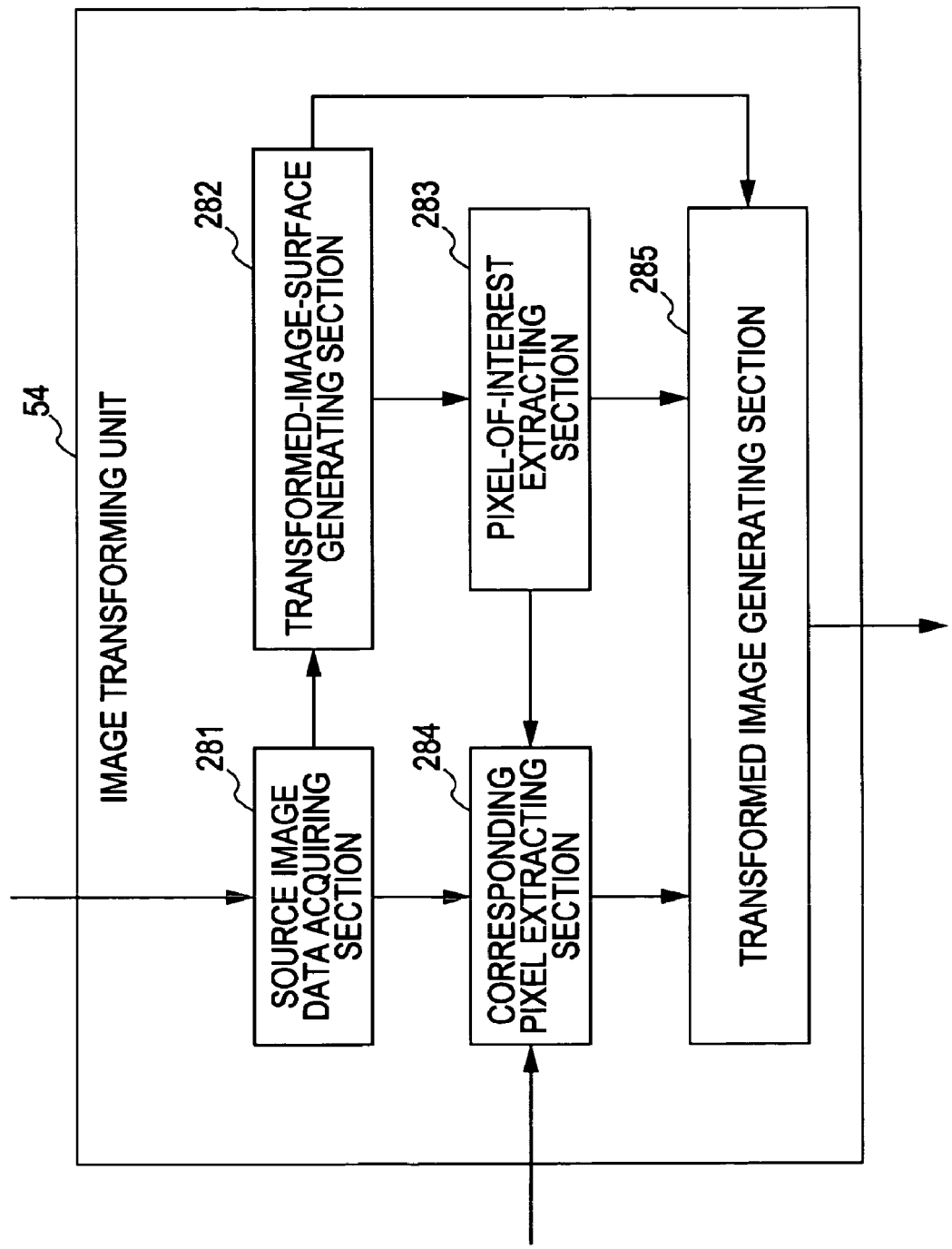
FIG. 29 is a block diagram illustrating an example of the configuration of the image transforming unit shown in FIG. 2.

Next, FIG. 29 is a block diagram showing an example of the configuration of the image transforming unit 54 shown in FIG. 2.

Figure 30:
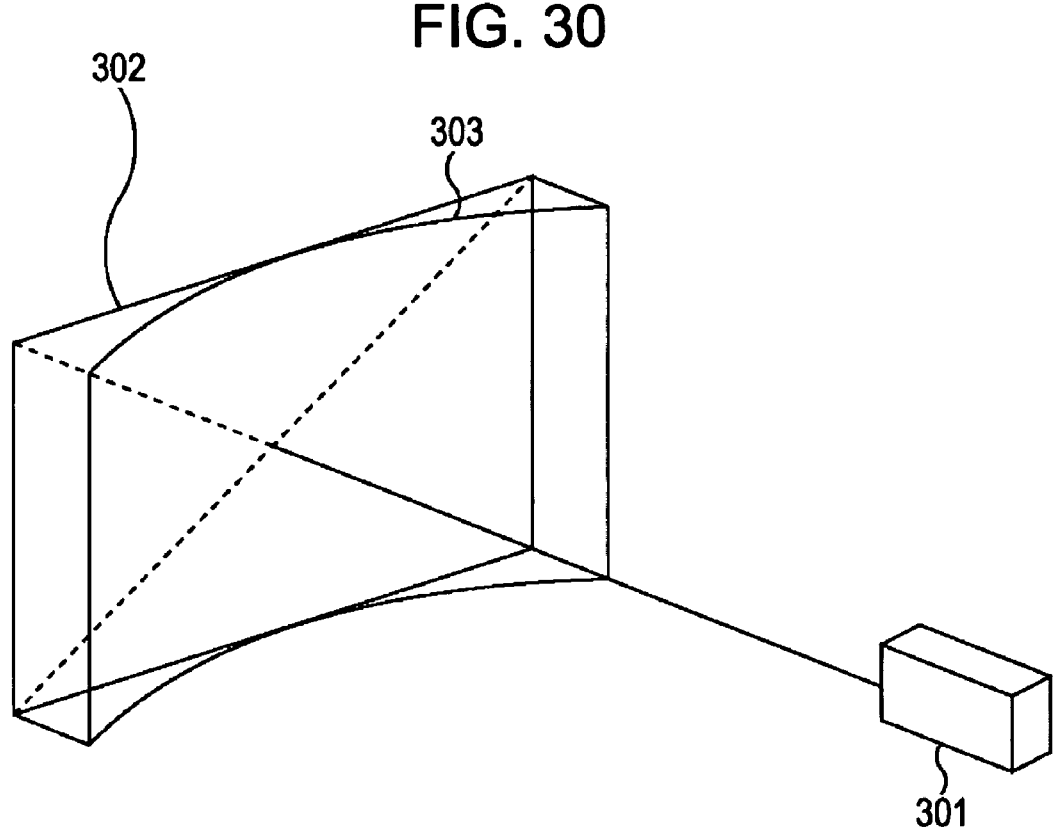
FIG. 30 is an illustration of an image-forming screen for an ordinary image and a virtual image-forming screen.

Although an ordinary image based on a pinhole camera model is designed so that the image can be formed on a plane screen, the image transforming unit 54 can perform transformation into an image obtained when the image formed on the plane screen is formed on a screen formed by a curved surface portion included in a cylinder. In other words, the image transforming unit 54 can perform transformation into an image obtained when an image on a plane screen is projected onto a screen formed by a curved surface portion which is included in a cylinder and which corresponds to an angle of view, while using, as a reference position, a position which is the center of the cylinder and which serves as a horizontal line height. For example, as shown in FIG. 30, an image captured by a camera 301 and supplied to the camera 301 is projected onto an ordinary imaging screen 302. Unlike that, a virtual imaging screen 303 whose shape is a cutout of a cylinder is assumed. The image transforming unit 54 transforms the image supplied to the image processing apparatus 41, that is, the image projected onto the virtual imaging screen 303, into an image that is formed on the virtual imaging screen 303.

The source image data acquiring section 281 acquires the image supplied from the angle-of-view estimating unit 53 and supplied to the image processing apparatus 41, that is, image data of the image prior to transformation. The source image data acquiring section 281 supplies the acquired image data to the corresponding pixel extracting section 284, and supplies a transformed image surface generating section 282 with dimension information prior to transformation.

On the basis of the dimension information of the image prior to transformation which is supplied from the source image data acquiring section 281, the transformed image surface generating section 282 prepares a surface of an output image equal in dimension to the source image and supplies the surface of the output image to the pixel-of-interest extracting section 283 and the transformed image generating section 285.

The pixel-of-interest extracting section 283 extracts a pixel of interest from the surface of a transformed image which is supplied from the pixel-of-interest extracting section 283, and supplies information of the pixel of interest to the corresponding pixel extracting section 284 and the transformed image generating section 285.

For each pixel of the transformed image, which is represented by the coordinate information supplied from the pixel-of-interest extracting section 283, the corresponding pixel extracting section 284 calculates a corresponding pixel in the transformed image on the basis of the estimated angle of view supplied from the angle-of-view estimating unit 53, and supplies the pixel value of the corresponding pixel to the transformed image generating section 285.

Figure 31:
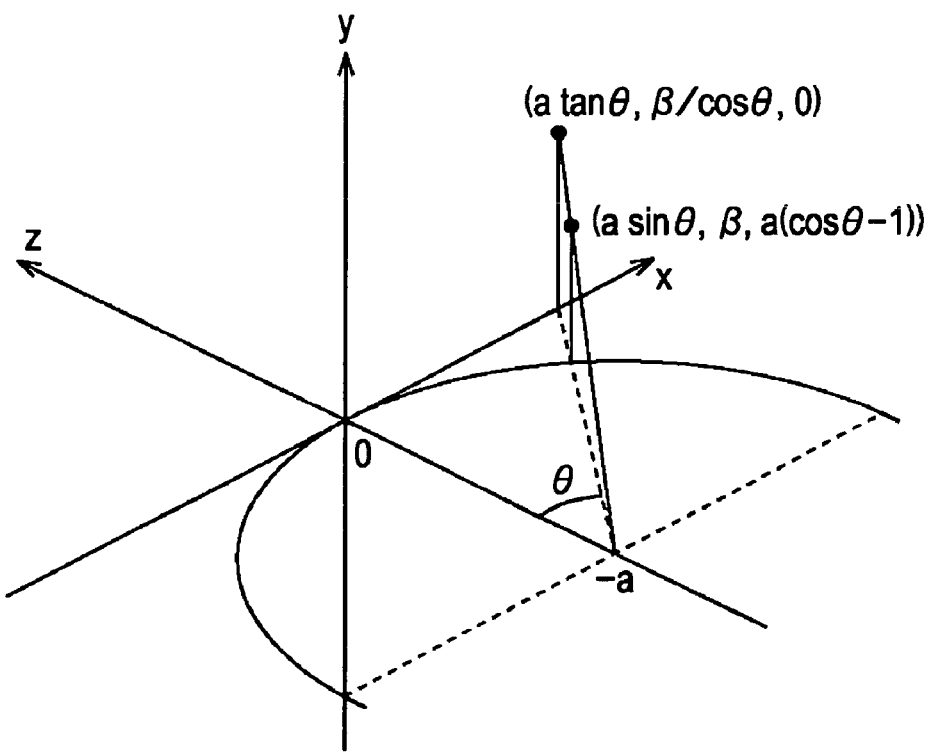
FIG. 31 is a graph of correspondences in pixel position between two screens.

Specifically, as shown in FIG. 31, when a cylindrical screen having radius a abuts on a plane screen, the corresponding pixel extracting section 284 finds to which of pixel positions on the plane screen each pixel of an image formed in at least part of the cylindrical screen having radius a corresponds. Radius a of the cylindrical screen is determined by an angle of view and horizontal width of the image prior to transformation. In other words, the value of a is a value at which tan θ=1/a when ½ of the horizontal width of the image prior to transformation is 1 and ½ of the angle of view is θ.

It is assumed that origin (0, 0, 0) in an xyz coordinate system be a point on a crossing line between the cylindrical screen having radius a and the plane screen and be coordinates having a height (i.e., the height of the horizontal line) equal to that of the vanishing point, and the central point of the cylindrical screen having radius a is represented by (0, 0, −a). When a set of coordinates on the cylindrical screen having radius a is represented by (θ, β) on the basis of angle θ from a z-axis on an x-y plane and y-axial coordinate β, and the set of coordinates is transformed into the xyz coordinate system, the obtained coordinates are (a sin θ, β, A(cos θ−1)). Therefore, a set of coordinates corresponding to pixel (θ, β) of an image formed on the cylindrical having radius a is a point at which a straight line connecting central position (0, 0, −a) and coordinates (a sin θ, β, A(cos θ−1)) cross an x-y plane, and has values (a tan θ, β/cos θ, 0).

Figure 32:
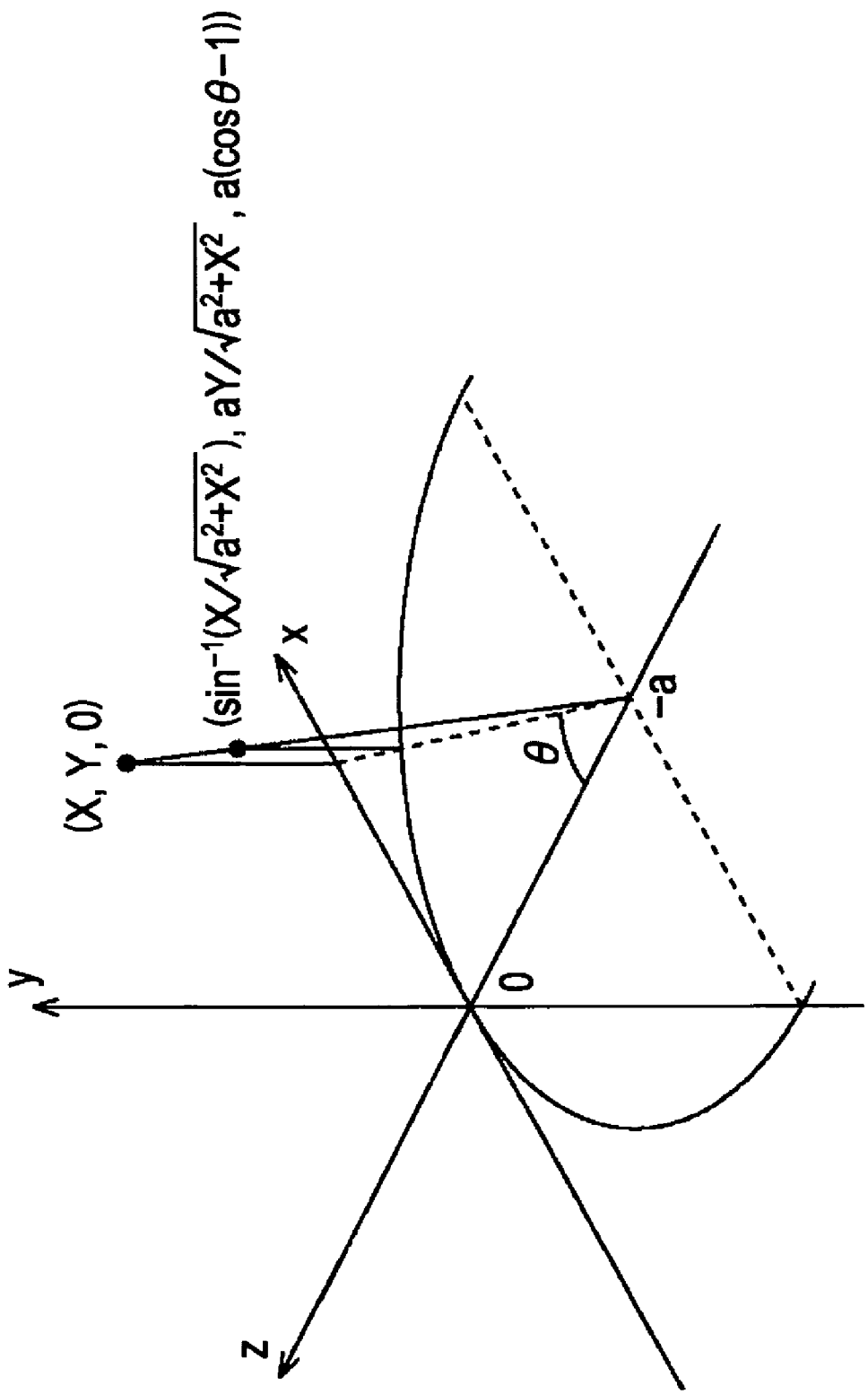
FIG. 32 is a graph of correspondences in pixel position between two screens.

In addition, as shown in FIG. 32, when the cylindrical screen having radius a and the plane screen abut on each other, the corresponding pixel extracting section 284 may find to which of pixel positions in at least part of the cylindrical screen having radius "a" each pixel on the plane screen corresponds.

Similarly to the case described with reference to FIG. 31, it is assumed that origin (0, 0, 0) in the xyz coordinate system be a point on a crossing line between the cylindrical screen having radius a and the plane screen and be coordinates being equal in height (i.e., the height of the horizontal line) to the vanishing point. When the central point of the cylindrical screen having radius a is represented by coordinates (0, 0, −a), coordinates on the cylindrical screen which correspond to coordinates (X, Y, 0) on the plane screen represent a point at which a straight line connecting central point (0, 0, −a) and coordinates (X, Y, 0) crosses the cylindrical screen and are represented by $$(\sin^{-1}(X/\sqrt{a^2+X^2}), aY/\sqrt{a^2+X^2}, a(\cos\theta-1)) \quad (3)$$

The transformed image generating section 285 generates and supplies the transformed image to the image data output unit 55 by using the above-described method to repeatedly perform an operation of copying the pixel value, supplied from the corresponding pixel extracting section 284, of a corresponding pixel of the source image into the position of a pixel of interest of the transformed image surface.

When comparing the method described with reference to FIG. 31 and the method described with reference to FIG. 32, in the method described with reference to FIG. 31, finally generated image data is free from lack of pixels. It is preferable for the corresponding pixel extracting section 284 to use the method described with reference to FIG. 31 to find, for each pixel of the transformed image, a corresponding pixel of the transformed image.

FIGS. 31 and 32 illustrate a case in which the virtual imaging screen 303 that is part of the cylinder having radius a abuts on the ordinary imaging screen 302. However, even if transformation is performed assuming a case in which the virtual imaging screen 303 and the ordinary imaging screen 302 do not abut on each other, the transformation is similar to that in the above-described case. In other words, onto an area (area in which a central angle of a sector formed by a central point and a screen) corresponding to an angle of view on a cylinder having a predetermined radius, an image on a plane screen which has the same angle of view may be projected. The radius of the cylinder is determined by the angle of view and a positional relationship between screens. In addition, the size of the transformed image surface is also determined by the angle of view and the positional relationship between the screens.

Figure 33:
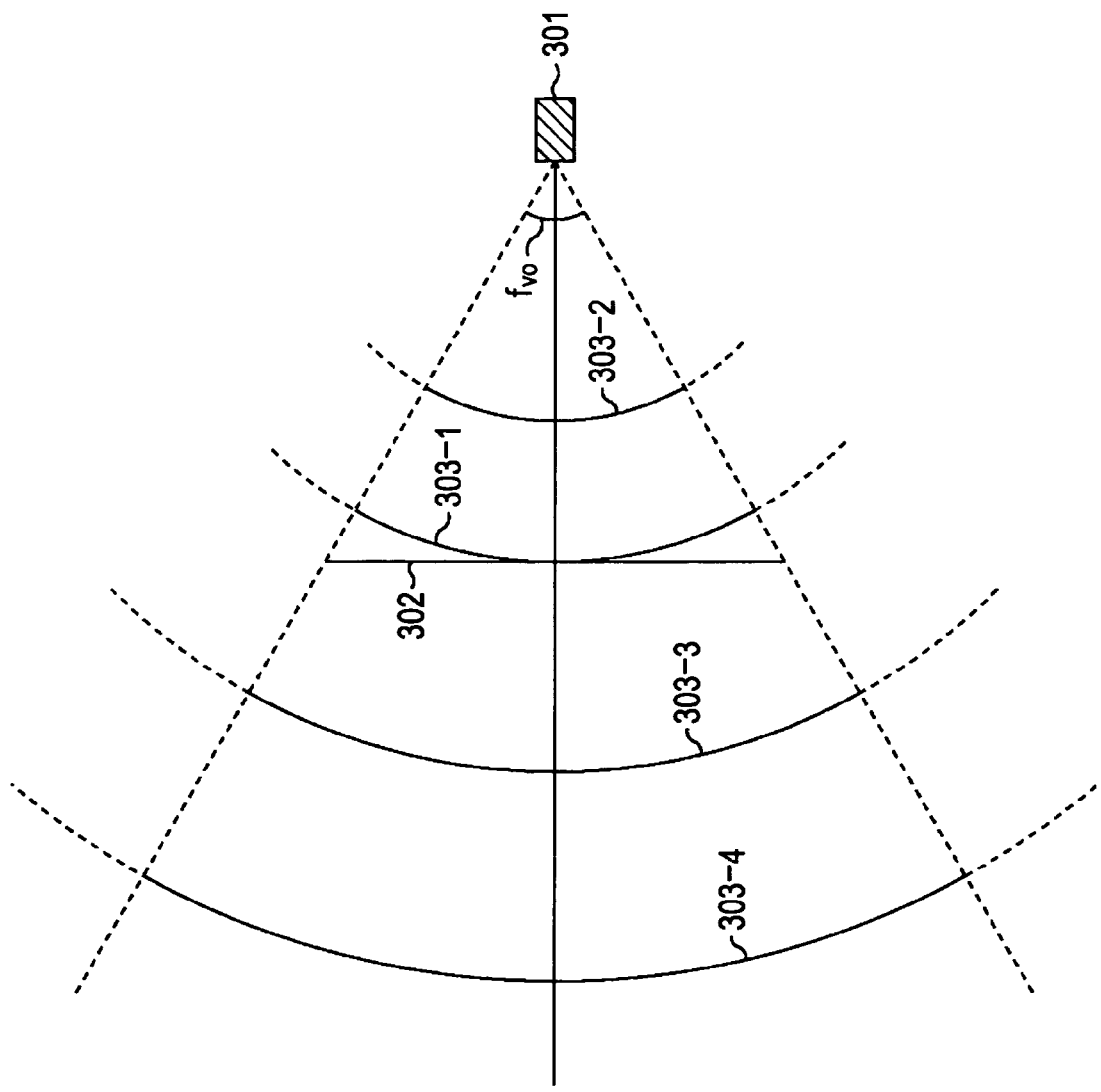
FIG. 33 is an illustration of the positions of an image-forming screen for an ordinary image and a virtual image-forming screen.

In other words, as shown in FIG. 33, if, between an image prior to transformation which is formed on the ordinary imaging screen 302 and each of transformed images formed virtual imaging screens 303-1 to 303-4, image projection is performed so as to have the same angle of view and viewpoint (the position of the camera 301, that is, a point corresponding to central point (0, 0, −a)), transformation that is basically similar to that in the above-described case can be performed, even if the ordinary imaging screen 302 exists outside or inside the cylinder including the virtual imaging screen 303.

Figure 34:
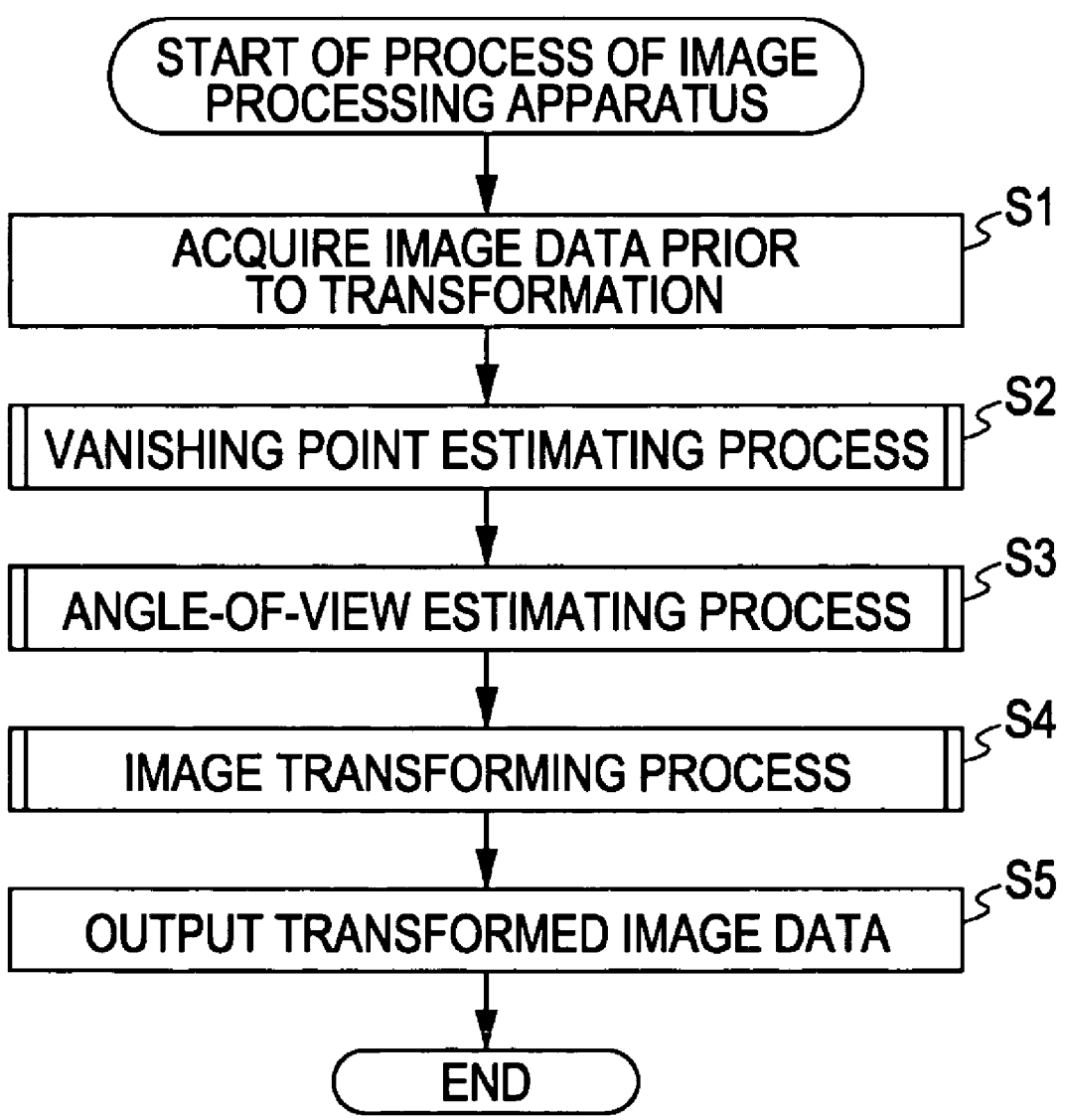
FIG. 34 is a flowchart illustrating a process of the image processing apparatus.

Next, a process executed by the image processing apparatus 41 shown in FIG. 2 is described below with reference to the flowchart shown in FIG. 34.

In step S1, the image data acquiring unit 51 acquires image data prior to transformation and supplies the acquired image data to the vanishing point estimating unit 52.

Figure 35:
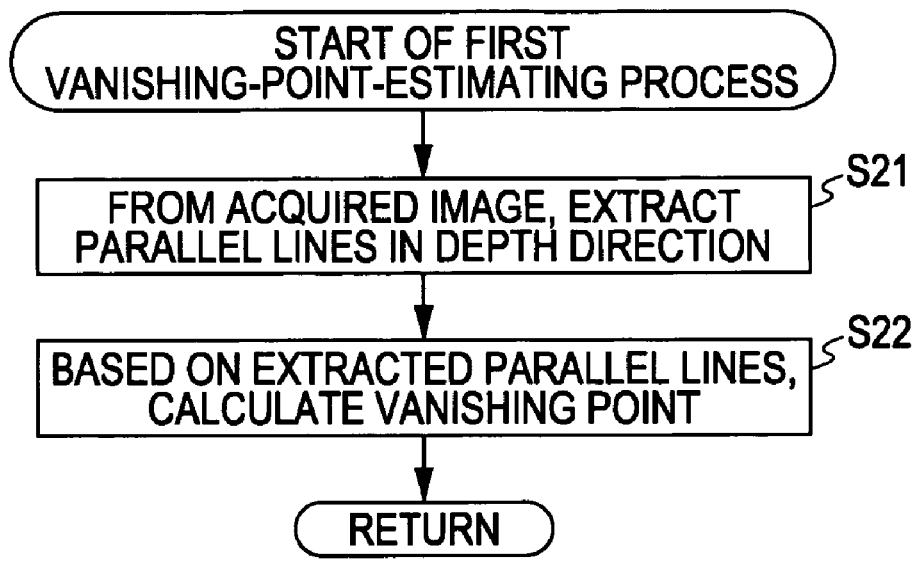
FIG. 35 is a flowchart illustrating a first vanishing-point-estimating process.

In step S2, the vanishing point estimating unit 52 executes a first vanishing-point-estimating process, which is described later with reference to FIG. 35, or a second vanishing-point-estimating process, which is described later with reference to FIG. 36.

Figure 41:
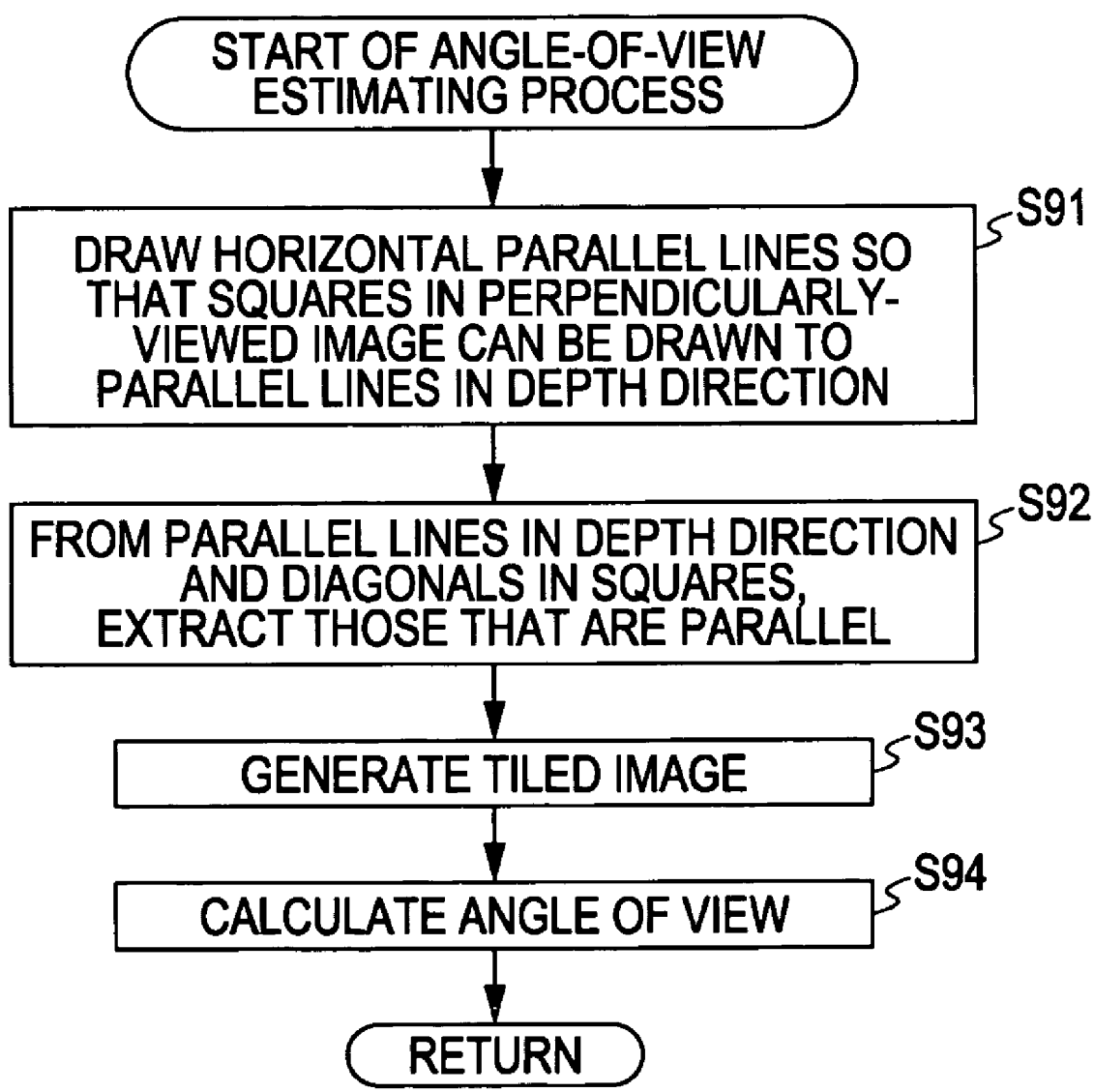
FIG. 41 is a flowchart illustrating an angle-of-view estimating process.

In step S3, the angle-of-view estimating unit 53 executes an angle-of-view estimating process, which is described later with reference to FIG. 41.

Figure 43:
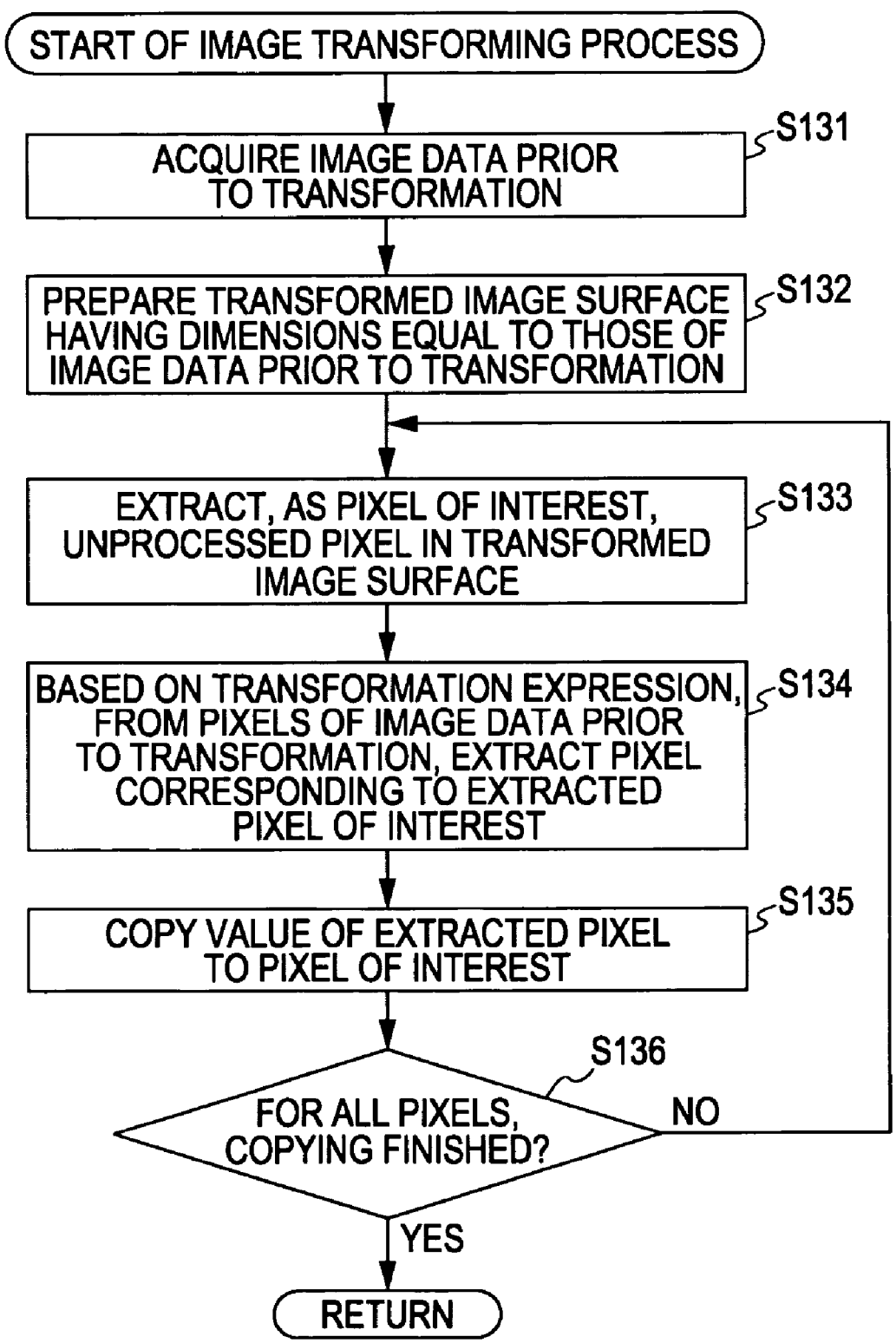
FIG. 43 is a flowchart illustrating an image transforming process.

In step S4, the image transforming unit 54 executes an image transforming process, which is described later with reference to FIG. 43.

After calculating a vanishing point in step S1, estimating an angle of view in step S3, and generating transformed image data by performing transformation in step S4, in step S5, the generated transformed image data is supplied to the image data output unit 55 and the image data output unit 55 outputs the supplied image data before the process finishes.

As described above, the image processing apparatus 41 in FIG. 2 calculates a vanishing point, estimates an angle of view, transforms image data on the basis of the angle of view, and outputs the transformed image data. The output image data is displayed on a large planar display, printed out, recorded on a predetermined recording medium, and conveyed through a predetermined communication medium.

Next, the first vanishing-point-estimating process executed in step S2 in FIG. 34 by the vanishing point estimating unit 52-1 described with reference to FIG. 3 is described below.

In step S21, by extracting, from the image acquired by the image data acquiring unit 51, straight lines which are parallel to the ground (horizontal plane) and which extend from the front to inner side of the image (in a direction identical to the direction of the camera viewpoint), the depth-direction parallel-line extracting unit 71 extracts parallel lines at equal intervals in the depth direction, as described with reference to FIG. 5.

In step S22, the vanishing point calculating unit 72 calculates the vanishing point by calculating an intersection on the image of the parallel lines in the depth direction which are extracted by the depth-direction parallel-line extracting unit 71, as described with reference to FIG. 5. After that, the process returns to step S2 in FIG. 34 and proceeds to step S3.

In this processing, on the basis of the parallel lines in the depth direction of the image data, the vanishing point is estimated.

Next, the second vanishing-point-estimating process executed in step S2 in FIG. 34 by the vanishing point estimating unit 52-2 described with reference to FIG. 6 is described below with reference to FIG. 36.

In step S41, the feature value extracting section 131 extracts a feature value of each pixel in the input image. For example, a color-difference value or edge intensity of each pixel is extracted as the feature value. When the edge intensity is used as the feature value, the image data acquiring unit 51 uses a differential filter (not shown) to enhance an edge of the input image and extracts the edge intensity.

In step S42, the quantizing section 132 quantizes the feature value of the input image on the basis of the feature value of the pixel extracted in step S41.

When the feature value is, for example, the color-difference value, the pixel value of each pixel having a color-difference value equal to a predetermined reference value is set to have 1, and the pixel value of each pixel having a different color-difference value is set to have 0.

Figure 9:
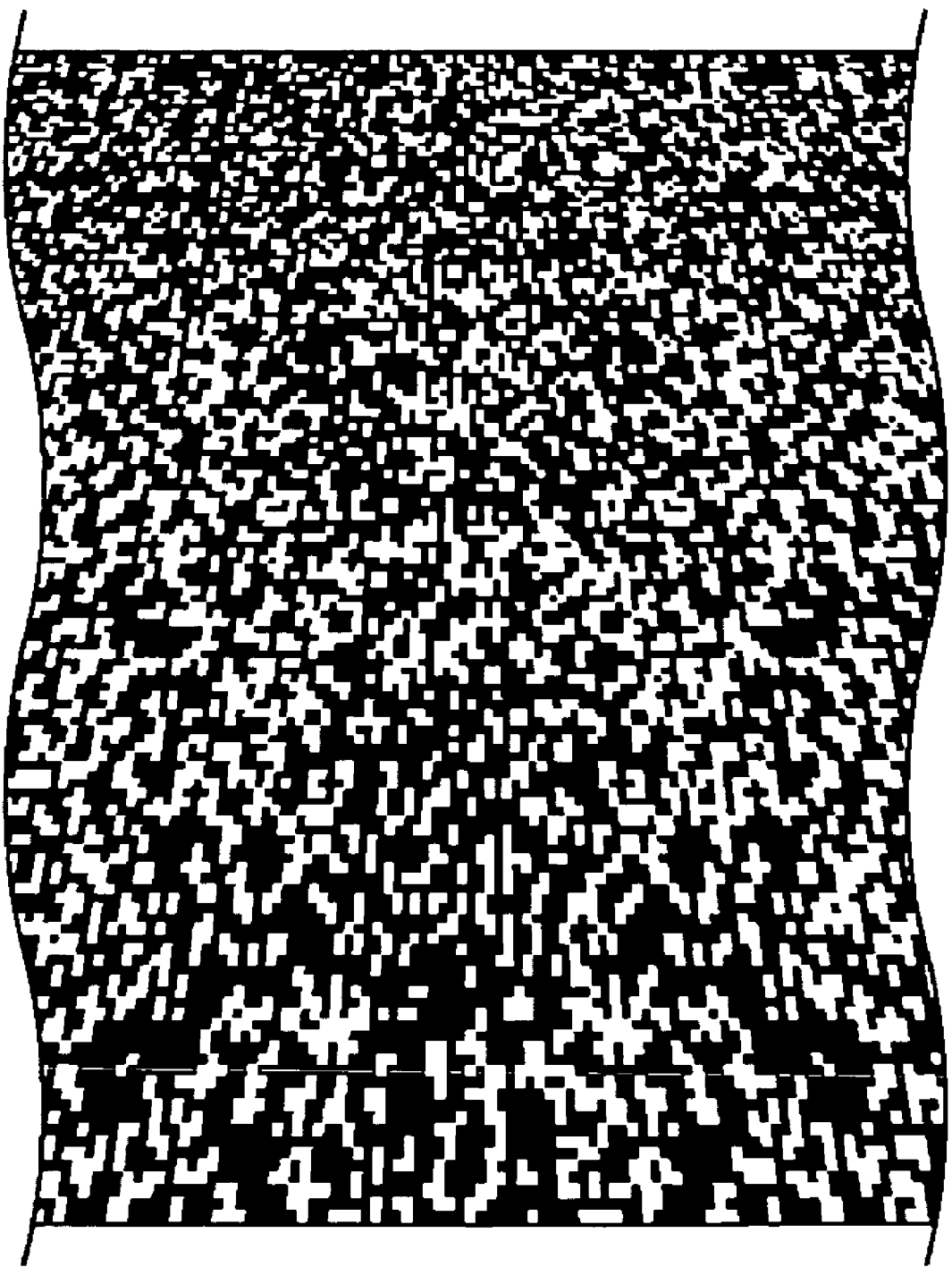
FIG. 9 is an illustration of quantized data.
Figure 10:
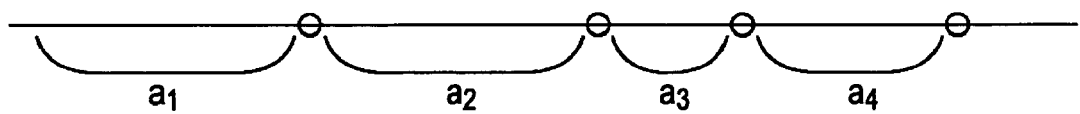
FIG. 10 is an illustration of the average value of distances of texture.

For example, the input image shown in FIG. 8 is quantized to the state shown in FIG. 9. In FIG. 9, white points indicate pixels having values 1's and black points indicate pixels having values 0's.

In step S43, in processing by the texture gradient calculating section 133 and the vanishing point calculating section 134, the vanishing point is calculated. The process returns to step S2, and proceeds to step S3.

Specifically, from the quantized data (FIG. 9) obtained in step S42, the texture gradient calculating section 133 calculates the average value (texture gradient data) of distances between white points (texture) in units of lines. As described with reference to, FIG. 10, when pixels having values 1's are arranged in a predetermined line, the average value of distances $a_1$, $a_2$, $a_3$, and $a_4$ therebetween is calculated.

The texture gradient calculating section 133 sets a regression line on the basis of the average values calculated in units of lines, which are represented by AV (FIG. 12), as described with reference to FIG. 12. In other words, the regression line corresponds to a texture gradient.

The quantizing section 132 calculates, as the vanishing point, an intersection between the set regression line and the Y-axis (the Y-axis on the input image).

In this processing, the vanishing point is calculated on the basis of the texture gradient.

Figure 36:
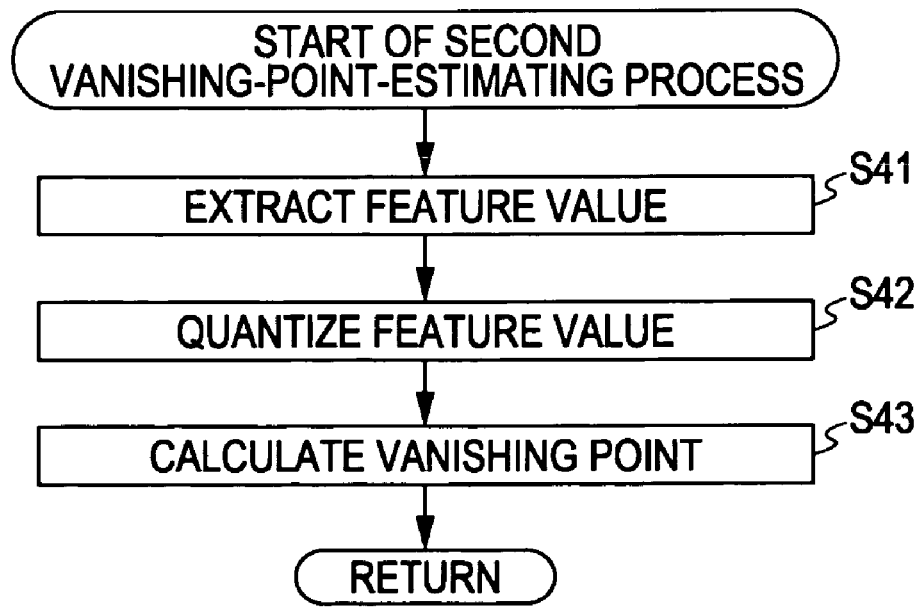
FIG. 36 is a flowchart illustrating a second vanishing-point-estimating process.
Figure 37:
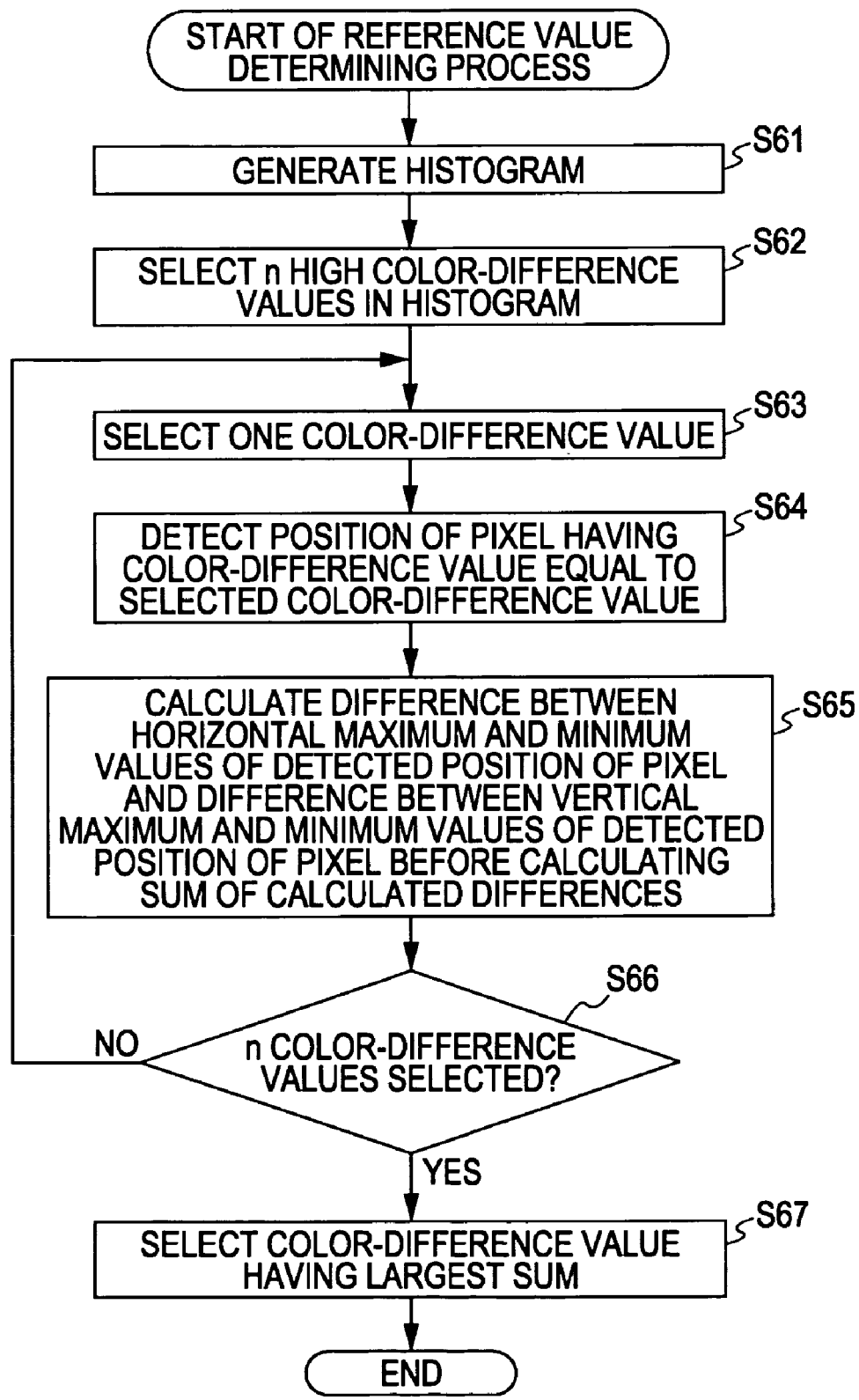
FIG. 37 is a flowchart illustrating a reference value determining process.

In step S41 in FIG. 36, the feature value extracting section 131 extracts a feature value of each pixel in the input image. As the feature value, for example, the color-difference value and edge intensity of the pixel is extracted.

A reference value determining process that is executed in step S41 in FIG. 36 by the feature value extracting section 131 when the color-difference value is used as the feature value is described below.

In step S61, the feature value extracting section 131 generates a histogram of predetermined feature values (color-difference values in this example) from the input image.

In step S62, the feature value extracting section 131 selects n color-difference values having high frequencies in the histogram generated in step S61.

In step S63, the feature value extracting section 131 selects one color-difference value from the n color-difference values selected in step S62. In step S64, the feature value extracting section 131 detects the positions of pixels which each have a color-difference value equal to the selected color-difference value.

Figure 38:
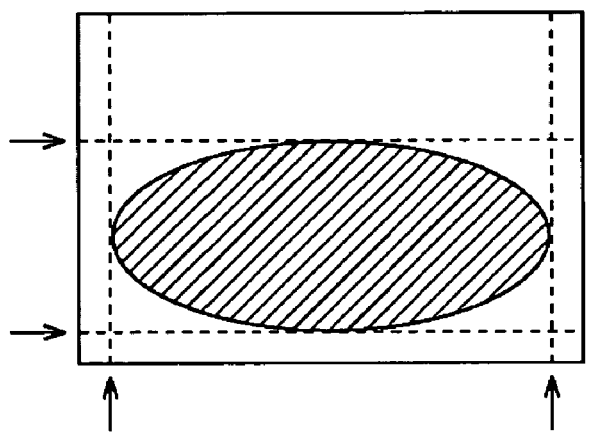
FIG. 38 is an illustration of determination of a reference value in the case of specifying texture.
Figure 39:
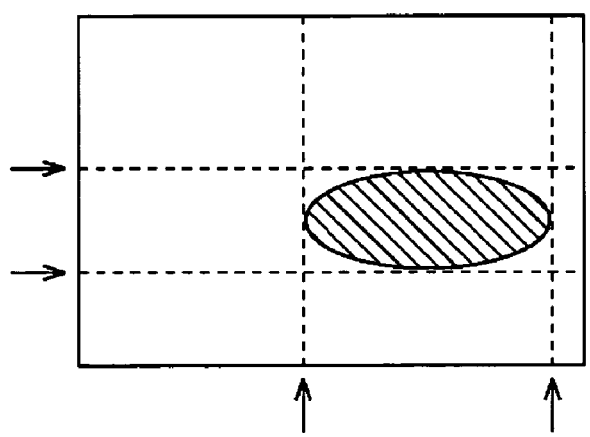
FIG. 39 is an illustration of determination of a reference value in the case of specifying texture.
Figure 40:
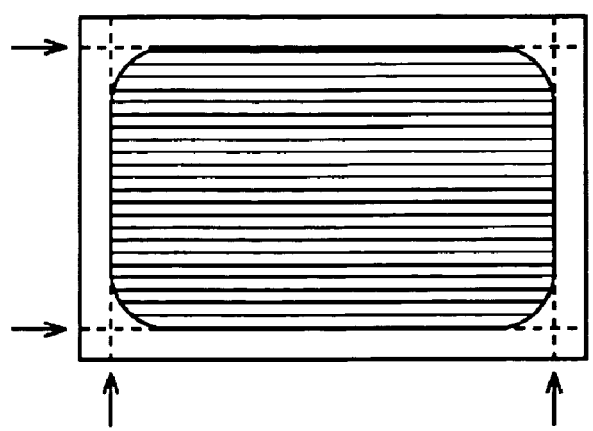
FIG. 40 is an illustration of determination of a reference value in the case of specifying texture.

As indicated by the examples shown in FIGS. 38 to 40, in step S65, a difference between the maximum and minimum values of horizontal positions (X-axial coordinates) of the pixels whose position are detected in step S64, and a difference between the maximum and minimum values of vertical positions (Y-axial coordinates) of the pixels whose position are detected in step S64 are calculated, and the sum of both differences is calculated.

In step S66, the feature value extracting section 131 determines whether or not all the n color-difference values selected in step S62 have been selected in step S63. If, in step S66, it is determined that there is a color-difference value that has not been selected yet, the process returns to step S63, and the next color-difference value is selected. Processing in step S64 and the subsequent steps is repeatedly performed.

If, in step S66, it is determined that all the color-difference values have been selected, in step S67, the feature value extracting section 131 selects, as a reference value, a color-difference value from which the maximum of the sums calculated in step S65 is obtained.

In this manner, the reference value is determined. A color-difference value of, for example, a color which relatively exists in large numbers in the input image and which is distributed in the entirety of the input image is used as the reference value, and quantization of such a color is executed.

A case in which the feature value is the color-difference value has been exemplified. However, for another feature value such as edge intensity, a reference value is similarly determined.

Next, the angle-of-view estimating process that is executed in step S3 in FIG. 34 by the angle-of-view estimating unit 53 described with reference to FIG. 14 is described below.

In step S91, when there are parallel lines in the depth direction drawn beforehand for finding the vanishing point, for the parallel lines in the depth direction, the horizontal parallel line drawing section 171 draws horizontal parallel lines at intervals equal to those of the parallel lines in the depth direction, as described with reference to FIGS. 15 and 16. In other words, the horizontal parallel lines are drawn so that squares are drawn in perpendicularly-viewed-image form. Alternatively, when the parallel lines in the depth direction are not drawn beforehand, after the horizontal parallel line drawing section 171 draws the parallel lines in the depth direction similarly to the case described with reference to FIG. 5, for the drawn parallel lines in the depth direction, the horizontal parallel line drawing section 171 draws the horizontal parallel lines at intervals equal to those of the parallel lines in the depth direction, as described with reference to FIGS. 15 and 16. In other words, the horizontal parallel lines are drawn so that squares are drawn in the perpendicularly-viewed image.

In step S92, as described with reference to FIG. 16, the parallel line extracting section 172 extracts those that are parallel from among the parallel lines in the depth direction and diagonals of the drawn squares.

In step S93, on the basis of the parallel lines in the depth direction and the horizontal parallel lines, the tiled image generating section 173 generates the tiled image, as described with reference to FIG. 17.

In step S94, on the basis of the tiled image generated by the tiled image generating section 173, the base line drawn by the horizontal parallel line drawing section 171, and pairs of the parallel lines in the depth direction and diagonals of the drawn squares which are extracted by the parallel line extracting section 172, the angle-of-view calculating section 174 calculates the angle of view, as described with reference to FIG. 17, and the process returns to step S3 before proceeding to step S4.

In the above processing, the angle of view of the camera used to capture the image prior to transformation can be estimated.

In addition, when it is difficult to draw the horizontal parallel lines at intervals equal to those of the parallel lines in the depth direction, that is, when it is difficult to draw the horizontal parallel lines so that squares are drawn in perpendicularly-viewed-image form, errors occur in each interval of the parallel lines in the depth direction and in each interval of the horizontal parallel lines, thus resulting in an error in the angle of view calculated by the angle-of-view calculating section 174.

As described in, for example, FIG. 18, when the horizontal parallel lines are drawn at intervals different from those described with reference to FIG. 17, the angle of view calculated by using the tiled image differs from that obtained in the case shown in FIG. 17. In this case, by changing the configuration of the horizontal parallel line drawing section 171 to the configuration described with reference to FIG. 18, calculating the elevation angle of the camera when the image prior to transformation is captured, and generating the perpendicularly-viewed image, the horizontal parallel lines may be drawn so that squares are drawn in the perpendicularly-viewed image to the parallel lines in the depth direction.

Figure 42:
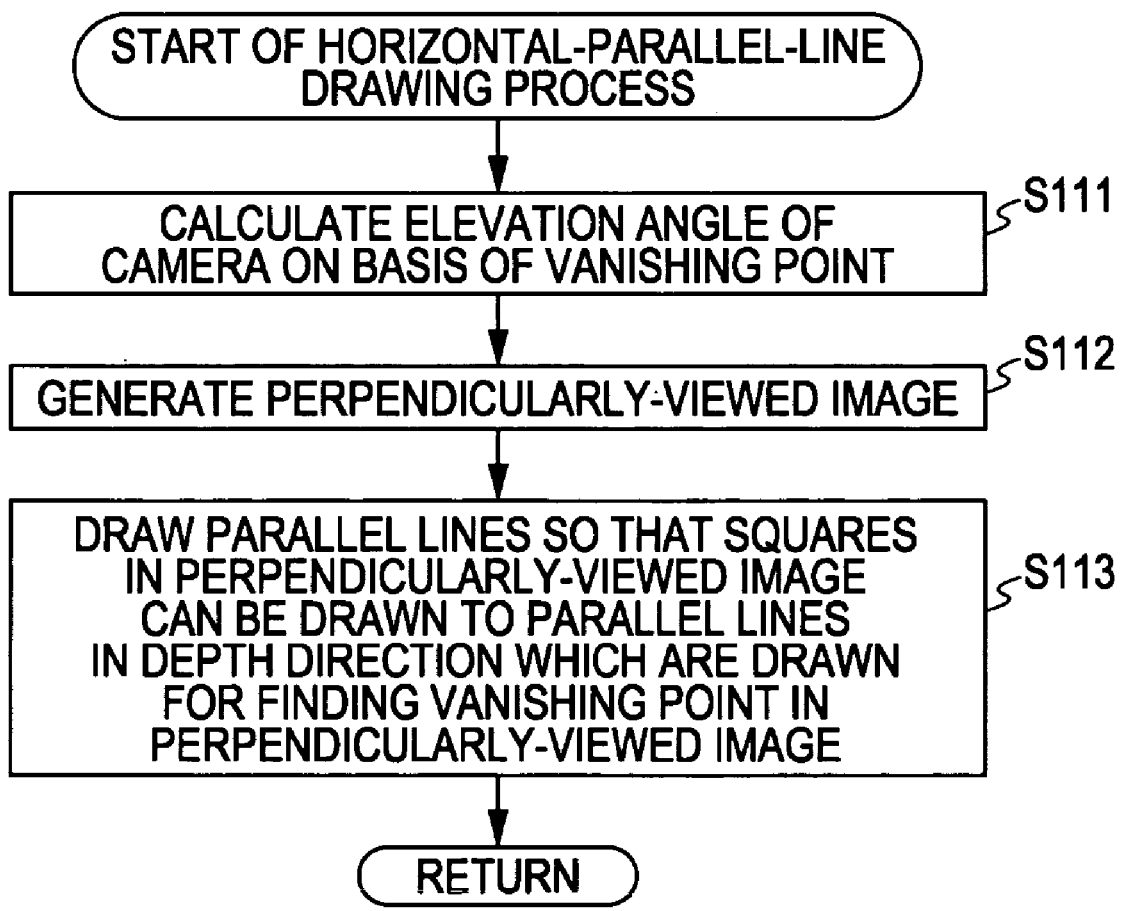
FIG. 42 is a flowchart illustrating a horizontal-parallel-line drawing process.

Next, a horizontal-parallel-line drawing process that corresponds to step S91 in FIG. 41 when the elevation angle is calculated to generate the perpendicularly-viewed image is described below with reference to the flowchart shown in FIG. 42.

In step S111, the elevation angle calculator 251 calculates the elevation angle of the camera on the basis of the vanishing point obtained in processing by the vanishing point estimating unit 52.

Specifically, the elevation angle can be calculated using expression (1) because, as shown in FIG. 25, the elevation angle is equal to an angle formed between a straight line connecting vanishing point R and focus Q and a straight line connecting the central point of image-forming plane z and focus Q.

In step S112, the perpendicularly-viewed-image generator 252 uses the calculated elevation angle to generate the perpendicularly-viewed image by transforming the input image.

Specifically, as described with reference to FIG. 27, for each pixel $(x_1, y_1)$ of the perpendicularly-viewed image, corresponding pixel $(x_0, y_0)$ of the input image is detected by the perpendicularly-viewed-image generator 252.

Pixel $(x_1, y_1)$ of the perpendicularly-viewed image, pixel $(x_0, y_0)$ of the input image, and elevation angle $\phi$ have the geometric relationships shown in FIG. 28. Thus, pixel $(x_0, y_0)$ of the input image that corresponds to pixel $(x_1, y_1)$ of the perpendicularly-viewed image can be calculated by using expression (2). By using this manner, when the input image is supplied, the actual pattern on the subject plane can be estimated.

In step S113, the horizontal line drawer 253 horizontally draws parallel lines in the generated perpendicularly-viewed image so that squares are drawn in perpendicularly-viewed-image form to the parallel lines in the depth direction drawn for finding the vanishing point.

After drawing, in the perpendicularly-viewed-image generator 252, the parallel lines in the depth direction and the horizontal parallel lines, by executing inverse transformation to the transformation executed by the perpendicularly-viewed-image generator 252, the horizontal line drawer 253 generates image data indicating that correct parallel lines in the depth direction and correct horizontal parallel lines are drawn, and supplies the generated image data to the parallel line extracting section 172.

Since this processing generates the perpendicularly-viewed image on the basis of the elevation angle, the horizontal parallel lines can be drawn so that squares are accurately drawn in perpendicularly-viewed-image form to the parallel lines in the depth direction. Therefore, the angle of view can be estimated with good accuracy.

Next, the image transforming process that is executed in step S4 in FIG. 34 by the image transforming unit 54 described with reference to FIG. 29 is described below with reference to the flowchart shown in FIG. 43.

In step S131, the source image data acquiring section 281 acquires image data prior to transformation and supplies the acquired image data to the transformed image surface generating section 282 and the corresponding pixel extracting section 284.

In step S132, the transformed image surface generating section 282 prepares a transformed image surface having dimensions equal to those of the image data prior to transformation, and supplies the image surface to the pixel-of-interest extracting section 283 and the transformed image generating section 285.

In step S133, the pixel-of-interest extracting section 283 extracts, as a pixel of interest, an unprocessed pixel from the image surface supplied from the transformed image surface generating section 282, and supplies coordinate information of the pixel of interest to the corresponding pixel extracting section 284 and the transformed image generating section 285.

In step S134, on the basis of the estimated angle of view supplied from the angle-of-view estimating unit 53, by using the transformation expression described with reference to FIG. 31 or FIG. 32, the corresponding pixel extracting section 284 extracts a pixel corresponding to the extracted pixel of interest from the pixels of the image data prior to transformation, and supplies the extracted pixel to the transformed image generating section 285.

In step S135, the transformed image generating section 285 copies the pixel value of the corresponding pixel in the source image supplied from the corresponding pixel extracting section 284 to the position of the pixel of interest of the image surface.

In step S136, the transformed image generating section 285 determines whether or not pixel value copying has finished for all the pixels. If, in step S136, it is determined that the pixel value copying has not finished for all the pixels yet, the process returns to step S133, and the subsequent steps are repeatedly performed. If, in step S136, it is determined that the pixel value copying has finished for all the pixels, the process returns to step S4 in FIG. 34 and proceeds to step S5.

In this processing, on the basis of an angle of view and the size of image data prior to transformation, each pixel of plane image data of an image captured from a predetermined camera position is replaced by any of pixels on a virtual screen formed as at least part of a cylinder, whereby transformed image data is generated.

FIG. 44 shows an example of a transformed image generated such that the image prior to transformation, shown in FIG. 4, is transformed on the basis of angle of view $fov_1$=57 (deg) obtained as described with reference to FIG. 17. Then, a=1.086.

Figure 45A:
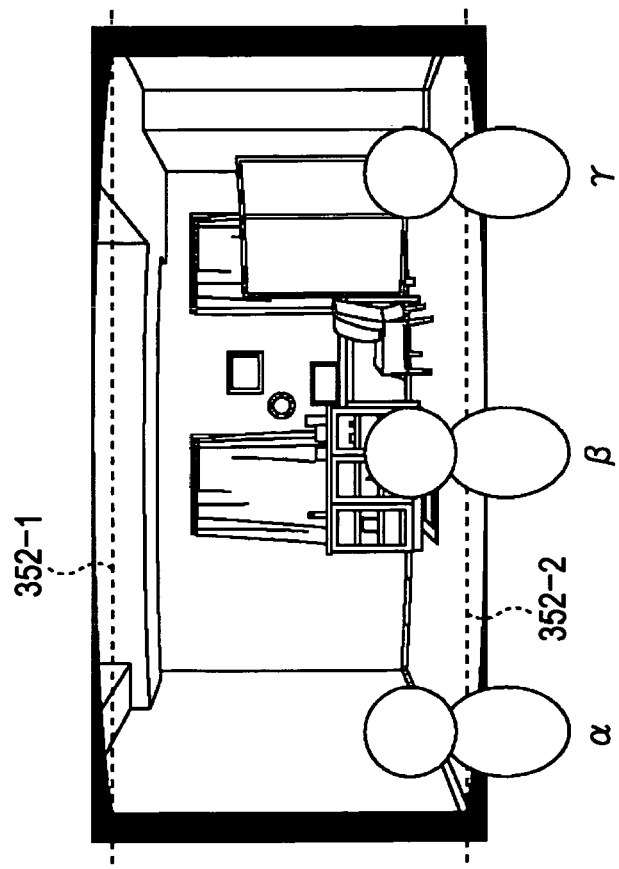
FIGS. 45A and 45B are illustrations of an image changed on the basis of an angle of view correctly estimated by applying an embodiment of the present invention.
Figure 45B:
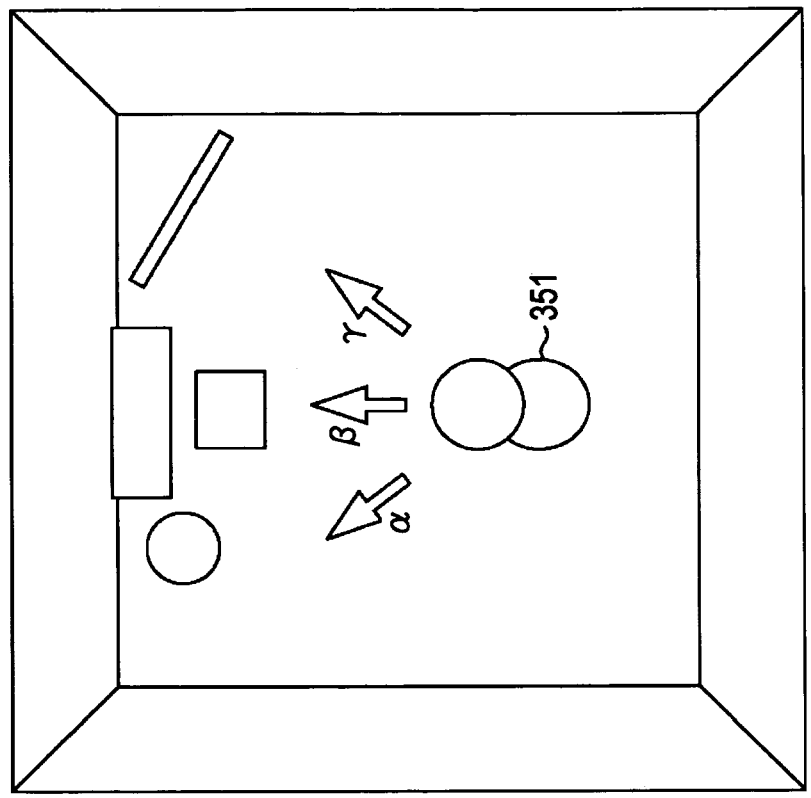

On the basis of the captured "interior space" image shown in FIG. 44, when an observer observes toward the front from position α shown in FIG. 45A, as shown in FIG. 45B, the observer can obtain a retinal image corresponding to a retinal image obtained when an observer 351 in the center of the "interior space" looks at a direction α. On the basis of the captured "interior space" image shown in FIG. 44, when the observer observes toward the front from a position β, as shown in FIG. 45B, the observer can obtain a retinal image corresponding to a retinal image obtained when the observer 351 in the center of the "interior space" looks at a direction β. On the basis of the captured "interior space" image shown in FIG. 44, when the observer observes toward the front from a position γ, as shown in FIG. 45B, the observer can obtain a retinal image corresponding to a retinal image obtained when the observer 351 in the center of the "interior space" looks at a direction γ. In other words, the transformed image shown in FIGS. 44 and 45A enables an observer to obtain a correct retinal image irrespective of the observer's positions such as the positions α to γ shown in FIG. 45A.

When the observer 351 in the center of the "interior space" observes a boundary between an inner wall and floor of the room from a lower left corner to lower right corner of the room while changing the angle from direction α to direction γ, the distance between the boundary and the observer 351 is the largest to the lower left corner (direction α) of the room and to the lower right corner (direction γ) of the room, and is the smallest to the central portion (direction β) of the room. In other words, the transformed image shown in FIG. 44 and FIG. 45A, the boundary between the inner wall and floor of the room is not a straight line but a slightly downward convex curve, and the lower left corner and lower right corner of the room are drawn at a position higher than the boundary between the floor in the central portion and the inner wall of the room, that is, at a position felt as far from the observer 351.

In the transformed image, upper and lower bends that do not occur in an ordinary image occur. Accordingly, it is preferable to display, for the observer, an image in which the upper and lower bends are deleted as shown in FIG. 45A, that is, part of the image between straight lines 352-1 and 352-2 in FIG. 45A.

Figure 46:
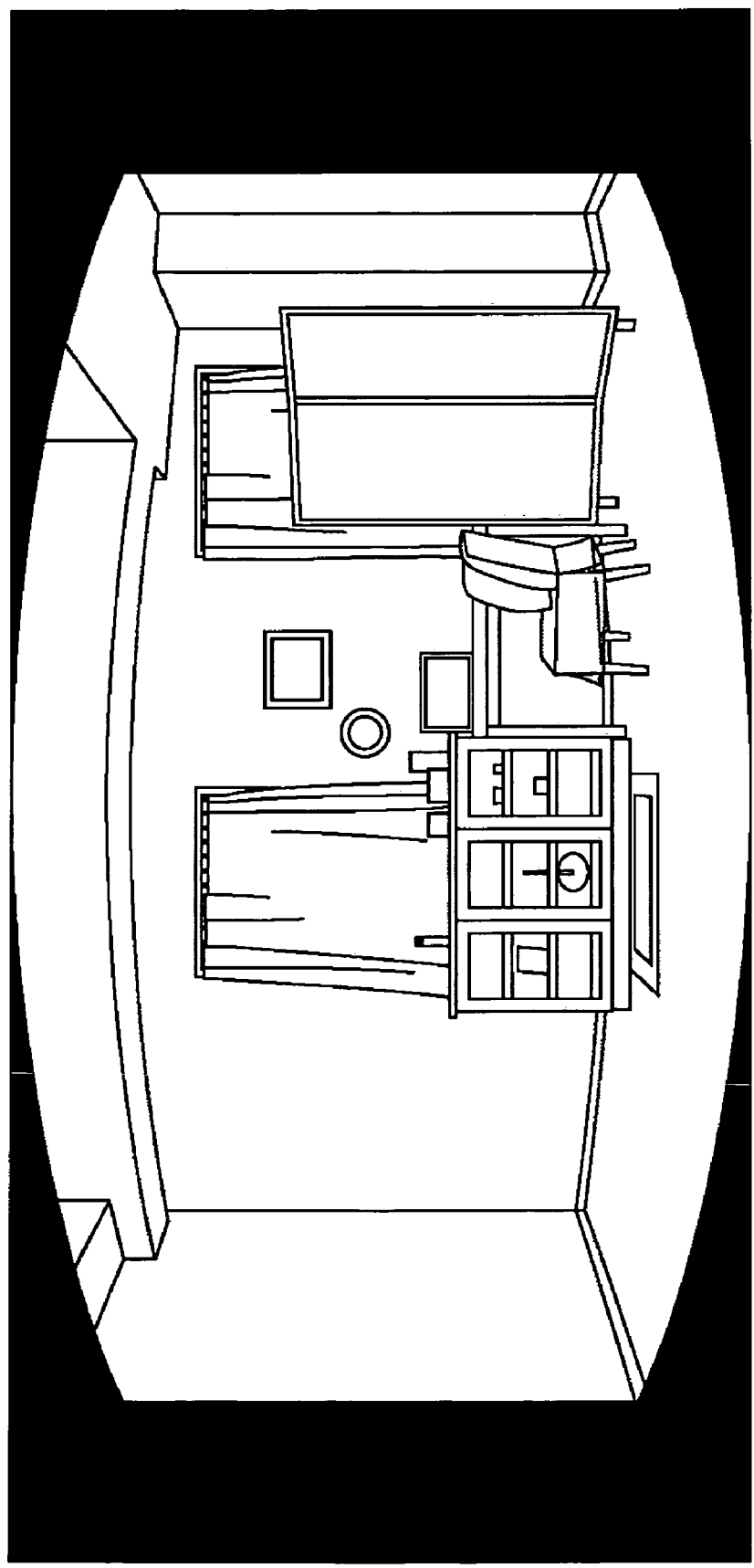
FIG. 46 is an illustration of an image changed on the basis of an incorrectly estimated angle of view.

FIG. 46 shows an example of a transformed image obtained when $\tan \theta_2=1.0$, that is, angle of view $fov_2=2 \tan^{-1} 1.0=90$ (deg) and a=2.

Figure 47:
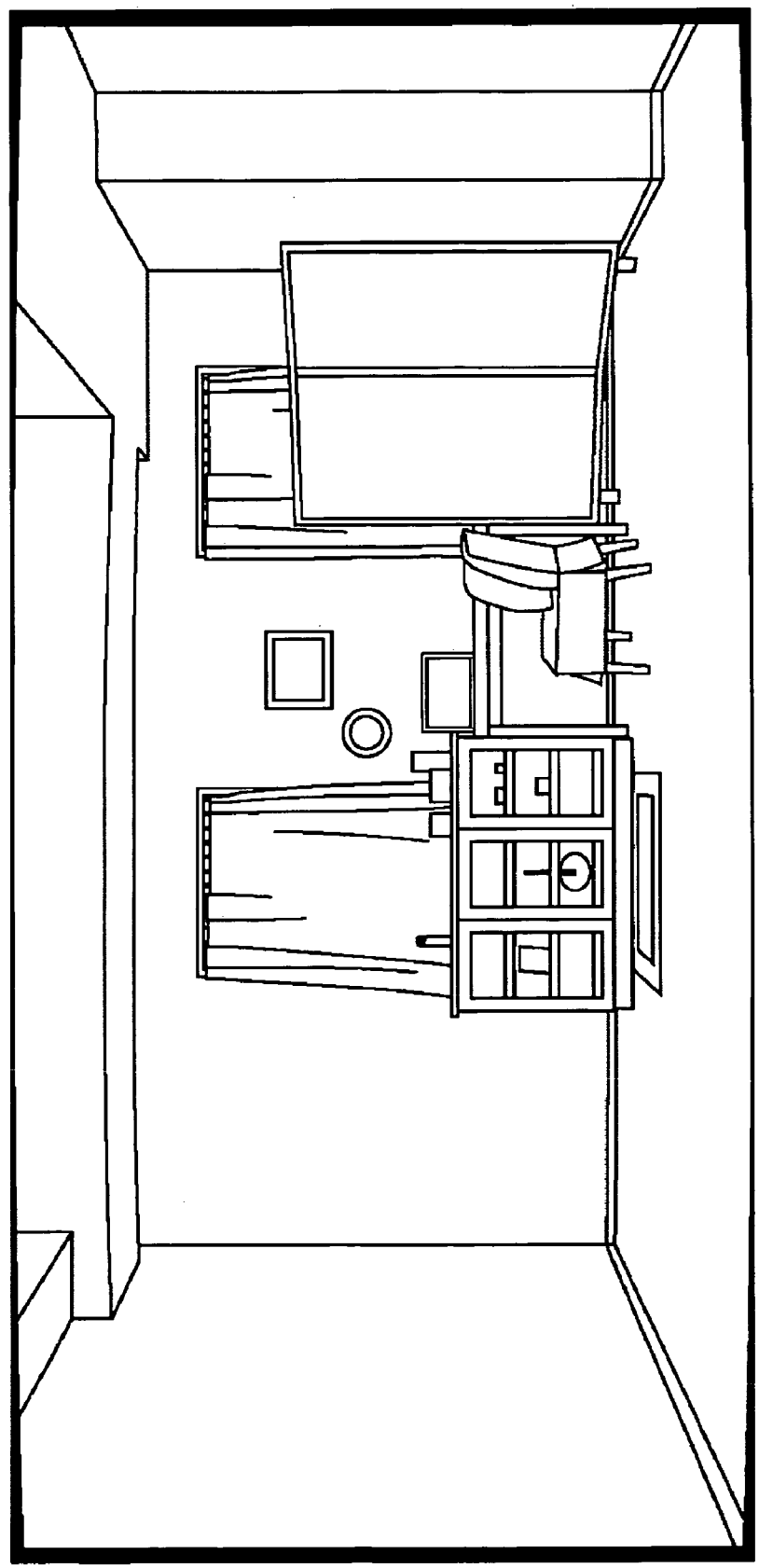
FIG. 47 is an illustration of an image changed on the basis of an incorrectly estimated angle of view.

In addition, FIG. 47 shows an example of a transformed image obtained when $\tan \theta_2=0.25$, that is, angle of view $fov_3=2 \tan^{-1} 0.25=28.1$ (deg) and a=0.5.

Figure 48C:
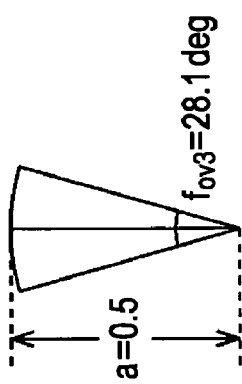
FIGS. 48A, 48B, and 48C are illustrations of angles of view and focal distances in FIGS. 44, 46, and 47.
Figure 48B:
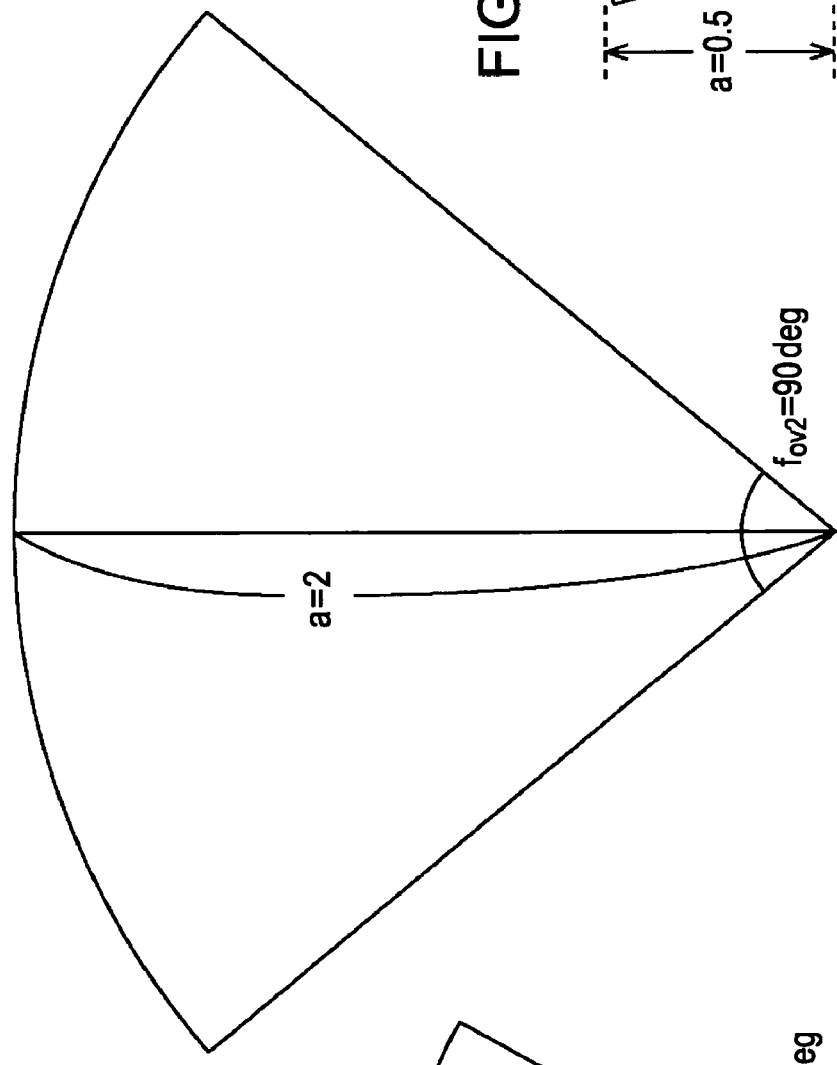
Figure 48A:
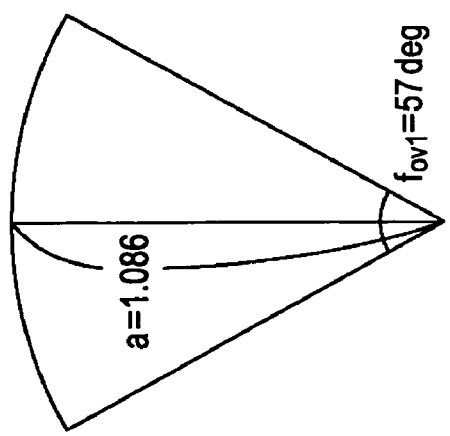

In other words, the transformed image shown in FIG. 44 is obtained by transformation based on the relationship shown in FIG. 48A between angle of view fov and depth distance a between the camera and the camera focus. The transformed image shown in FIG. 46 is obtained by transformation based on the relationship shown in FIG. 48B between angle of view fov and depth distance a between the camera and the camera focus. The transformed image shown in FIG. 47 is obtained by transformation based on the relationship shown in FIG. 48C between angle of view fov and depth distance a between the camera and the camera focus.

In other words, the transformed image shown in FIG. 46 is generated, as shown in FIG. 48B, as an image captured from a remote camera at an angle of view wider than actual for correctly obtained angle of view fov and depth distance a (between the camera and the camera focus) in FIG. 48A. The transformed image shown in FIG. 47 is generated, as shown in FIG. 48C, as an image captured from a nearby camera at an angle of view narrower than actual for correctly obtained angle of view fov and depth distance a (between the camera and the camera focus) in FIG. 48A.

As described above, if image transformation is not performed on the basis of correctly estimated angle of view and focal distance, it is difficult to generate an image by which a correct retinal image can be supplied to an observer irrespective of positions of the observer.

Next, a remarkable advantage obtained when an embodiment of the present invention is applied is described below by exemplifying the case of obtaining plane image data corresponding to a retinal image in all the directions of 360 degrees from a predetermined point.

Figure 49:
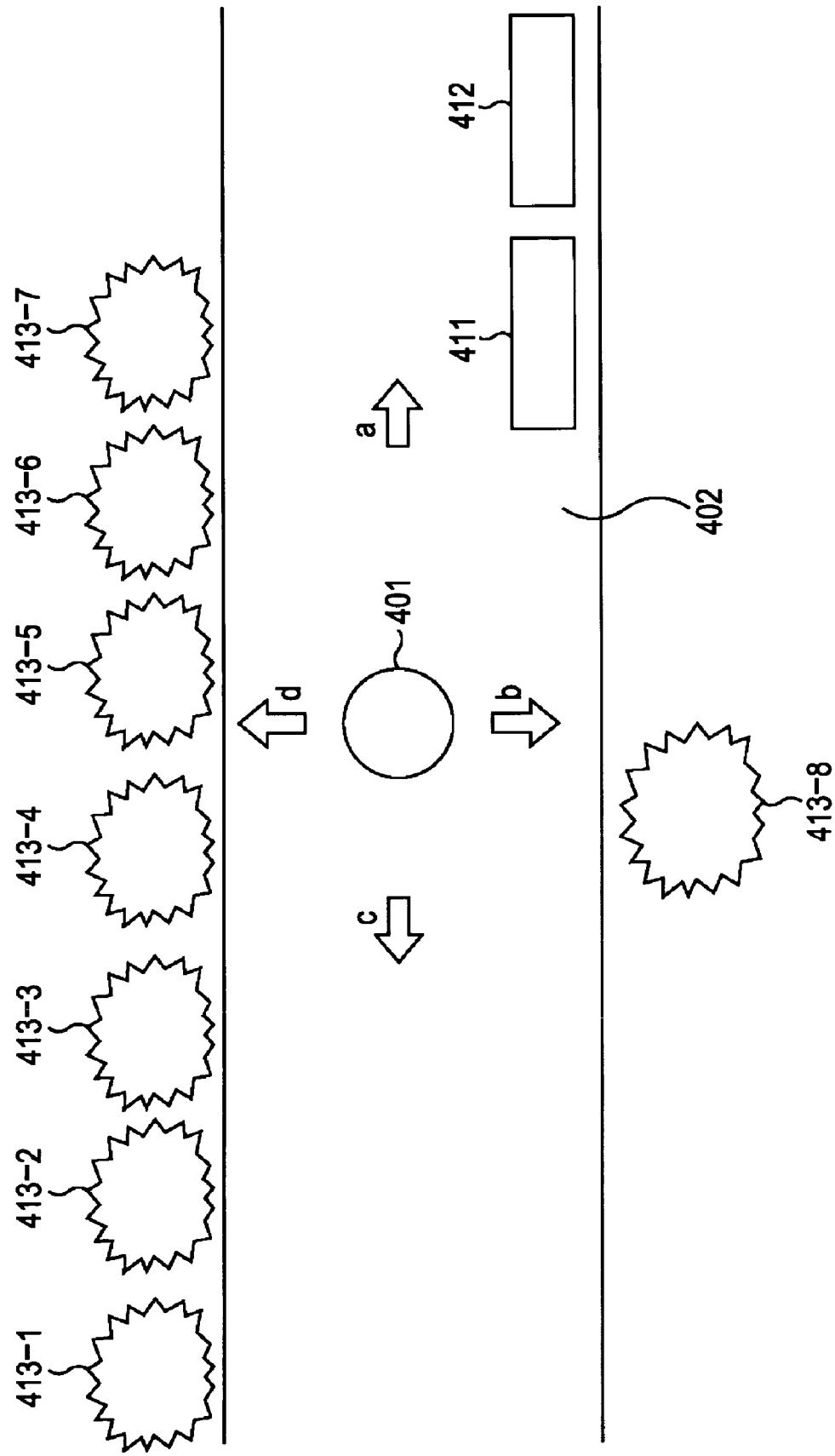
FIG. 49 is an illustration of a case in which image capturing in 360 degrees around a user is performed.

For example, assuming that, as shown in FIG. 49, a user 401 obtains image data of 360 degrees around the user 401 on a linearly extending pavement 402 on which benches 411 and 412 are installed and around which trees 413-1 to 413-8 are planted, the advantage is described.

At first, FIGS. 50A to 50D show images obtained when performing image capturing in four directions, that is, as shown in FIG. 49, a direction a which is one side of the pavement 402 and which corresponds to the direction of the benches 411 and 412, a direction b which differs 90 degrees from the direction a and which corresponds to the direction of the tree 413-8, a direction c which differs 180 degrees from the direction a, and a direction d which differs 90 degrees from the direction c and which corresponds to the direction of the trees 413-1 to 413-7.

Figure 50A:
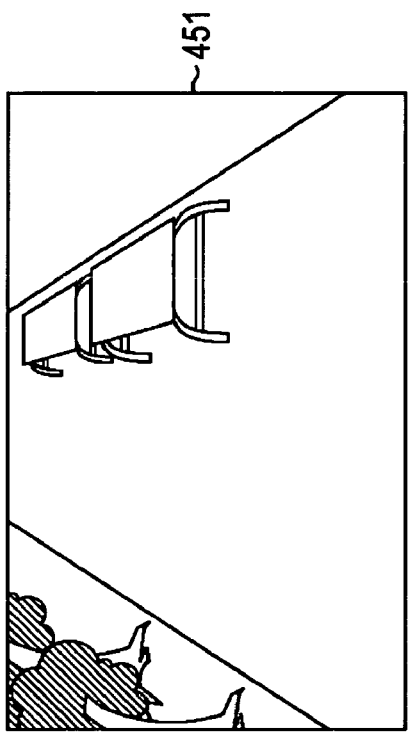
FIGS. 50A, 50B, 50C, and 50D are illustrations of images obtained by performing image capturing in four directions in FIG. 49.
Figure 50B:
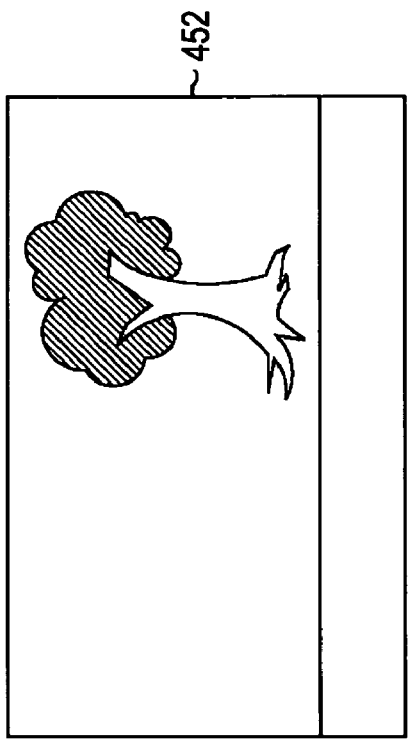
Figure 50C:
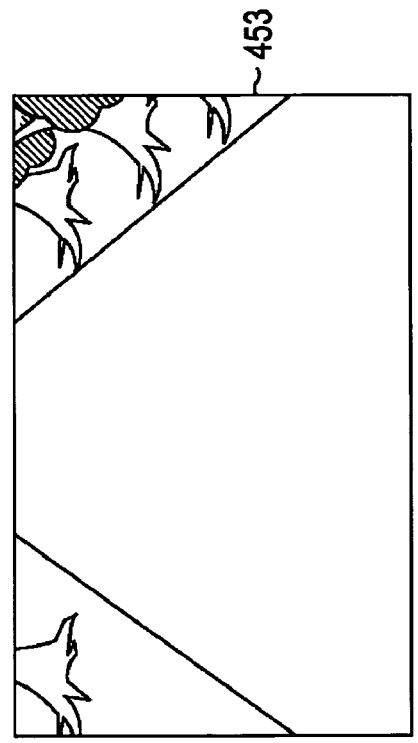
Figure 50D:
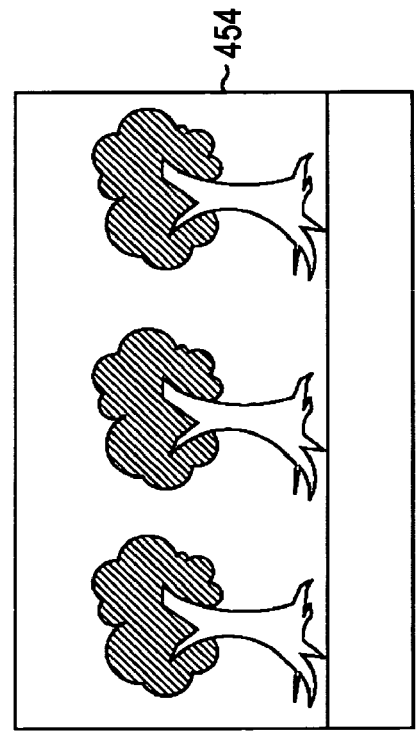

As shown in FIG. 50A, an image 451 is a result of image capturing in the direction a. The image 451 includes the benches 411 and 412, and, in the image 451, the pavement 402 extends in a far side, and the boundaries of the pavement 402 are oblique straight lines converging at a vanishing point (vanishing point existing outside the image 451). As shown in FIG. 50B, an image 452 is a result of image capturing in the direction b. The image 452 includes the tree 413-8, and the boundaries of the pavement 402 look as a horizontal straight line in the image 452. As shown in FIG. 50C, an image 453 is a result of image capturing in the direction c. In the image 453, the pavement 402 extends in a far side in the image 453, and the boundaries of the pavement 402 are oblique straight lines converging at a vanishing point (vanishing point existing outside the image 453). As shown in FIG. 50D, an image 454 is a result of image capturing in the direction d. The image 454 includes a plurality of trees 413, and the boundaries of the pavement 402 look as a horizontal straight line in the image 454.

Figure 51:
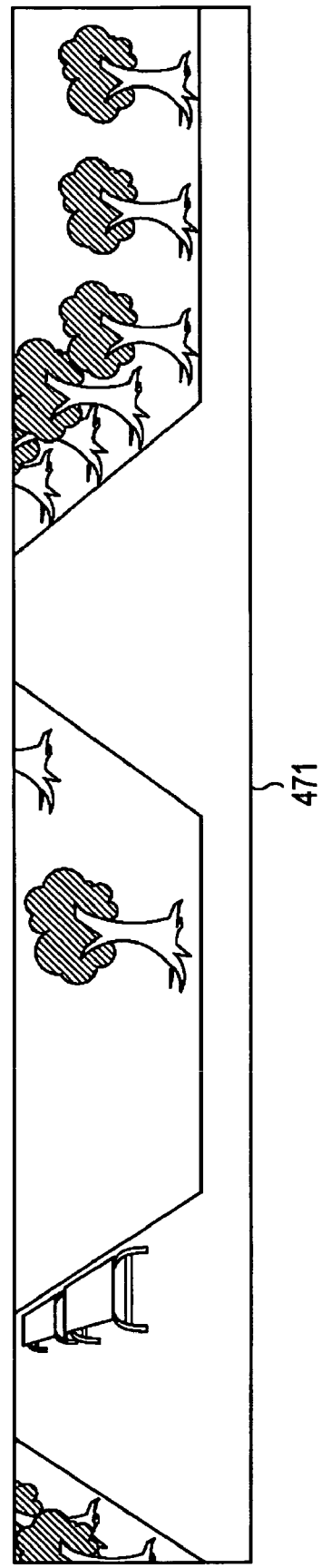
FIG. 51 is an illustration of an image obtained by connecting the images shown in FIGS. 50A to 50D.

By simply connecting the four images 451 to 454 shown in FIGS. 50A to 50D, the image 471 shown in FIG. 51 can be generated. In the image 417, one tree 413, etc., which exist in a boundary portion between the images are corrected so as not to look as unnatural.

In the images 451 to 454 which are components of the image 471, the boundaries of the pavement 402 are shown as the straight lines converging at the vanishing point or as the horizontal straight line. Accordingly, in the image 471, the boundaries of the pavement 402 are all formed by straight lines. Therefore, unlike a retinal image obtained when the user 401 observes 360 degrees around the user 401, the image 471 is formed as an unnatural image in which, at just an intermediate angle (each connecting portion of the images 451 to 454) of each of the above angles a to d, the boundaries of the pavement 402 bend at a predetermined angle.

Conversely, for example, it is assumed that, by increasing the number of images captured at the position of the user 401 shown in FIG. 49, for example, by combining and connecting a double number of images or eight images, an image is generated.

Figure 52:
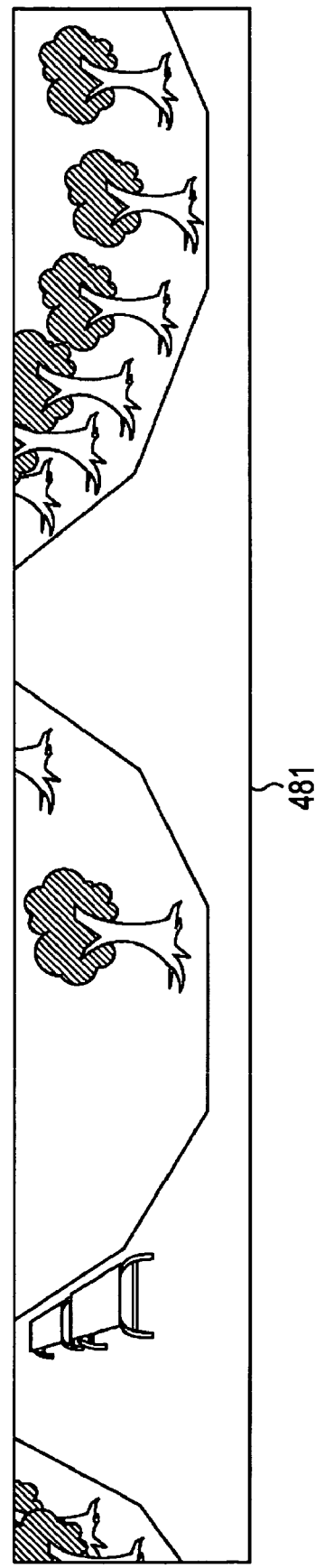
FIG. 52 is an illustration of an image generated by connecting images obtained by performing image capturing in eight directions in FIG. 49.

For example, by connecting, to the connecting portions of the images 451 to 454 in the image 471 described with reference to FIG. 51, images captured at intermediate angles of the above angles a to d, the image 481 shown in FIG. 52 can be generated. However, also in the image 481, the boundaries of the pavement 402 are formed as a set of straight lines connected at predetermined angles in the connecting portions of the eight images.

In other words, even if, by using images obtained on the basis of the principle of the pinhole camera of the related art, the number of captured images (image-capturing directions) is increased in order to obtain an image close to a retinal image obtained when observing 360 degrees in the periphery, the boundaries of the pavement 402 are, in a precise sense, formed as connected straight lines, so that the obtained image differs from a retinal image viewed by the eyes of the user 401 as an observer.

Unlike the above case, by using the image processing apparatus 41 (to which an embodiment of the present invention is applied) to transform images obtained on the basis of the pinhole camera principle of the related art, and appropriately connecting the images, the boundaries of the pavement 402 are transformed into smooth curves, as shown in the image 501 shown in FIG. 53. In other words, even if, from any position on the front side of the image 501, its front is observed, a retinal image that is supplied to the observer is substantially equivalent to a retinal image viewed by the eyes of the user 401 when the user 401 rotates 360 degrees.

As described above, by applying an embodiment of the present invention, a plane image whose formation is difficult only by connecting images obtained on the basis of the pinhole camera principle of the related art, and by which a retinal image, substantially equivalent to a retinal image viewed by the eyes of the user 401 in the actual space, can be obtained at each of viewpoints of a plurality of observers.

An embodiment of the present invention is applicable not only to transformation of an image or video captured by an ordinary camera but also to, for example, the case of using computer graphics to create images or video. In other words, an image or video in which a depth is represented by a method similar to that used for an image captured on the basis of the pinhole camera principle may be transformed by using an embodiment of the present invention.

In addition, there is, for example, an application that enables a user to feel a virtual sense in which a person enters a screen and a screen becomes a mirror. Specifically, there is an application that provides a user with so-called "virtual reality" or "mixed reality" although it is two-dimensional. For example, in such virtual reality or mixed reality, video showing that fine beads and those in liquid form drop is projected onto a large screen, and the beads and those in liquid form in the screen hit a shadow on the screen of a user present in front of the screen and behave as if, in the real world, the beads and those in liquid form hit the user, and, in addition, a butterfly flies into the screen and stays in the shadow on the screen of the user.

In such applications, an embodiment of the present invention is applicable. In other words, by applying an embodiment of the present invention to generation of an image or video displayed on a screen, a user that exists at an unspecified position (for example, at each of the positions α, β, and γ in FIG. 45A) to the image or video displayed on the screen can be supplied with a sense closer to that experienced in the real world.

By using a transformed image generated by applying an embodiment of the present invention and performing predetermined image transformation on images captured with an ordinary camera, even if an observer that observes the transformed image observes the front of the observer from any position on the front side of the transformed image (in other words, if an viewpoint of the observer is perpendicular to or in a substantially perpendicular direction to a transformed image plane), the observer can be provided with a retinal image similar to that obtained when the observer exists in the real world.

It is preferable that a display for displaying the transformed image generated as described above by applying an embodiment of the present invention and performing predetermined image transformation on images captured with an ordinary camera be larger in size.

The image transformation in the present invention is applicable not only to images captured with a camera or the like but also to images generated by technology such as computer graphics.

The image or video generated as described above is displayed on a large plane screen and is printed out for observation by the observer. In addition to that, the image or video is applicable to various types of applications that use images or video.

The above-described consecutive processing may be executed either by hardware or by software. In this case, for example, the image processing apparatus 41 is formed by the personal computer 901 shown in FIG. 54.

Referring to FIG. 54, a CPU (central processing unit) 921 executes various types of processing in accordance with programs stored in a ROM (read-only memory) 922 or programs loaded into a RAM (random access memory) 923. The RAM 923 also stores data, etc, which are necessary when the CPU 921 executes the various types of processing, if necessary.

The CPU 921, the ROM 922, and the RAM 923 are connected to one another by a bus 924. The bus 924 also connects to an input/output interface 925.

The input/output interface 925 connects to an input unit 926 including a keyboard and a mouse, an output unit 927 including a display formed by a CRT (cathode ray tube) or LCD (liquid crystal display), and a speaker, a storage unit 928 including a hard disk, and a communication unit 929 including a modem. The communication unit 929 performs communicating processing using networks including the Internet.

The input unit 926 also connects to a drive 930, if necessary, and a removable medium 931, such as a magnetic disk, an optical disc, a magneto-optical disc, or a semiconductor memory, is loaded in the drive 930, if necessary. A computer program read from the removable medium 931 is installed in the storage unit 928, if necessary.

When software is used to execute the above consecutive processing, programs constituting the software are installed from a network or recording medium to a computer built into dedicated hardware, one in which various functions are executed by installing various programs, for example, a multipurpose personal computer, or the like.

Types of the recording medium include not only the removable medium 931, which is distributed separately from the personal computer 901 in order to provide programs to a user, and which includes a program-recorded magnetic disk (including a floppy disk), optical disc (including a CD-ROM (compact-disc read-only memory) and DVD (digital versatile disc)), magneto-optical disc (including an MD (Mini-Disk)), or semiconductor memory, but also the ROM 922, which is provided to the user in a state built into the personal computer 901 and which contains programs, and a hard disk included in the storage unit 928.

In this specification, steps constituting a program recorded on the recording medium definitely include processing steps executed in a time-series manner in given order, and include processing steps which are executed in parallel or separately if they are not necessarily executed in a time-series manner.

In addition, in this specification, the system means a logical set of a plurality of apparatuses (or functional modules for realizing particular functions) and is irrelevant to whether or not each apparatus and each functional module are provided in a single housing.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for acquiring and transforming first plane image data representing a space having a depth, the image processing apparatus comprising:
    means for estimating a vanishing point based on an imaged subject of the first plane image data, wherein the vanishing point is a point in the image data at which, when parallel lines in a three-dimensional space based on objects already contained in the image data are projected onto an image plane by perspective transformation, straight lines on the image plane which correspond to the parallel lines converge;
    means for estimating an angle of view of the first plane image data; and
    means for generating second plane image data corresponding to the first plane image data projected onto a portion corresponding to the estimated angle of view of a curved surface of a cylinder having a predetermined radius, based on the vanishing point, the angle of view, and a reference point, a position of the reference point being at a center of the cylinder and at a height equal to the estimated vanishing point,
    wherein the means for estimating a vanishing point further comprises
        depth-direction parallel-line extracting means for extracting perspective lines from the imaged subject of the first plane image data, and
        vanishing point calculating means for calculating the vanishing point based on the perspective lines.

2. The image processing apparatus according to claim 1, wherein the means for estimating a vanishing point further comprises
    means for drawing perspective lines of the imaged subject of the first plane image data, and
    means for extracting the vanishing point of the first plane image data on the basis of the perspective lines.

3. The image processing apparatus according to claim 1, wherein the means for estimating an angle of view further comprises
    means for generating a plane view obtained by assuming that space represented by the first plane image data is vertically viewed from above, and
    means for calculating the angle of view by detecting a position of a viewpoint in the space represented by the first plane image data in the plane view.

4. The image processing apparatus according to claim 3, wherein the means for generating the plane view further includes means for generating the plane view by calculating an elevation angle of the viewpoint in the space represented by the first plane image data.

5. The image processing apparatus according to claim 1, wherein the means for generating second plane image data further includes means for determining the predetermined radius of the cylinder on the basis of the angle of view and an image size of the first plane image data.

6. The image processing apparatus according to claim 1, further comprising means for displaying the second plane image data, wherein
    the means for displaying includes a planar display.

7. An image processing method for an image processing apparatus for acquiring and transforming first plane image data representing a space having a depth, the image processing method comprising:
    estimating a vanishing point based on an imaged subject of the first plane image data, wherein the vanishing point is a point in the image data at which, when parallel lines in a three-dimensional space based on objects already contained in the image data are projected onto an image plane by perspective transformation, straight lines on the image plane which correspond to the parallel lines converge;
    estimating an angle of view of the first plane image data; and
    generating, by a processor, second plane image data corresponding to the first plane image data projected onto a portion corresponding to the estimated angle of view of a curved surface of a cylinder having a predetermined radius, based on the vanishing point, the angle of view, and a reference point, a position of the reference point being at a center of the cylinder and at a height equal to the estimated vanishing point, wherein the estimating a vanishing point further includes
extracting perspective lines from the imaged subject of the first plane image data, and
calculating the vanishing point based on the perspective lines.

8. A non-transitory computer-readable storage medium storing instructions thereon that, when executed by an arithmetic processor, direct the arithmetic processor to execute processing for acquiring and transforming first plane image data representing a space having a depth, the processing comprising:

estimating a vanishing point based on an imaged subject of the first plane image data, wherein the vanishing point is a point in the image data at which, when parallel lines in a three-dimensional space based on objects already contained in the image data are projected onto an image plane by perspective transformation, straight lines on the image plane which correspond to the parallel lines converge;

estimating an angle of view of the first plane image data; and generating second plane image data corresponding to the first plane image data projected onto a portion corresponding to the estimated angle of view of a curved surface of a cylinder having a predetermined radius, based on the vanishing point, the angle of view, and a reference point, a position of the reference point being at a center of the cylinder and at a height equal to the estimated vanishing point, wherein the estimating a vanishing point further includes
extracting perspective lines from the imaged subject of the first plane image data, and
calculating the vanishing point based on the perspective lines.

9. An image processing apparatus for acquiring and transforming first plane image data representing a space having a depth, the image processing apparatus comprising:

a vanishing point estimating section configured to estimate a vanishing point based on an imaged subject of the first plane image data, wherein the vanishing point is a point in the image data at which, when parallel lines in a three-dimensional space based on objects already contained in the image data are projected onto an image plane by perspective transformation, straight lines on the image plane which correspond to the parallel lines converge;

an angle-of-view estimating section configured to estimate an angle of view of the first plane image data; and an image generating section configured to generate second plane image data corresponding to the first plane image data projected onto a portion corresponding to the estimated angle of view of a curved surface of a cylinder having a predetermined radius, based on the vanishing point, the angle of view, and a reference point, a position of the reference point being at a center of the cylinder and at a height equal to the estimated vanishing point, wherein the vanishing point estimating section further comprises
a depth-direction parallel-line extracting unit configured to extract perspective lines from the imaged subject of the first plane image data, and
a vanishing point calculating unit configured to calculate the vanishing point based on the perspective lines.

10. The image processing apparatus of claim 9, wherein the vanishing point calculating unit uses a centroid of intersections of the perspective lines as the vanishing point.

11. The image processing apparatus of claim 9, wherein the vanishing point calculating unit uses a point at which most of the perspective lines intersect as the vanishing point.

* * * * *